（12） United States Patent
Vasylyev et al.

(10) Patent No.: US 10,962,701 B2
(45) Date of Patent: Mar. 30, 2021

(54) WIDE-AREA SOLID-STATE ILLUMINATION DEVICES AND SYSTEMS

(71) Applicants: Sergiy Vasylyev, Elk Grove, CA (US); Mykola Masalitin, Sacramento, CA (US)

(72) Inventors: Sergiy Vasylyev, Elk Grove, CA (US); Mykola Masalitin, Sacramento, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 0 days.

(21) Appl. No.: 16/840,382

(22) Filed: Apr. 4, 2020

(65) Prior Publication Data

US 2020/0319391 A1    Oct. 8, 2020

Related U.S. Application Data

(60) Provisional application No. 62/829,624, filed on Apr. 4, 2019.

(51) Int. Cl.
*F21V 8/00* (2006.01)

(52) U.S. Cl.
CPC ........... *G02B 6/0043* (2013.01); *G02B 6/005* (2013.01); *G02B 6/006* (2013.01); *G02B 6/0068* (2013.01)

(58) Field of Classification Search
CPC .... G02B 6/0043; G02B 6/0068; G02B 6/005; G02B 6/006; G02B 6/0036; F21V 2200/20
See application file for complete search history.

(56) References Cited

U.S. PATENT DOCUMENTS

| | | | |
|---|---|---|---|
| 5,178,447 A | 1/1993 | Murase | |
| 5,386,347 A | 1/1995 | Matsumoto | |
| 5,584,556 A | 12/1996 | Yokoyama | |
| 5,775,791 A | 7/1998 | Yoshikawa | |
| 6,259,854 B1 | 7/2001 | Shinji | |
| 6,669,350 B2 | 12/2003 | Yamashita | |
| 6,755,547 B2 | 6/2004 | Parker | |
| 7,513,674 B1 | 4/2009 | Donahue | |
| 8,092,034 B2* | 1/2012 | Zarian | F21V 33/006 362/145 |
| 8,264,622 B2 | 9/2012 | Gourlay | |
| 8,408,773 B2* | 4/2013 | Judge | B60Q 1/50 362/605 |
| 8,602,629 B2 | 12/2013 | Mi | |
| 9,022,631 B2* | 5/2015 | Mulder | B60Q 3/745 362/609 |
| 9,086,516 B2 | 7/2015 | Gourlay | |
| 9,146,419 B1* | 9/2015 | Anandan | G02B 6/0073 |

(Continued)

*Primary Examiner* — Peggy A Neils

(57) ABSTRACT

Wide-area solid-state illumination devices and systems employing a light guide formed by a sheet of an optically transmissive material and selectively patterned in designated areas. Printed light extraction features are used to form a plurality of patterned areas are separated from each other and from edges of the light guide by separation areas which are generally free from the light extraction features. One or more light emitting diodes (LEDs) is optically coupled to the light guide and provides a light source. The light guide is sandwiched between a front sheet and a reflective back sheet. The front sheet includes opaque areas and a plurality of optically transmissive areas disposed in registration with the patterned areas.

10 Claims, 27 Drawing Sheets

(56) References Cited

U.S. PATENT DOCUMENTS

| | | |
|---|---|---|
| 9,632,350 B2 * | 4/2017 | Nam ................. G02F 1/133308 |
| 9,709,721 B2 | 7/2017 | Gourlay |
| 2002/0080598 A1 | 2/2002 | Parker |
| 2002/0157292 A1 * | 10/2002 | Landers, Jr. ......... G02B 6/0065 40/546 |
| 2004/0136667 A1 | 7/2004 | Leu et al. |
| 2006/0083019 A1 | 4/2006 | Hahm |
| 2006/0146573 A1 | 7/2006 | Iwauchi |
| 2007/0279935 A1 | 12/2007 | Gardiner et al. |
| 2009/0147353 A1 | 6/2009 | Yang |
| 2010/0278480 A1 | 11/2010 | Vasylyev |
| 2011/0273906 A1 | 11/2011 | Nichol et al. |
| 2012/0195072 A1 | 8/2012 | Minami |
| 2013/0229824 A1 * | 9/2013 | Jeoung ................. C09D 11/106 362/602 |
| 2014/0226361 A1 | 8/2014 | Vasylyev |
| 2014/0307466 A1 | 10/2014 | Hikmet |
| 2016/0178829 A1 | 6/2016 | Hayashihara |
| 2016/0267851 A1 | 9/2016 | Pirtskhlava |
| 2016/0313494 A1 * | 10/2016 | Hamilton ............. G02B 5/0294 |
| 2017/0146725 A1 * | 5/2017 | Li ........................ G02B 6/0055 |
| 2018/0106947 A1 | 4/2018 | Wong |

\* cited by examiner

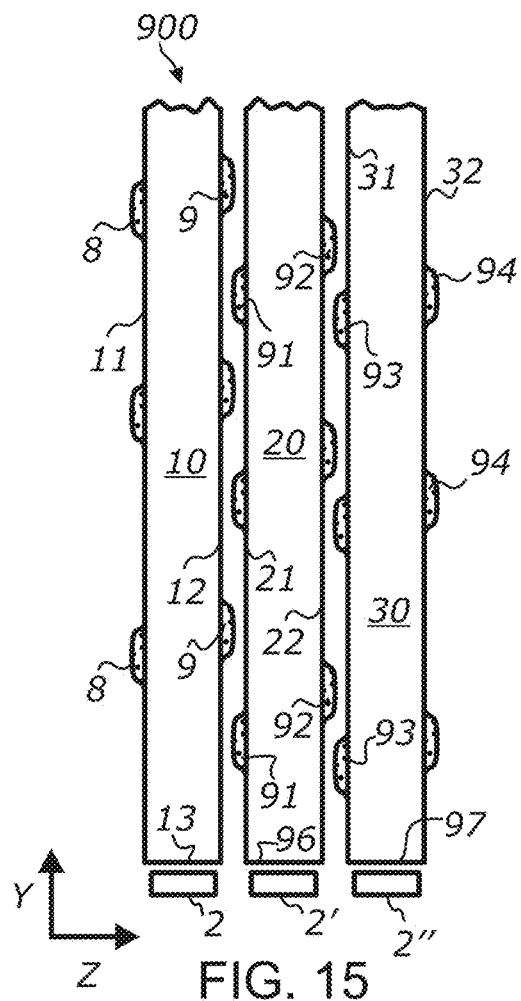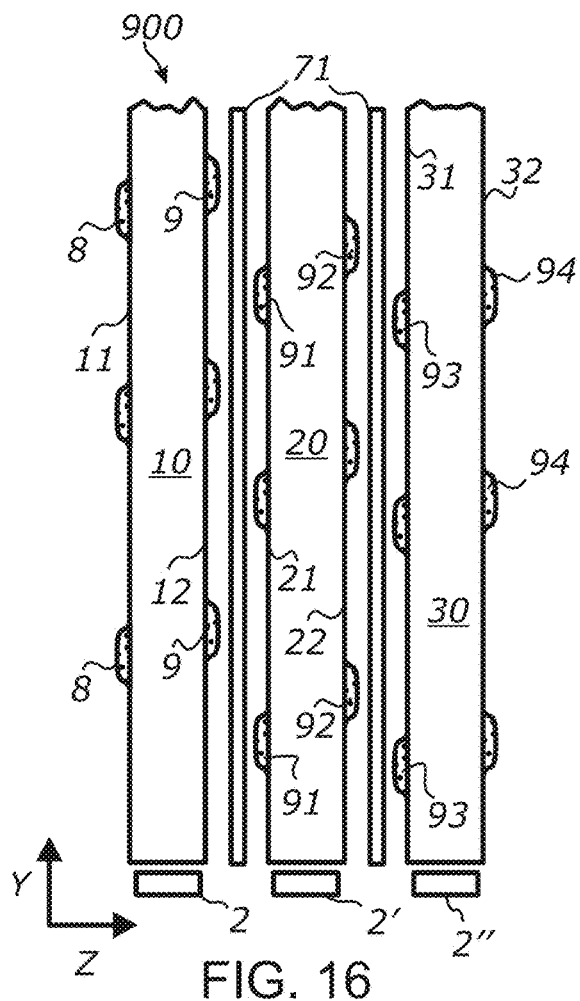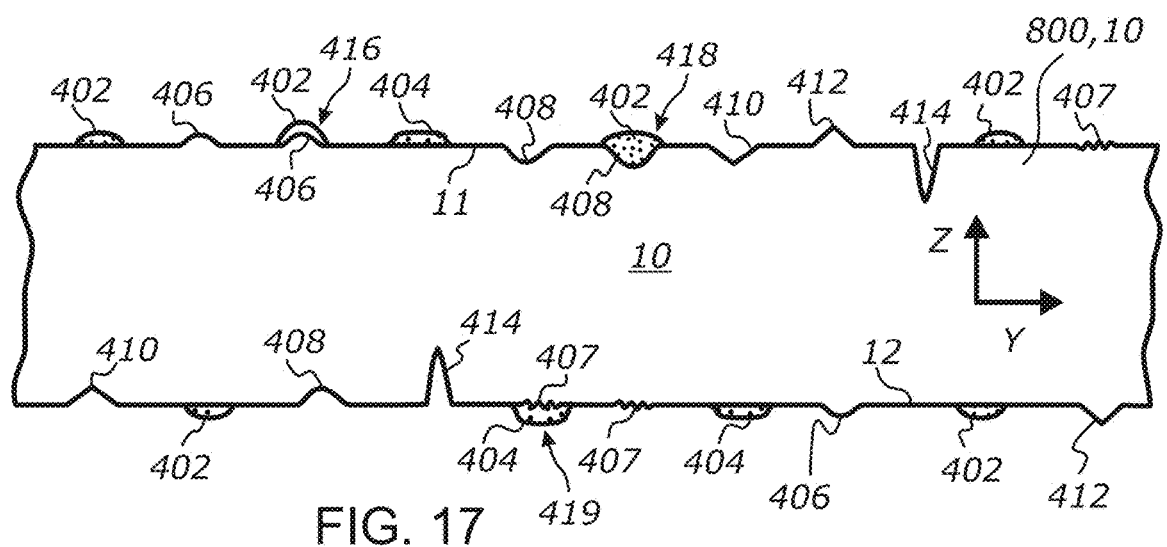

US 10,962,701 B2

WIDE-AREA SOLID-STATE ILLUMINATION DEVICES AND SYSTEMS

CROSS-REFERENCE TO RELATED APPLICATIONS

This application claims priority from U.S. provisional application Ser. No. 62/829,624 filed on Apr. 4, 2019, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to wide-area illumination devices employing planar and linear light guides as well as compact solid-state light emitting devices such as light emitting diodes (LEDs) or laser diodes. More particularly, this invention relates to wide-area LED illumination devices such as those employed in lighting panels, lighting luminaires, decorative lights, illuminated panel signs, electronic displays, front lights, backlights, backlit display screens, advertising displays, road signs, decorative broad-area lights, as well as to a method for redistributing light from a variety of light sources in such devices. The invention further relates to illumination devices in which planar-type or linear light guides are retained in a bent or curved state.

2. Description of Background Art

Conventionally, wide-area light emitting devices employ planar light guides, also commonly referred to as "waveguides", which are illuminated from one or more edges using Light Emitting Diodes (LEDs) or other types of compact light sources. The conventional waveguide-based illumination systems may exhibit certain limitations such as difficulty to efficiently couple, decouple and/or distribute light, particularly within a thin and flexible form factor. Additionally, configuring the waveguide-based illumination systems for a desired spatial and/or angular emission distribution and/or uniformity of the emission may be associated with optical losses and lead to energy waste and suboptimal performance.

U.S. patent Ser. No. 10/030,846 (the '846 patent) and US20170045666 (the '666 Publication), the disclosure of which is incorporated herein by reference in its entirety, disclose face-lit waveguide illumination systems formed by a planar waveguide and optical coupling elements attached to a face of the waveguide. U.S. Pat. Nos. 9,256,007, 9,097,826 (the '826 patent), U.S. Pat. No. 8,290,318, and U.S. Patent Applications Publication No. US20140140091, the disclosure of which is incorporated herein by reference in its entirety, disclose various configurations of waveguides (light guides) and light deflecting/light extraction elements. U.S. Patent Applications Publication No. US20180348423 (the '423 Publication), the disclosure of which is incorporated herein by reference in its entirety, discloses various configurations of stepped light guides and light guide illumination systems, as well as different arrangements of solid-state light sources and light extraction features. U.S. Pat. Nos. D777,972, D776,331, D799,738, D814,101, D824,085, D824,086, and D824,087, the disclosure of which is incorporated herein by reference in its entirety, disclose exemplary light emitting patterns associated with light emitting sheet-form structures. U.S. Pat. No. 10,267,972 (the '972 Patent), U.S. Pat. No. D825,097 (the '097 Patent), U.S. Pat. No. D866,841 (the '841 Patent), and U.S. Pat. No. D845,538 (the '538 patent), the disclosure of which is incorporated herein by reference in its entirety, discloses shaped light guide illumination devices.

It is noted that, where a definition or use of a term in a reference, which is incorporated by reference herein is inconsistent or contrary to the definition of that term provided herein, the definition of that term provided herein applies and the definition of that term in the reference does not apply.

BRIEF DESCRIPTION OF THE SEVERAL VIEWS OF THE DRAWING(S)

The invention will be more fully understood by reference to the following drawings which are for illustrative purposes only:

FIG. 15 is a schematic section view of a portion of a wide-area light guide illumination system having multiple stacked light guiding sheets, each including light extraction patterns on both opposing broad-area surfaces, according to at least one embodiment of the present invention.

FIG. 16 is a schematic section view of a portion of a wide-area light guide illumination system having multiple stacked light guiding sheets, showing light diffusing sheets positioned between the light guiding sheets, according to at least one embodiment of the present invention.

FIG. 17 is a schematic section view of a portion of a wide-area light guide illumination system having different types of light extraction features formed in opposing broad-area surfaces of a light guiding sheet, according to at least one embodiment of the present invention.

DETAILED DESCRIPTION OF THE INVENTION

Figure 1:
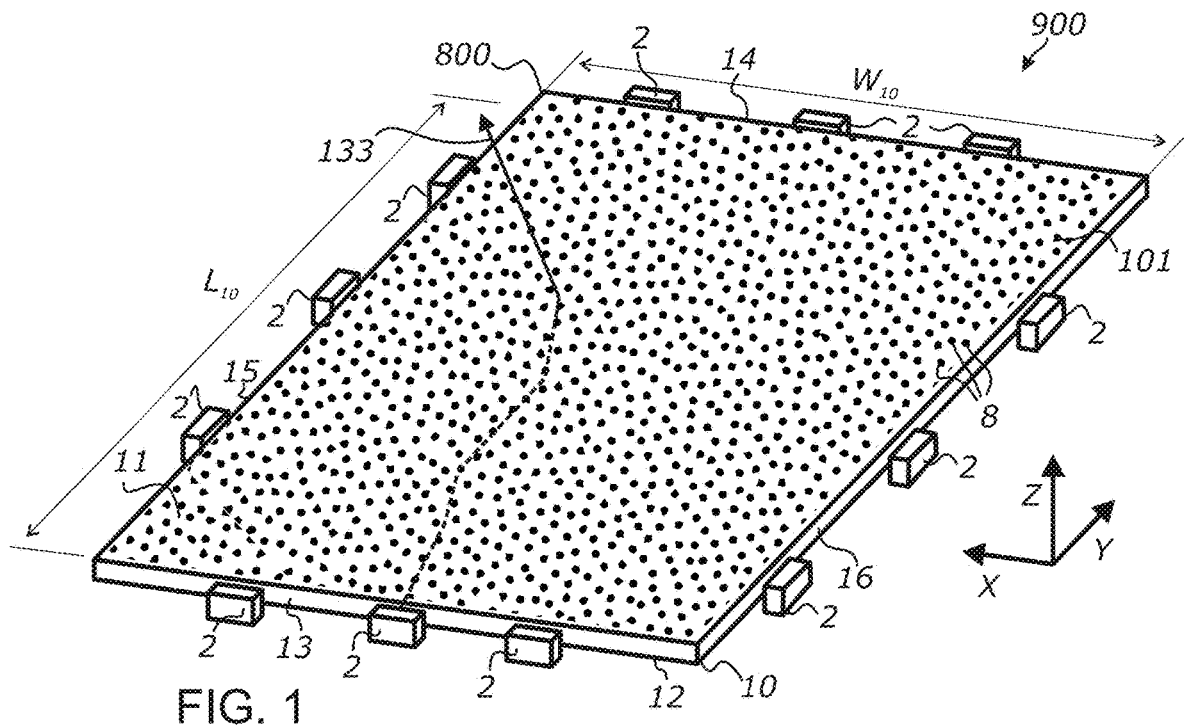
FIG. 1 is a schematic perspective view and raytracing of a wide-area solid-state light guide illumination system, according to at least one embodiment of the present invention.

Referring more specifically to the drawings, for illustrative purposes, the present invention is embodied in the systems generally shown in the preceding figures. It will be appreciated that the systems may vary as to configuration and as to details of the parts without departing from the basic concepts as disclosed herein. Furthermore, elements or limitations represented in one embodiment as taught herein are applicable without limitation to other embodiments taught herein and/or in patents and patent applications incorporated by reference herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Furthermore, many applications exist for the present invention in relation to distributing light by means of a planar optical light guide which hereinafter may also be referenced to as a waveguide. The planar optical light guide (planar waveguide) refers to a broad class of objects employing an optically transmissive material confined between two opposing broad-area surfaces that extend substantially parallel to each other. The term "substantially parallel" generally includes cases when the opposing surfaces are parallel within a reasonable accuracy. It also includes cases when the body of the material defined by the broad-area surfaces has a slightly tapered shape or has a slightly varying thickness across the surface. It yet further includes cases when a generally planar body of the light guide includes limited areas where its thickness is different compared to the rest of the light guide.

According to a preferred embodiment of the present invention, the planar light guide may be exemplified by a transparent plate, sheet, slab, panel, pane, light-transmitting substrate or any suitable sheet-form of an optically transmissive material, including those having film thicknesses and rigid or flexible sheet forms. This invention is also applicable to any two-dimensional shape variations of the sheet forms, including but not limited to a square, rectangle, polygon, circle, strip, freeform, or any combination therein. This invention is further applicable to any three-dimensional shapes that can be obtained by bending the sheet forms accordingly, including but not limited to cylindrical or partial cylindrical shapes, conical shapes, corrugated shapes, and the like. Opposite ends or edges of such three-dimensional shapes may be also be connected together to form a continuous surface or surfaces. For example, a strip of a light guiding strip material can be bent and its edges connected so as to form a loop. In a further example, a strip of a light guiding strip material can be folded at a mid-section such that its opposite edges come in contact with each other and form a combined edge of the material.

It is also noted that terms such as "top", "bottom", "side", "front", "back", "left", and "right" and similar directional terms may be used herein with reference to the orientation of the Figures being described and should not be regarded as limiting this invention in any way. It should be understood that different elements of embodiments of the present invention can be positioned in a number of different orientations without departing from the scope of the present invention. In the context of the description of a planar light guide and its elements, the term "top" is being generally used to refer to a primary light emitting side of the light guide and the term "bottom" is being generally used to refer to the opposite side (which may be emitting or non-emitting) for the sake of convenience of description and not in a limiting sense.

Any numerical range recited herein is intended to include all sub-ranges subsumed therein. For example, a range of 1 to 10 is intended to include all sub-ranges between and including the recited minimum value of 1 and the recited maximum value of 10, that is, having a minimum value equal to or greater than 1 and a maximum value of equal to or less than 10, such as, for example, 3 to 6 or 2.5 to 8.5. Any maximum numerical limitation recited herein is intended to include all lower numerical limitations subsumed therein and any minimum numerical limitation recited in this specification is intended to include all higher numerical limitations subsumed therein. Accordingly, Applicants reserve the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a). Also, unless otherwise indicated, all numerical parameters are to be understood as being prefaced and modified in all instances by the term "about", in which the numerical parameters possess the inherent variability characteristic of the underlying measurement techniques used to determine the numerical value of the parameter.

According to some preferred embodiments of the present invention, there is provided an illumination system employing an optical light guide exemplified by an optically transmissive, broad-area sheet or panel, which may also hereinafter be referred to as a "light guiding sheet", "light guiding panel" or "LGP". The LGP is made from a material which has a refractive index greater than that of the outside medium and is capable of guiding light within the panel by means of a Total Internal Reflection (TIR) from its opposing broad-area surfaces, provided that the internal incidence angles onto either of the surfaces are greater than a critical angle of TIR characterizing the broad-area surfaces.

For the purpose of this discussion, the term "incidence angle" of a light ray in relation to a surface generally refers to an angle that such ray makes with respect to a normal to the surface. It will be appreciated by those skilled in the art of optics that, when referring to light or other forms of electromagnetic waves passing through a boundary formed between two different refractive media, such as air and glass, for example, the ratio of the sines of the angles of incidence and of refraction is a constant that depends on the ratio of refractive indices of the media (the Snell's law of refraction). The following relationship can describe a light bending property of an interface between two refractive media: $n_I \sin \phi_I = n_R \sin \phi_R$, where $n_I$ and $n_R$ are the respective refractive indices of the materials forming the optical interface and $\phi_I$ and $\phi_R$ are the angle of incidence and the angle of refraction, respectively. It will be further appreciated that such optical interface can also be characterized by a critical TIR angle which is the value of $\phi_I$ for which $\phi_R$ equals 90°. Accordingly, for a surface characterized by a stepped drop in refractive index along the propagation path of a ray, the incidence angle may be less than, equal to, or greater than the TIR angle at the given surface.

A TIR angle $\phi_{TIR}$ can be found from the following expression:

$$\phi_{TIR} = \arcsin\left(\frac{n_R}{n_I} \cdot \sin 90°\right) = \arcsin\left(\frac{n_R}{n_I}\right) \quad \text{(Equation 1)}$$

In an exemplary case of the interface between glass with the reflective index $n_I$ of about 1.51 and air with $n_R$ of about 1, $\phi_{TIR}$ is approximately equal to 41.5°. It will be appreciated that, once light is input into the LGP and its propagation angles permit for TIR to occur at LGP's longitudinal walls, the light becomes trapped in the LGP and can propagate considerable distances until it is extracted, absorbed or reaches an edge of the panel, for example.

The present invention will now be described by way of example with reference to the accompanying drawings.

FIG. 1 schematically depicts an embodiment of a wide-area light guide illumination system 900 in accordance with the invention. Light guide illumination system 900 includes a generally planar light guide 800 that is formed by a substantially planar base sheet 10 (light guiding sheet) of an optically transmissive material. Light guide 800 may also have a plurality of secondary sheets of an optically transmissive material (not shown) attached to the base sheet 10 (such as, for example, sheets 20 described in reference to FIGS. 1-2 of the '423 Publication). The orientation of planar light guide 800 and its components in three-dimensional space may be conveniently described using orthogonal reference axes X, Y, and Z (see FIG. 1) which also define orthogonal reference planes XY, XZ, and YZ.

Sheet 10 has a rectangular configuration and is defined by opposing broad-area surfaces 11 and 12 and four edge surfaces 13, 14, 15 and 16. Surfaces 11 and 12 represent major surfaces of planar light guide 800 that are configured to guiding light using TIR. Surfaces 11 and 12 extend parallel to each other. They also extend broadly both longitudinally and laterally along the X and Y axes so as to form a planar sheet form that is parallel to the XY plane. Opposing edge surfaces 13, 14 are parallel to each other, extending parallel to the XZ plane, and opposing edge surfaces 15, 16 are likewise parallel to each other, extending parallel to the YZ plane. Sheet 10 has a non-zero thickness which may be conventionally measured along the Z axis or coordinate.

Sheet 10 is preferably formed from a highly transmissive, solid dielectric material and is configured to guide light both longitudinally and laterally using optical transmission through the material and TIR from opposing surfaces 11 and 12. Surfaces 11 and 12 are preferably optically smooth and polished to high gloss. Edge surfaces 13, 14, 15 and 16 may also be polished and configured for reflecting light with high efficiency using TIR. One or more edge surfaces 13, 14, 15 and 16 may also be covered with a specularly reflective mirror or a diffuse reflector. For example, any of the edge surfaces may be coated with a metallic layer (e.g., aluminized or silvered). In another example, strips of highly reflective material, such as a metallized film or foil may be applied to any of the edge surfaces 13, 14, 15 and 16.

Another suitable exemplary type of the reflective materials may also be a white-color, light diffusing tape.

Suitable materials for making sheet 10 may include various dielectric materials in the form of a wide-area, highly transparent sheet or film. Materials that may be particularly suited for making sheet 10 include but are not limited to water-clear (low-iron) glass, Poly(methyl methacrylate) (PMMA or acrylic), polycarbonate (PC), Styrene methyl methacrylate (SMMA), Polystyrene (PS), Polyethylene Terephthalate Glycol (PETG), methacrylate styrene copolymer (MS), cured urethane, polyester, silicone, and the like.

Sheet 10 has a length $L_{10}$ and a width $W_{10}$, which can be approximately equal to length $L_{10}$ or considerably less than length $L_{10}$. According to different embodiments, width $W_{10}$ can be less than length $L_{10}$ by at least 1.5 times, at least 2 times, at least 3 times, at least 5 times, and at least 10 times. The thickness of sheet 10 can be made sufficiently low to make it flexible. According to one embodiment, the thickness of flexible sheet 10 can be in the range of 0.3 mm to 2.5 mm, and more preferably in the range from 0.5 mm to 1.5 mm so that the sheet could be flexed and handled with relative ease without breaking or affecting its structural integrity.

Light guide illumination system 900 further includes a plurality of compact solid-state light sources exemplified by LEDs 2. LEDs 2 are provided in four linear arrays or strips where each array or strip is configured to illuminate the respective edge of sheet 10 (e.g., edge surfaces 13, 14, 15 and 16). In other words, all of the edges of sheet 10 can be configured as light input edges. Within each array or strip, LEDs 2 are positioned adjacent and optically coupled to the respective edge surface such that the amount of light that is not coupled to light guide 800 (light spillage) is minimized. LEDs 2 may be exemplified by top-emitting or side-emitting LED packages which may be conventionally arranged on a rigid or flexible strip. The LED strip may conventionally include a heat-spreading printed circuit board (PCB) or flexible film or substrate.

Surface 11 of sheet 10 includes a plurality of discrete light extraction features 8 forming a two-dimensional light extraction pattern 101 and configured to extract light from light guide 800 such that the extracted light is emitted from the entire two-dimensional area of light extraction pattern 101. According to one embodiment, light extraction pattern 101 may occupy substantially the entire exposed area of light guide 800 (e.g., extending all the way longitudinally between opposing edge surfaces 13 and 14 and laterally between opposing edge surfaces 15 and 16).

According to one embodiment, light extraction features 8 are formed only in surface 11 while opposite surface 12 can be substantially free from light extraction features 8. According to one embodiments, light extraction features 8 are formed only in surface 12 while surface 11 can be substantially free from light extraction features 8. According to one embodiments, light extraction features 8 are formed in both opposing surfaces 11 and 12. The arrangement or spatial distribution of light extraction features 8 formed in surface 11 may be the same or different than the arrangement or spatial distribution of light extraction features 8 formed in surface 12.

While some of the paragraphs below may describe embodiments of illumination system 900 primarily referring to light extraction features 8 being formed in surface 11, it should be understood that this invention is not limited to this and that the same description can be applied to the cases when light extraction features 8 are formed in surface 12 or in both surfaces 11 and 12. Furthermore, it should be understood that these embodiments are amenable to various modifications and alternative forms, for example, in which light extraction features 8 are formed in other surfaces that are parallel or near-parallel to surfaces 11 and 12, especially when light guide 800 includes two or more layer of optical transparent materials. According to some embodiments, light guide 800 may be formed by two, three or more sheets of optically transmissive materials that are attached (and optionally bonded) to each other. At least some of light extraction features 8 may be formed in or on the inside broad-area surface of one or all of the sheets, so that at least the inner light extraction features 8 can be made embedded into the material of light guide 800 when the sheets are bonded together. According to one embodiment, such multiple sheets may be bonded to each other at their edges or selected locations of their surfaces.

In operation, an exemplary light ray 133 emitted by one of LEDs 2 optically coupled to light input edge surface 13 is propagated within sheet 10 in a waveguide mode until it is extracted by one of light extraction features 8 and is directed out and away from light guide 800. Depending on the location, configuration and optical properties of extraction features 8, as well as probability, ray 133 may exit from either surface 11 or 12. Depending on the same factors, ray 133 may exit from surface 11 or 12 at a right angle or at an oblique angle with respect to the surface plane. A small portion of light emitted by the LED may also be allowed to exit from one or more edges of light guide 800.

According to one embodiment, light extraction features 8 may be configured to direct at least a portion of the deflected light back into the body of sheet 10 at angles permitting for continued propagation of the light through sheet 10 in a waveguide mode and further configured to extract the respective portion of light at a different location of the surface of sheet 10. Redirecting a portion of the deflected light back into light guiding sheet 10 may be critical at least for some embodiments of system 900 configured for enhanced mixing of light within light guide 800. In other words, light extraction features 8 may be configured to randomize and mix light rays within the body of sheet 10 such that a light ray may be deflected by one or more light extraction features 8 while propagating in sheet 10 and finally extracted at a different location by one of other light extraction features 8.

According to one embodiment, sheet 10 may be configured to transmit light in a transverse direction through spaces between light extraction features 8 such that light guide 800 (or at least large portions of it) has a transparent appearance when in a non-illuminated state. According to various embodiments, one or more lighting diffuser sheets may be positioned on either one or both light-emitting sides of sheet 10 (surfaces 11 and 12). The lighting diffusers may be of a transmissive type (e.g., a translucent sheet or a textured sheet of optically transparent material). At least one of the lighting diffusers may be of a reflective type (e.g., a mirrored sheet or a diffusely reflective sheet). The diffuser sheet(s) may be laid onto either one of surfaces 11 and 12, preferably without disrupting TIR in sheet 10. Suitable exemplary arrangements of the lighting diffusers with respect to sheet 10 may include but are not limited to the following exemplary combinations: an optically transmissive diffuser is provided on the side of surface 11, an optically transmissive diffuser is provided on the side of surface 12, a reflective diffuser is provided on the side of surface 11, a reflective diffuser is provided on the side of surface 12, an optically transmissive diffuser is provided on the side of surface 11 and a reflective diffuser is provided on the side of surface 12, an optically transmissive diffuser is provided on the side of surface 12 and a reflective diffuser is provided on the side of surface 11, and a first optically transmissive diffuser is provided on the side of surface 12 and a second optically transmissive diffuser is provided on the side of surface 11.

According to one embodiment, light extraction pattern 101 may have a uniform average areal density or surface coverage with a randomized spacing between individual light extraction features 8, for example, as schematically illustrated in FIG. 1. The spacing may be randomized, for example, such that adjacent individual light extraction features 8 are spaced from each other by spacing distances that deviate from an average spacing within a sampling area by no less than a minimum spacing distance and no more than a maximum spacing distance.

Figures 2, 3, 4:
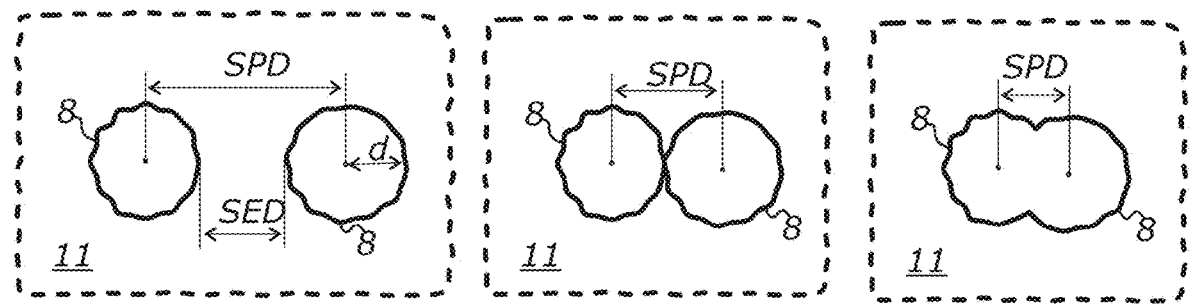
FIG. 2 is a schematic view of an adjacent pair of spaced-apart light extraction features formed on a surface of a light guiding sheet, illustrating exemplary definitions of a spacing distance and a separation distance, according to at least one embodiment of the present invention.
FIG. 3 is a schematic view of contacting light extraction features, according to at least one embodiment of the present invention.
FIG. 4 is a schematic view of substantially overlapping light extraction features, according to at least one embodiment of the present invention.

A spacing distance (SPD) may be ordinarily defined as a distance between geometrical centers of individual light extraction features 8, e.g., as schematically illustrated in FIG. 2. According to different embodiments, a minimum spacing distance $SPD_{MIN}$ characterizing a particular sampling area of light extraction pattern 101 may be 0.1, 0.25, 0.5, 0.75, or 0.9 times an average spacing distance $SPD_{AVG}$ characterizing the same sampling area. According to different embodiments, a maximum spacing distance $SPD_{MAX}$ characterizing a particular sampling area of light extraction pattern 101 may be 1.2, 1.5, 2, 2.5, 3, 5 or 10 times the average spacing distance $SPD_{AVG}$.

A separation distance (SED) in relation to a pair of adjacent individual light extraction features 8 may be defined as the shortest distance connecting the respective outlines or boundaries of such adjacent light extraction features (FIG. 2). In an exemplary case of two adjacent light extraction features 8, each having a round outline or aperture with a diameter d, separation distance SED may be defined as the spacing distance SPD minus diameter d. Accordingly, depending on the values of the spacing distance and diameter d, the separation distance may have negative and positive values, and may also be zero when SPD=d.

The definition of separation distance SED may also be generalized to the cases where light extraction features 8 have shapes other than round. For example, when light extraction features 8 has an elongated or irregular shape, an average size or diameter of light extraction features 8 may be used in place of diameter d to define separation distance SED. The average diameter or size of individual light extraction feature 8 may be defined as an average length of diameters measured at predefined angular intervals around a centroid of the shape representing such light extraction feature 8. For example, the angular intervals can be 1°, 2° 5°, 10°, 20°, 30° or 45°.

According to one embodiment, separation distance SED characterizing a pair of adjacent light extraction features 8 having round or non-round shapes may be considered negative when these adjacent light extraction features 8 (or their apertures or outlines) substantially overlap (FIG. 4), zero when they (or their apertures or outlines) are disposed in contact or extremely close to each other (FIG. 3), and positive when their outlines or apertures neither overlap nor contact each other (FIG. 2).

According to one embodiment, separation distance SED between at least some adjacent light extraction features 8 is negative, e.g., light extraction features 8 are substantially overlapping. According to different embodiments, the overlapping light extraction features 8 may overlap by 10% or more, 20% or more, 30% or more, 50% or more, 75% or more, or 80% or more. According to an aspect of the embodiments in which two or more light extraction features 8 overlap, such overlapping light extraction features 8 may be cumulatively considered a larger single light extraction feature 8.

According to one embodiment, at least some light extraction features 8 may be formed by a single cured drop of light scattering ink using an inkjet printing process. The individual drops of light scattering ink may ordinarily have diameters that are much less than a millimeter (and preferably even less than 100 μm) and may thus be referred to as microdrops. A fully or partially cured microdrop of light scattering ink formed on a surface of light guide 800 may be referred to as a microdot (e.g., a microscopic-scale solid surface structure that can scatter, reflect or deflect light).

According to one embodiment, individual light extraction features 8 may be formed by depositing two or more microdrops of a light scattering ink to the same location of surface 11. According to one embodiment, individual light extraction features 8 may be formed by depositing two or more microdrops approximately to the same location but with a slight offset with respect to each other. According to one embodiment, it may be preferred that each microdrop deposited to surface 11 is at least partially or completely cured to a high-viscosity or substantially solid state before depositing a next microdrop on top of it or adjacent to it. The droplet deposition process can be repeated to gradually build up a prescribed thickness and/or size of the respective light extraction feature 8 in stepped increments based on the volume of individual droplets. Such stacked or overlapping microdots forming individual light extraction features 8 may ordinarily have a total volume that is a whole multiple of the volume of the individual microdrops. For example, individual microdrops having a volume of 4 picoliters may form larger microdots or light extraction features 8 having volumes of 8 picoliters, 12 picoliters, 20 picoliters, 40 picoliters and so on.

According to one embodiment, separation distance SED between at least some adjacent light extraction features 8 is zero or near zero. In other words, the light extraction features 8 are contacting each other or their apertures are very close to each other or have a very small overlap (e.g., within less than 10% of the average diameter of each of the adjacent light extraction features 8).

According to different embodiments, separation distance SED between at least some adjacent light extraction features 8 is greater than 25%, greater than 50%, greater than 100%, greater than 150%, or equal to or greater than 200% of diameter d or an average diameter characterizing the light extraction features 8. According to different embodiments, separation distance SED between at least some adjacent light extraction features 8 is less than 0.9, less than 0.75, less than 0.5, or less than 30% of diameter d (in case of round-apertures) or the average diameter (in case of non-round-apertures) characterizing light extraction features 8.

For the purpose of measuring average values of the spacing distances SPD and/or separation distances SED, a suitable sampling area may be defined as a relatively small-size area of surface 11, at a particular location of the surface, which includes at least 100 individual light extraction features 8. According to different embodiments, an average separation distance $SED_{AVG}$ between adjacent light extraction features 8 within the sampling area may be greater than 25%, greater than 50%, greater than 100%, greater than 150%, or equal to or greater than 200% of diameter d or the average diameter characterizing light extraction features 8. According to different embodiments, an average separation distance between adjacent light extraction features 8 within the sampling area is less than 0.9, less than 0.75, less than 0.5, or less than 30% of diameter d (in case of round-apertures) or the average diameter (in case of non-round-apertures) characterizing light extraction features 8.

According to one embodiment, light extraction features 8 may be formed by repeatedly depositing a number of individual droplets with a slight offset from each other. The offset can be selected to be less than the prevalent diameter of the individual microdots formed by each droplet, creating at least partial overlap for the resulting micro- or macro-dots. According to one embodiment, the direction of the offset can be maintained for depositing a series of individual droplets such that a single elongated light extraction feature 8 in the form of a straight line can be formed. According to one embodiment, the direction of the offset can be varied so as to produce continuous curved lines or a combination of straight and curved lines or line segments. The width of the lines or line segments produced by this method may be controlled, for example, by the volume and viscosity of each droplet, additives affecting surface tension, wettability of surface 11, temperature of the ink and/or the substrate (sheet 10), number of microdrops, amount of the offset, as well as depositing some of the microdots with a perpendicular offset from the intended center of the line or line segment. Multiple straight and/or curved lines may be branched at one or multiple locations, e.g., to produce a tree-like structure.

According to one embodiment, printed light extraction features 8 may be formed by depositing a large number of microdrops (e.g., of a UV-curable ink) that overlap on one another and cover a two-dimensional area which is much larger than the area of the individual micro drops. Such two-dimensional areas may have different regular or irregular shapes. Examples of the regular shapes include but are not limited to circular, oval, linear, square, rectangular, triangular, hexagonal, octagonal, and the like. The shapes formed by a two-dimensional pattern of overlapping micro dots may have rounded corners (e.g., rounded-corner squares, triangles or rectangles). Overlapping printed microdrops forming light extraction features 8 may also be arranged into various geometrical patterns, indicia, letters or images.

According to one embodiment, the printed shapes, geometrical patterns, letters or images may have a solid fill (e.g., where the printed ink material completely covers the area of the respective shapes, geometrical patterns, letters or images). According to one embodiment, the printed shapes, geometrical patterns, letters or images may have a partial fill (e.g. with gaps in a solid fill) with various area coverage. For example, the area coverage in the partial fill can be 10%, 30%, 50%, 75%, 90%, and so on.

According to one embodiment, light extraction features 8 may be arranged into various indicia, patterns, letters or images in the form of a dot-pattern fill. This may be particularly critical for cases where the areas of the respective indicia, patterns, letters or images occupies a significant fraction of the area of sheet 10 (e.g., greater than 10%, greater than 20%, greater than 30%, and greater than or equal to 50%) and where the rate of light extraction caused by a solid fill may be too high such that some portions of the illuminated indicia, patterns, letters or images may appear significantly darker than others. The individual dots of the dot-pattern fill may be spaced apart from each other by distances that are constant or decrease with a distance from a light input edge or edges (e.g., edges/edge surfaces 13 and 14 of sheet 10). According to one embodiment, at least some dots (e.g., those which are farthest from the light input edge) may partially overlap with one another and may further form clusters of overlapping dots.

Light extraction features 8 may include any suitable two- or three-dimensional optical elements or surface features configured for intercepting and extracting light from sheet 10. Light extraction features 8 may be configured to extract light by means of scattering, reflection, refraction, deflection, diffraction, absorption (with the subsequent re-emission), or any combination thereof.

Light extraction features 8 may be further configured to extract light while changing one or more properties of light. Exemplary properties of light that may be changed by light extraction features 8 include but are not limited to a wavelength, polarization, spectral distribution, angular and/or spatial distribution, and dispersion. For example, each light extraction features 8 may include a color pigment that receives white color and either filters out certain wavelengths or converts the received light to a different color. For example, each light extraction features 8 may include a color pigment that is configured for converting a white color to a different color, e.g. red, green or blue. In a further example, each light extraction features 8 may include a fluorescent material (e.g., a phosphor) that that is configured to receive light in a blue color spectrum and convert it to a different color spectrum (e.g., yellow, green, orange or red) or to a white light (e.g., by mixing the original blue color with the converted color in prescribed proportions). In a further example, light extraction features 8 may include a light-scattering material that disperses the incident light over a wide angular range. A fluorescent material can be combined or mixed with a light scattering material. For example, according to one embodiment, particles of a phosphor material may be mixed together with light-scattering particles into the ink used to produce light extraction features 8.

According to one embodiment, different individual light extraction features 8 may be formed by different-type inks. For example, light extraction pattern 101 may have a first series (or sub-pattern) of light extraction features 8 having only light-scattering particles and a second series (or sub-pattern) of light extraction features 8 having light-scattering particles and color pigments or fluorescent materials. The first and second series (or sub-patterns) of light extraction features 8 may be distributed over surface 11 such the light-scattering light extraction features 8 are alternating with the color-pigmented or fluorescent light extraction features 8.

The spatial distribution patterns of the first and second sub-patterns of light extraction features 8 may be different from each other. For example, the spatial distribution of the light-scattering light extraction features 8 may be configured to provide a uniform intensity distribution of the emission from surface 11 and/or 12 (e.g., using a first density or density gradient of the respective microdots) and the spatial distribution of the color-pigmented or fluorescent light extraction features 8 may be configured to provide a uniform color distribution of the emission from surface 11 and/or 12 (e.g., using a second density or density gradient of the respective microdots). This may be particularly critical for the cases where, for example, the rate of light extraction from light guide 800 in one color is different than the rate of light extraction from light guide 800 in another color.

According to one embodiment, at least some light extraction features 8 having a color pigment of fluorescent material may be accompanied by one or more smaller "satellite" light extraction features 8 formed by light-scattering ink. Two or more different types of light extraction features 8 may also be grouped together to form clusters and configured to cumulatively emit light (e.g., due to mixing of the individual light beams) with a prescribed spectral and/or angular distribution. One cluster may be configured to emit light with a first spectral and/or angular distribution and another cluster may be configured to emit light with a different second spectral and/or angular distribution. According to one embodiment, light extraction features 8 of one type or color may be formed in surface 11 and light extraction features 8 of a different type or color may be formed in opposite surface 12.

Figure 5:
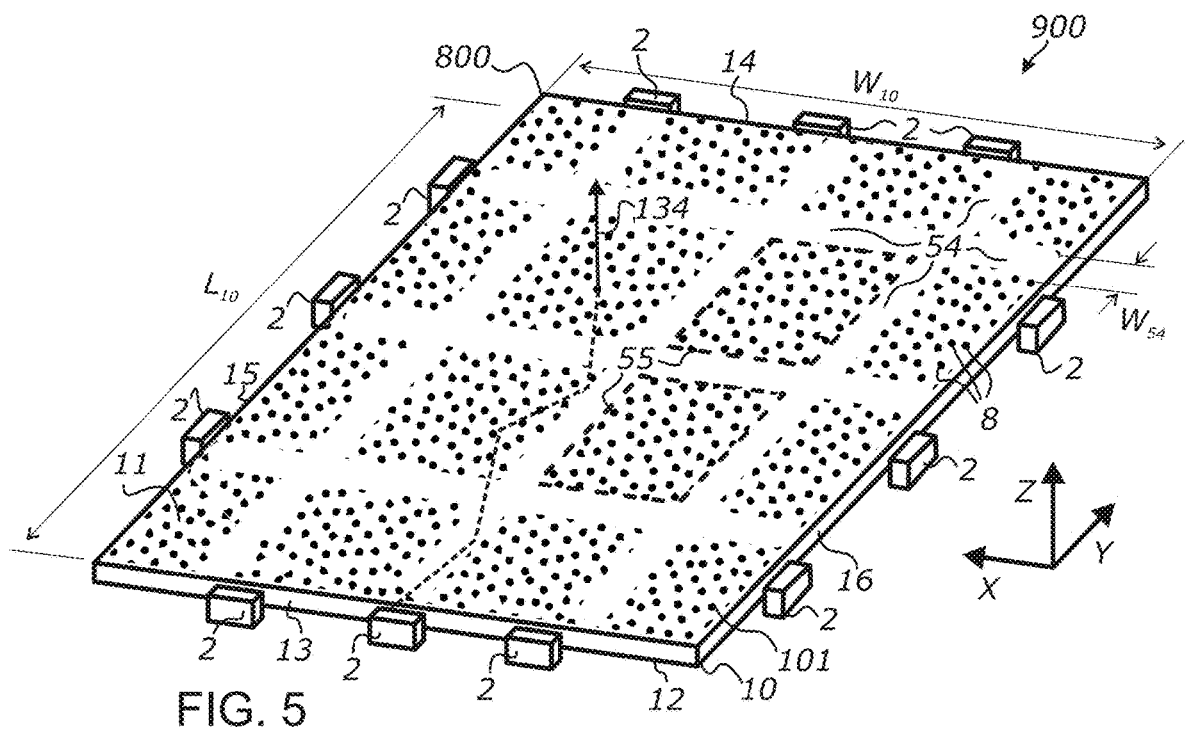
FIG. 5 is a schematic perspective view of a wide-area light guide illumination system having a segmented light extraction pattern, according to at least one embodiment of the present invention.

According to one embodiment, light extraction pattern 101 may have a non-uniform average areal density (or coverage) of individual light extraction features 8 at different locations of surface 11 (see, e.g., FIG. 5). The spacing between individual light extraction features 8 may be varied according to a regular or irregular pattern. Furthermore, light extraction pattern 101 may be segmented into multiple smaller-area light extraction patterns that are either separated from each other or have different optical properties and/or distribution densities of light extraction features. These smaller-area light extraction patterns may have distinct boundaries. They can also be separated from each other by spacing or separation areas that are generally free from light extraction features 8 or have much lower density of light extraction features 8 (e.g., at least by a factor of 2 or more). According to one embodiment, the spacing or separation areas may be distributed over the area of surface 11 according to an ordered geometrical pattern, such as for example, an array of parallel bands.

FIG. 5 illustrates an embodiment of system 900 in which light extraction/light emitting pattern 101 is segmented into multiple light extraction/light emitting sub-patterns, as indicated by areas 55. Those sub-patterns (patterned areas 55) are separated from each other and from edges of light guiding sheet 10 by separation areas 54 that are generally free from light extraction features 8. According to an aspect, patterned areas may be alternating with separation areas 54. The term "separated" should be construed broadly and may include cases when patterned areas 55 are discrete objects (areas) completely surrounded by non-patterned separation areas 54 and cases when two or more patterned areas 55 are connected to each other (e.g., represent portions of a single, larger patterned area having a complex outline, such as script lettering, for example) but have a non-patterned separation area 54 between them (e.g., along a straight line that may be drawn between the patterned areas).

Separation areas 54 (or spacing areas) may be configured in the form of a perpendicular grid of narrow bands that extend all the way between opposing edge surfaces 13 and 14 and 15 and 16. More specifically, the bands representing separation areas 54 are arranged into two parallel arrays that intersect with each other at a right angle. The parallel bands of the first array extend perpendicular to light input edges 13 and 14 and the parallel bands of the second array extend parallel to light input edges 13 and 14. Alternatively, the bands representing separation areas 54 may be configured to extend diagonally through surface 11. Each band or strip representing an individual separation area 54 may have a width $W_{54}$ that is less than the length or width of patterned light extraction areas 55.

According to some embodiments, it may be preferred that width $W_{54}$ of each separation area 54 is at least several times greater than prevalent spacing distances SPD between light extraction features 8 in areas immediately adjacent to the respective separation area 54. According to some exemplary embodiments, width $W_{54}$ can be at least 3 times, 5 times, 10 times, 20 times, 50 times, and 100 times greater than an average SPD characterizing the distances between light extraction features 8 in an adjacent patterned area 55. According to some embodiments, it may be preferred that the overall size of each area 54 (e.g. along its longest dimension) is at least several times greater than a prevalent or average spacing distances SPD between light extraction features 8 within such area, e.g., at least by 3, 5, 10, 20, 50, 100, or 1000 times.

According to some embodiments, the cumulative area of patterned areas 55 is less than the area of sheet 10 (or either one of its surfaces 11 and 12) by at least 2 times, at least 2.5 times, at least 3 times, at least 3.5 times, at least 4 times, at least 5 times, at least 6 times, at least 8 times, or at least 10 times. According to some embodiments, the cumulative area of patterned areas 55 is less than the cumulative area of separation areas by at least 2 times, at least 2.5 times, at least 3 times, at least 3.5 times, at least 4 times, at least 5 times, at least 6 times, at least 8 times, or at least 10 times.

The operation of light guide illumination system 900 of FIG. 5 is illustrated by the example of an exemplary light ray 134. Ray 134 is emitted by one of the LEDs 2, propagated through light guide 800 (sheet 10) and extracted using individual light extraction feature 8 of light extraction pattern 101 such that ray 134 further propagates towards a prescribed direction (e.g., towards a viewer or an object to be illuminated).

According to one embodiment, separation areas 54 may be configured to suppress or otherwise significantly limit the rate of light extraction in those areas such that the guided light can only be extracted from one of areas 55. This may be useful, for example, in order to create a visually distinct appearance of light guide 800, particularly when illuminated by LEDs 2. In a further non-limiting example, separation areas 54 may be configured to provide at least some visual transparency of light guide 800 even when it is illuminated, regardless of the density and/or light-blocking operation of patterned areas 55.

According to one embodiment, wide-area light guide illumination system 900 may include a layer having opaque members or materials, and separation areas 54 may be located in areas of sheet 10 which are covered by the opaque members or materials. For instance, light guide 800 may be associated with a grid or reflective or light absolving members. Such a grid may be exemplified by an egg-crate lighting diffuser or a grid of parabolic louvers and the opaque members may be represented by the louvers or the walls of the egg-crate diffuser structure. Since extracting and emitting light in the areas where the opaque grid members are located could result in a loss of efficiency (e.g., due to light absorption or reflection by the grid members) suppressing the light emission in those areas by providing separation areas 54 may be important for enhancing the overall efficiency of the wide-area light guide illumination system 900. Suitable exemplary arrangements of waveguide-based illumination systems including segmented light extraction features and opaque members and illustrating the principles of formation of light extraction features in spaces between such opaque members may be found in U.S. patent application Ser. No. 16/679,147 (the '147 application), the disclosure of which is incorporated herein by reference in its entirety.

According to one embodiment, wide-area light guide illumination system 900 may include an opaque sheet-form mask approximately coextensive with surface 11 and having openings approximating the locations and shapes of patterned light extraction areas 55, such that separation areas 54 are disposed below the opaque portions of the mask and patterned light extraction areas 55 are disposed below the openings in the mask. According to some embodiments, spacing areas 54 may also be used for attaching other optical elements to light guide 800, such as, for example, light coupling elements disclosed in the '846 patent and '666 Publications or light guiding elements disclosed in the '423 Publication.

According to one embodiment, the arrangements and optical properties of individual light extraction features 8 may generally be the same or similar for each area 55. According to one embodiment, the arrangements and/or optical properties of individual light extraction features 8 may be the different for different areas 55. For example, the areal density, spatial distribution, color properties, sizes and/or shapes of light extraction features 8 may be made variable from one area 55 to another. More specifically, patterned light extraction areas 55 disposed at greater distances from a light input edge may generally have greater areal density of light extraction features 8 compared to patterned light extraction areas 55 disposed at smaller distances from the light input edge. Furthermore, the distribution density of light extraction features 8 within individual light extraction areas 55 may be increased with a distance from the light input edge.

According to one embodiment, one or more areas 55 may include a layer of photoluminescent or phosphor material. Such photoluminescent or phosphor material can be configured to absorb light in a first wavelength and re-emit light in a second wavelength which is different than the first wavelength. According to one embodiment, it may be preferred that the second wavelength is greater than the first wavelength. By way of example, such material can be configured to absorb at least a portion of blue light emitted by some types of LEDs and re-emit the energy of such blue light in another color or in the form of perceptibly white light.

Areas 55 may further incorporate color filters, inks, dyes or other devices or substances that change the color of the extracted light. It may also incorporate polarizing elements, fluorescent elements, light scattering or diffusing elements and the like, which may be provided as separate layers covering areas 55 or incorporated into the bulk material of light extraction features 8.

Patterned light extraction/light emitting areas 55 may include one or more shapes cut from a sheet of fluorescent material that converts shorter wavelength of light in the UV or visible spectrum into longer wavelengths in the visible range. Such sheet-form shapes may be laminated onto surface 11 or surface 12 of sheet 10 (or otherwise positioned in a close proximity and in front of one of such surfaces), covering respective areas 55, and configured to scatter light with fluorescent effect when illuminated with a light source. According to one embodiment, one or more such shapes can be printed on an optically transmissive (e.g., transparent or translucent) substrate, which can be laid on top of surface 11 or surface 12, and positioned in registration with areas 55.

By way of example and not limitation, the fluorescent material may be configured to convert 350 nm-400 nm UV light from a "black light" into visible wavelengths (e.g., 500 nm-600 nm). In another non-limiting example, the fluorescent material may be configured to convert 450 nm-495 nm visible (blue) light into visible wavelengths of longer wavelengths (e.g. cyan, magenta, yellow, orange, red, and/or green). Exemplary wavelength ranges of the converted light may include 490-520 nm, 500-530 nm, 560-590 nm, 520-560 nm, and 635-700 nm. According to one embodiment, areas 55 may include a first fluorescent material (e.g., yellow phosphor) having a first band gap and a second fluorescent material (e.g., red phosphor) having a second bandgap which is different than the first bandgap. These different-bandgap materials can be mixed together within individual light extraction features 8 or formed as separate layers on top of areas 55. Alternatively, different-bandgap materials can be distributed between different light extraction features 8.

According to one embodiment, separation areas 54 may include one or more shapes cut from a sheet of fluorescent material that converts shorter wavelength of light in the UV or visible spectrum into longer wavelengths in the visible range, e.g., as described above in reference to patterned light extraction/light emitting areas 55. Such shapes may cover only portions of the separation areas 54 or cover substantially entire separation areas 54. According to one embodiment, one or more such shapes can be laminated onto surface 11 or surface 12 of sheet 10 (or otherwise positioned in a close proximity and in front of one of the surfaces). According to one embodiment, one or more such shapes can be printed on an optically transmissive (e.g., transparent or translucent) substrate, which can be laid on top of surface 11 or surface 12, and positioned in registration with separation areas 54.

Different color-changing materials, such as color filters, inks, dyes or fluorescent particles may be included into patterned light extraction/light emitting areas 55 to provide different emission colors, e.g., as defined by the CMYK or RGB color spaces. According to one embodiment, these color changing materials may be mixed together to produce the desired color effect of the emission. According to one embodiment, these color changing materials may be distributed among different light extraction features 8 to achieve a similar color/visual effect.

In various implementations, color-changing materials may be used in conjunction with other optical materials that do not perceptible change colors (e.g., light-scattering, reflective or clear inks). According to one embodiment, color-changing materials may be mixed together with such non-color-changing materials in different proportions. For example, a color pigment or fluorescent material (e.g., phosphor) can be mixed with clear and light scattering materials (e.g., UV inks) and individual light extraction features 8 may be printed using the resulting ink. According to one embodiment, color-changing and non-color-changing materials may be provided as separate elements. For example, one or more light extraction/light emitting area 55 may include a first two-dimensional pattern of printed microdots of color-filtering or color-converting ink (which may include pigments or fluorescent particles suspended in a clear binder and may optionally include light scattering particles, such as submicron-sized $TiO_2$ crystals/particles) and a second two-dimensional pattern of printed microdots of light-scattering ink which is substantially free from the color-changing pigments or fluorescent particles.

The first and second two-dimensional patterns may overlap with each other, for example, such that at least some color-filtering or color-converting light extraction features 8 are alternating with light extraction features 8 that are substantially free from the color-changing pigments or fluorescent particles. The printed microdots of the second two-dimensional pattern may be configured to extract light without color filtering or conversion and emit light predominantly in a spectral range or spectrum that approximates the spectral range or spectrum of the emission of LEDs 2 (e.g., blue-color light). At the same time, the printed microdots of the first two-dimensional pattern may be configured to emit at least a portion of light in a spectral range that is different from that of LEDs 2 (e.g., cyan, magenta, yellow, green and/or red). The printed microdots of the first two-dimensional pattern may be configured to emit light in one spectral range, two distinct or overlapping spectral ranges, three distinct or overlapping spectral ranges, or distinct or overlapping spectral ranges or more than three distinct or overlapping spectral ranges. The printed microdots of the first two-dimensional pattern may be configured to emit at least some light in a spectral range or spectrum that approximates the spectral range or spectrum of LEDs 2.

According to one embodiment, both the first and second two-dimensional patterns may have a variable density of respective light extraction features 8 across the area of sheet 10 (e.g., with the spacing between individual light extraction features 8 decreasing with a distance from the light input edges of sheet 10). According to one embodiment, the rate of change in the density of light extraction features 8 within the first two-dimensional pattern may be different than the rate of change in the density of light extraction features 8 within the second two-dimensional pattern such that a ratio between the number of color-filtering/converting light extraction features 8 and non-color-filtering/converting light extraction features 8 per unit area is different for different locations of sheet 10.

According to an aspect of the embodiment of FIG. 5, surface 11 has light extracting areas (areas 55) that are alternating with spacing or separation areas (areas 54) in a repeating pattern. According to one embodiment, width $W_{54}$ can be made constant along the entire length of each individual separation area 54. According to one embodiment, width $W_{54}$ can be made variable along the length of the individual separation area 54. According to one embodiment, width $W_{54}$ may also differ from one separation area 54 to another.

According to one embodiment, each light extraction feature 8 may be formed by a relatively small dot (a microdot) of a highly diffusely reflective, light scattering material deposited to surface 11. The microdots may be distributed over surface 11 according to an ordered or random two-dimensional pattern. Suitable materials for light extraction features 8 may include white inks or paints having a nominal reflectance of at least 80% in the visual spectrum, preferably having at least 85% nominal reflectance, even more preferably at least 90% nominal reflectance, and still even more preferably at least 95% nominal reflectance. Light scattering dots may be formed by white inks that are radiation-curable (in particular, UV-curable), aqueous (water-based) or solvent-based. When LEDs 2 are configured to emit light in a particular wavelength range, the ink material should preferably have a nominal reflectance greater than 85%, 90% or 95% in that wavelength range.

The nominal reflectance of a material is directed to mean a total reflectance (e.g., a percentage of light striking a surface which is reflected off such surface) of the material when the material is provided at a sufficient "nominal" thickness to form a substantially opaque layer (e.g., having the opacity of above 90%). If a material is provided at a less than the nominal thickness (e. g, when the opacity of the respective layer is below 90%), the reflectance may generally be lower than the nominal reflectance. For example, the material used to produce the microdots forming individual light extraction features 8 may have a nominal reflectance of 85-95%, but the thickness of the reflective material in the microdot may be significantly less than the nominal thickness, such that the actual measurable reflectance of the microdots may be in the range from 35% to 65%.

According to one embodiment, individual light extraction features 8 may have a volume between 1 picoliter and 10 picoliters. According to one embodiment, individual light extraction features 8 may have a volume between 1 picoliter and 20 picoliters. According to one embodiment, individual light extraction features 8 may have a volume between 10 picoliters and 60 picoliters. According to one embodiment, each or at least some of individual light extraction features 8 may have a volume of about 1 picoliter. According to one embodiment, individual light extraction features 8 have a volume of about 3 picoliters. According to one embodiment, individual light extraction features 8 have a volume of about 4 picoliters. According to one embodiment, individual light extraction features 8 have a volume of about 5 picoliters. According to one embodiment, individual light extraction features 8 have a volume of about 10 picoliters.

The microdots forming light extraction features 8 may be printed on surface 11 using a flatbed or roll-to-roll material deposition printer, a UV printer, an ink-jet printer, a sublimation printer, or a screen printer, for example. According to one embodiment, the white ink may include nanoparticles of titanium dioxide, strontium sulfide, zinc sulphide, zink oxide, or other type of white, high-reflectance powder suspended in a liquid resin or suspension which viscosity is suitable for the selected type of surface deposition technique (e.g., UV printing). The nanoparticles may be formed by any type of a high-refractive-index material (preferably having n>1.6 and preferably having n>2) and may be configured to scatter light primarily using diffraction, at least in one preselected wavelength range. The high-refractive-index material should preferably be optically transmissive or even transparent at least at the thicknesses corresponding to the size of light-scattering particles. According to one embodiment, light extraction features 8 may include materials with specific color-filtering properties (e.g., pigmented inks or fluorescent inks) and can change the color of light.

According to one embodiment, the light-scattering microdots may be formed by a UV-curable ink that includes nanoparticles of optically transmissive, high-refractive-index material suspended in a translucent or, more preferably, highly transparent polymerizable binder material that has a significantly lower refractive index than that of the nanoparticles. According to one embodiment, the binder material has a refractive index between 1.5 and 1.6. Examples of the transparent polymerizable binder material binder materials include various acrylates and their derivatives (e.g., epoxy acrylates, polyurethane acrylates and polyester acrylates) obtained by reacting an acrylate with a suitable epoxide, urethane or polyester resins. In one embodiment, the binder material may also include a polyester resin or polyurethane resin mixed with a UV-polymerizable reagent. According to one embodiment, the binder material may include acryl acid ester (e.g., 40-60% by weight) and 1,6-Hexanediol diacrylate (e.g., 20-30% by weight).

According to one embodiment, at the time of printing (or otherwise deposition to a surface of light guide 800), the uncured ink should preferably have a viscosity in the range of 10 to 150 centipoise (cP). If the ink has a higher viscosity at room temperature (25° C.), it may be heated before surface deposition to bring the viscosity down to the prescribed range. According to one embodiment, the viscosity of the uncured ink at room temperature is between 10 cP and 30 cP. According to one embodiment, the viscosity of the uncured ink at room temperature is between 5 cP and 15 cP. According to one embodiment, the viscosity of the uncured ink at room temperature is from 5 cP to 25 cP.

According to one embodiment, light extraction features 8 may have phosphorescent or fluorescent properties. For example, the resin or suspension used to print light extraction features 8 on surface 11 may include a fluorescent material or phosphor that converts a shorter wavelength of light in the ultraviolet (UV) or visible spectrum into one or more longer wavelengths in the visible range. Such phosphorescent material can be configured to absorb light in a first wavelength and re-emit light in a second wavelength which is different than the first wavelength. According to one embodiment, it is preferred that the second wavelength is greater than the first wavelength. By way of example, the material may be configured to absorb at least a portion of blue light emitted by some types of LEDs and re-emit the energy of such blue light in the form of perceptibly white light.

Light extraction features 8 may be distributed over the designated area(s), e.g., patterned light extraction areas 55, according to an ordered or random pattern. According to one embodiment, such pattern may be formed by a two dimensional array of rows and columns. In one implementation, every other row or every other column may be shifted relatively to the adjacent rows or columns so as to form a staggered array or rows or columns. According to one embodiment, the positions of individual light extraction features 8 may be randomized within an otherwise ordered pattern. For example, the position of individual light extraction feature 8 may be slightly offset from the "ideal" position in a two-dimensional ordered pattern (such as an ordered array of rows and columns). In one implementation, the amount of the offset can be greater than one tenth of the longest or shortest dimension of light extraction features 8 but less than the respective dimension. In one implementation, the amount of the offset may be made greater than one tenth of the longest or shortest dimension of light extraction features 8 and less than one half of the spacing between adjacent light extraction features 8. Properly selecting the offset may be particularly critical in view of reducing the visibility of the light extraction pattern or its visual artefacts (such as moiré effect and the like).

According to one embodiment, light extraction features 8 may be distributed according to a high-density pattern and have a cumulative area that approximates the exposed area of surface 11. According to one embodiment, substantially the entire exposed area of surface 11 may be coated by a continuous layer of a semi-opaque light diffusing material, such as non-absorbing white ink or bulk scattering particles suspended in a polymeric material, for example. According to one embodiment, one or more areas 55 may be substantially covered with a continuous layer of a semi-opaque light diffusing material. According to an aspect, the fully coated area 55 may represent individual broad-area light extraction feature 8.

According to one embodiment, light extraction features 8 may be formed by a light scattering or light diffusing film that is attached to surface 11 in the respective areas (e.g., sections 55). Such film should preferably have a hemispherical reflectance of at least 85%, more preferably at least 90%, and still more preferably at least 95%.

LED chips or dies employed in LEDs 2 may be configured to emit a blue light. Light extraction features 8 may be configured to change the light emission spectrum upon interaction with blue light propagating in light guide 800. For example, a YAG phosphor may be employed in light extraction features 8 to convert such blue light to a white light (e.g., by converting a portion of the blue light into longer wavelengths). The phosphor material may be mixed with silicone or other encapsulation materials. Light extraction features 8 may be deposited directly to surface 11 in a liquid form, for example, by printing, spraying, dispensing, coating or other suitable liquid material deposition methods.

According to one embodiment, light extraction features 8 are formed by light-deflecting or light-diffusing surface microstructures formed in or on surface 11. The microstructures may include ordered or random surface relief features formed, for example, by means of etching, embossing, laser ablation, sanding, micromachining, micro-replication and any other method suitable for producing the desired surface texture or relief.

According to some embodiments, light extraction features 8 may be formed by micro-cavities formed in surface 11. Each micro-cavity may have the shape of a lens, a prism, a blind hole, or can be simply a microscopic discontinuity in surface 11 allowing some light to escape from light guide 800 in the respective location. The size of individual light extraction features may range from submicron sizes to several millimeters or more. According to one embodiment, the size of individual light extraction features 8 is between 1 micrometer and 25 micrometers. According to one embodiment, the size of individual light extraction features 8 is between 20 micrometers and 100 micrometers. According to one embodiment, the size of individual light extraction features 8 is between 40 micrometers and 100 micrometers. According to one embodiment, the size of individual light extraction features 8 is between 40 micrometers and 200 micrometers. According to one embodiment, the size of individual light extraction features 8 is between 100 micrometers and 1 millimeter. According to one embodiment, the size of individual light extraction features 8 may be made sufficiently small to be virtually invisible to a naked eye, and the spacing between individual features may be made sufficiently large (e.g., two or more times larger than the size of individual light extraction features 8) so that light guide 800 can have a substantially transparent appearance at least when non-illuminated and when viewed from a normal viewing direction.

According to one embodiment, light extraction features 8 may be formed in a separate film or thin-sheet material which can be then applied to surface 11 with a good optical contact and preferably with refractive index matching. For example, the points of optical contact between surface 11 and the film or thin-sheet material may be configured to frustrate TIR at those points of contact such that light can escape from waveguide 800 and enter the film or thin-sheet material, which, in turn. May be configured to further direct and scatter light. According to one embodiment, light extraction features 8 may be formed in surface 12. According to one embodiment, light extraction features 8 may be formed in both surfaces 11 and 12, for example, to enhance the light extraction rate without allowing individual light extraction features 8 to overlap or become too close to each other (e.g., to prevent light guide 800 to become completely opaque in appearance).

According to some embodiments, referring to FIG. 5, certain characteristics of light extraction features 8 or their two-dimensional pattern in one patterned light extraction area 55 may be different from those of another (e.g., adjacent) area 55. For example, the geometric patterns, relative areas occupied by light extraction features 8, the spacing between adjacent light extraction features 8, the size, shape, thickness, reflectance, absorption, color or fluorescent properties of various light extraction features 8 can be different in different parts of surface 11.

The properties of light extraction features 8 may also vary gradually across surfaces 11 and/or 12. According to one embodiment, light extraction features 8 of surface 11 may be formed by one type of light deflecting elements (e.g., by inkjet-printed microdots) while light extraction features 8 of surface 12 may be formed by a different type of light deflecting elements (e.g., by surface microstructures formed by microimprinting or hot embossing).

Light extraction features 8 are configured to progressively extract light propagating in sheet 10 and result in a substantially uniform light emission from either one or both surfaces 11 and 12. In order to achieve a uniform emission, the two-dimensional pattern of light extraction features 8 can have a variable spatial density in different areas. According to one embodiment, the density should increase with the distance from LEDs 2. The density gradient may be selected based on the size and thickness of sheet 10 and may be determined from optical raytracing or actual experiments with different-density patterns.

According to one embodiment, separation areas 54 may include light extraction features 8 having a much lower areal density compared to adjacent patterned light extraction areas 55. According to different embodiments, the areal density of light extraction features 8 in one or more separation areas 54 may be less than the areal density of light extraction features 8 in one or more patterned light extraction areas 55 by at least 10%, at least 20%, at least 30%, at least 50%, at least 2 times, at least 3 times, at least 5 times, or at least 10 times. The areal density of light extraction features may also vary within each of the areas 54 and 55 (preferably increasing with a distance from nearest LEDs 2).

According to some embodiments, various types of surface structures, such as light extraction features 8, may be formed in separation areas 54 for purposes other than (or in addition to) light extraction. For example, surface structures of a predetermined height may be formed in separation areas 54 to prevent unwanted optical contact of surfaces 11 and 12 (e.g., by maintaining a minimum spacing) with other optical layers (e.g., optical films), which may be disposed on the surfaces, thus preventing uncontrolled light escape from waveguide 800. More specifically, the height of the structures may be selected to prevent evanescent-wave coupling between waveguide 800 and an external optical substrate (e.g., a diffuser or protective plastic sheet). It may be appreciated by those skilled in optics, evanescent-wave coupling (or optical cross-talk) between two adjacent substrates depends on the refractive index of the substrates and a distance between the substrates. For light guide 800 formed from PMMA (acrylic) material, it may be preferred that the height of the structures is greater than $0.5\lambda$, greater than $0.8\lambda$, greater than X, greater than $2\lambda$, greater than $3\lambda$, or greater than $5\lambda$, where X is a wavelength of light emitted by LEDs 2 and propagating in light guide 800. More generally, it may be preferred that the height of the structures is greater than 0.6 µm, greater than 1 µm or greater than 2 µm.

A uniformity U of luminance of a broad-area surface of sheet 10 (e.g., surface 11 or surface 12) may be defined by the following relationship: $U=1-(L_{PEAK}-L_{AVG})/L_{AVG}$, where $L_{PEAK}$ is a peak luminance and $L_{AVG}$ is an average luminance characterizing the surface. The peak luminance may be measured using spot measurements at different locations of the respective broad-area surface using a spot luminance meter. The sampling area for spot measurements may be defined by a circular area characterized by a radius that is much smaller than the X and Y dimensions of light guide 800. A preferred size of the sampling area may also be defined by the characteristics of the measurement tool, the overall size of the panel or the intended application (for example, the anticipated viewing distance). In other words, the spot measurements should preferably have sufficient granularity to measure surface luminance variations across the light-emitting surface of light guide 800. According to one embodiment, the sampling area may be greater than 100 times the area of individual light extraction features 8 and less than $\frac{1}{10}^{th}$ of a length or width dimension of sheet 10. According to one embodiment, the sampling area may be greater than an area occupied by a group or cluster of light extraction features 8 including at least 10 individual light extraction features 8.

According to one embodiment, luminance uniformity U of light guide 800 (as measured at either one of surfaces 11 and 12) is at least 70%, more preferably at least 80%, even more preferably at least 85%, and yet even more preferably at least 90%. According to one embodiment, a difference between an average luminance of different patterned light extraction areas 55 is less than 30%, more preferably is less than 25%, even more preferably is less than 20%, even more preferably is less than 15%, and still even more preferably is less than 10%.

According to one embodiment, light guide 800 may be formed by two distinct light guiding layers which represent different optically transmissive sheets. According to different implementations, light extraction features 8 may be formed in one or both of the sheets (light guiding layers). According to one embodiment, light guide 800 may be formed by sheet 10 which is folded (e.g., using heat bending) at a midpoint and has light extraction features 8 formed in both flaps of the folded sheet 10.

It should be understood that light sources illuminating the light input edges (such as opposing edge surfaces 13 and 14) are not limited to light emitting diodes (LEDs) and may include any continuous or discrete light sources of any known type, including but not limited to: fluorescent lamps, incandescent lamps, cold-cathode or compact fluorescent lamps, halogen, mercury-vapor, sodium-vapor, metal halide, electroluminescent lamps or sources, field emission devices, lasers, etc. Each individual light source may have a linear configuration and include a single linear light-emitting element (e.g., a filament LED or highly elongated LED package) or a relatively small number of linear light-emitting elements. Each light source may also have two or more compact light emitting elements incorporated into a linear array. When the light source includes multiple light emitting elements, each of the light emitting elements may have a compact shape or an extended two-dimensional or one-dimensional (elongated) shape.

According to one embodiment, at least one of the light sources optically coupled to sheet 10 includes a laser source emitting a highly collimated beam of light. Suitable examples of a highly collimated beam include light beams having a full width at half-maximum (FWHM) divergence angle of less than 30°, less than 25° degrees, less than 20° degrees, less than 15° degrees, less than 10° degrees, and less than 5° degrees. According to one embodiment, at least one of the light sources optically coupled to sheet 10 includes an LED or laser source emitting a moderately collimated beam of light having a FWHM divergence angle of less than 60°, less than 50° or less than 45°. According to some embodiments, the above-referenced FWHM divergence angles may be defined and measured in a plane that is perpendicular to a prevalent plane of sheet 10 (e.g., in the YZ plane when light is input through edge surface 13).

LEDs 2 may be further associated with integrated or external optics such as collimating or light-redistributing lenses, mirrors, lens arrays, mirror arrays, light diffusers, waveguides, or optical fibers. When multiple light emitting elements are employed, each of the light emitting elements may be provided with individual optics. Alternatively, a single linear optic may be provided for the entire array to collimate light or otherwise shape the emitted beam in a plane which is perpendicular to the longitudinal axis of the array.

Light guide illumination system 900 may include a cover of housing configured to encase LEDs 2 and optionally portions of sheet 10 adjacent to the light input edge(s). Such housing may have different functions including but not limited to structural, protective (from dust, moisture, elements, impact, etc.) and/or aesthetic. According to one embodiment, the housing can be made from a heat-conductive material (e.g., aluminum) which extends over a portion ow sheet 10. LEDs 2 may be affixed to the heat-conductive housing using fasteners or heat-conductive adhesive.

The overall dimensions of wide-area light guide illumination system 900, the size and shape of sheet 10, the types of LEDs 2 as well as their number, spacing and nominal power may be selected based on the target application. According to one embodiment, light guide illumination system 900 may be configured as a flat-panel lighting luminaire. The lighting panel may be formed into curved shapes and curved-shape luminaires, e.g., as described in any of the '972, '097, '841, and '538 patents. According to another embodiment, it may be configured as a backlight of an LCD display. According to a yet another embodiment, it may be configured as an illuminated sign, artwork or image print or as a backlight for such devices. According to a yet another embodiment, it may be configured as an illumination system (e.g., backlight or planar-panel light) for a planar panel photobioreactor.

Patterned light extraction areas 55 may have different rectangular shapes and arranged on surface 11 according to a different pattern compared to those of FIG. 5. Furthermore, light extraction pattern 101 may include a mix of different shapes and sizes of areas 54 and 55. This is further illustrated in FIG. 6, which schematically depicts various exemplary geometrical configurations of areas 55 within light extraction pattern 101 and also schematically depicts other exemplary dimensions and arrangements of LEDs 2.

Figure 7:
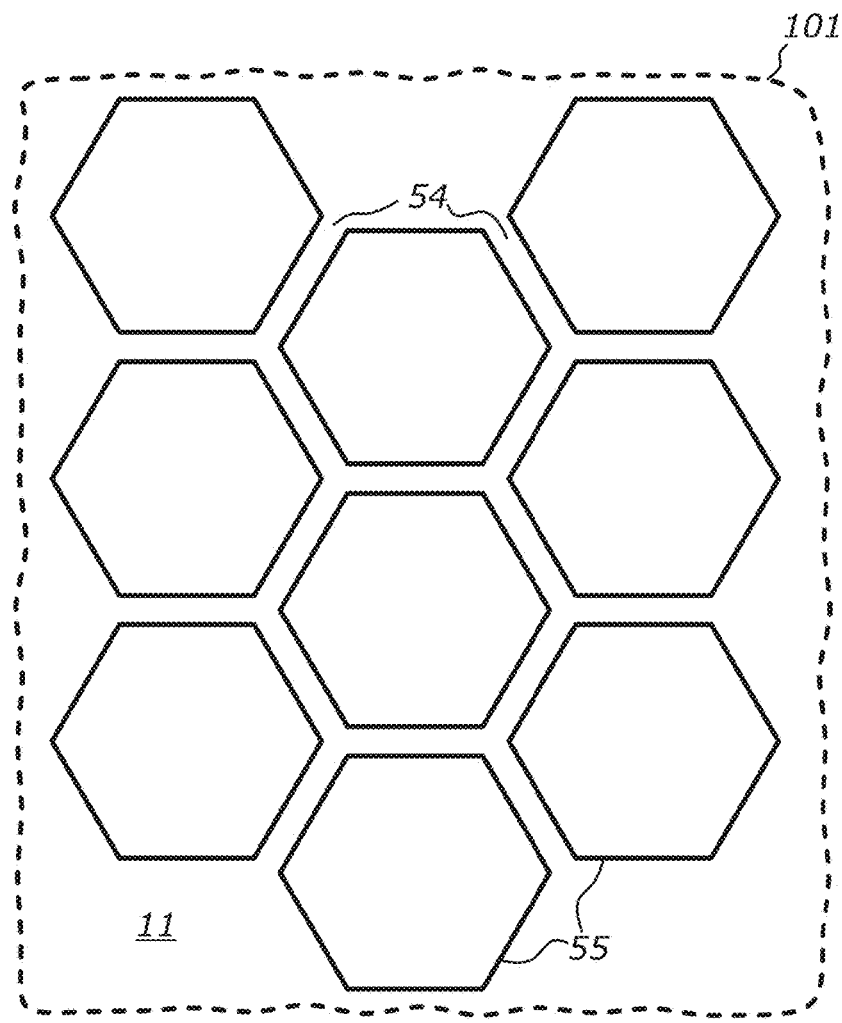
FIG. 7 is a schematic view of portion of a wide-area light guide illumination system, showing a two-dimensional array of hexagonal light extracting sections distributed over an area of a light guiding sheet, according to at least one embodiment of the present invention.

According to one embodiment, each area 55 may have a hexagonal shape. An exemplary arrangement of such hexagonal areas 55 within light extraction pattern 101 is schematically shown in FIG. 7. It should be understood that the depicted pattern of hexagonal (or other-shaped) patterned light extraction areas 55 may extend continuously over broad-area surface 11 both longitudinally and laterally (along the X and Y directions) to cover sufficiently large areas. The sizes and density of light extraction features 8 within each hexagonal area 55 may be selected such that an average luminance of different parts of pattern 101 is about the same or similar, e.g., within 20% of the average luminance produced by the entire patterned surface of sheet 10.

According to one embodiment, LEDs 2 may include individually digitally addressable RGB or RGBW (e.g., red-green-blue-white) LEDs. Such individually digitally addressable LEDs 2 may be selectively turned on and off or dimmed to illuminate select areas of stepped light guide illumination system 900 in different brightness and/or color.

According to one embodiment, individual light extraction features 8 or groups of light extraction features 8 can be made individually controllable and dynamically changing their color or light extraction properties in response to an external factor or signal (e.g., supplied voltage, magnetic field, electric field, static electricity, illumination by an external source of light, mechanical or optical contact with an external object, etc.). Such individually controllable light extraction features 8 or groups may be selectively turned on and off or dimmed to illuminate select areas of light guide illumination system 900 in different brightness and/or color.

According to one embodiment, individual areas 55 may be configured and individually controlled as individual "pixels" within a large illuminated LED display. Such LED display may incorporate hundreds and thousands of areas 55. For example, each pixel including a single individually controllable area 55 may have a size from 0.5 mm to 5 mm or from 1 mm to 10 mm.

Figure 8:
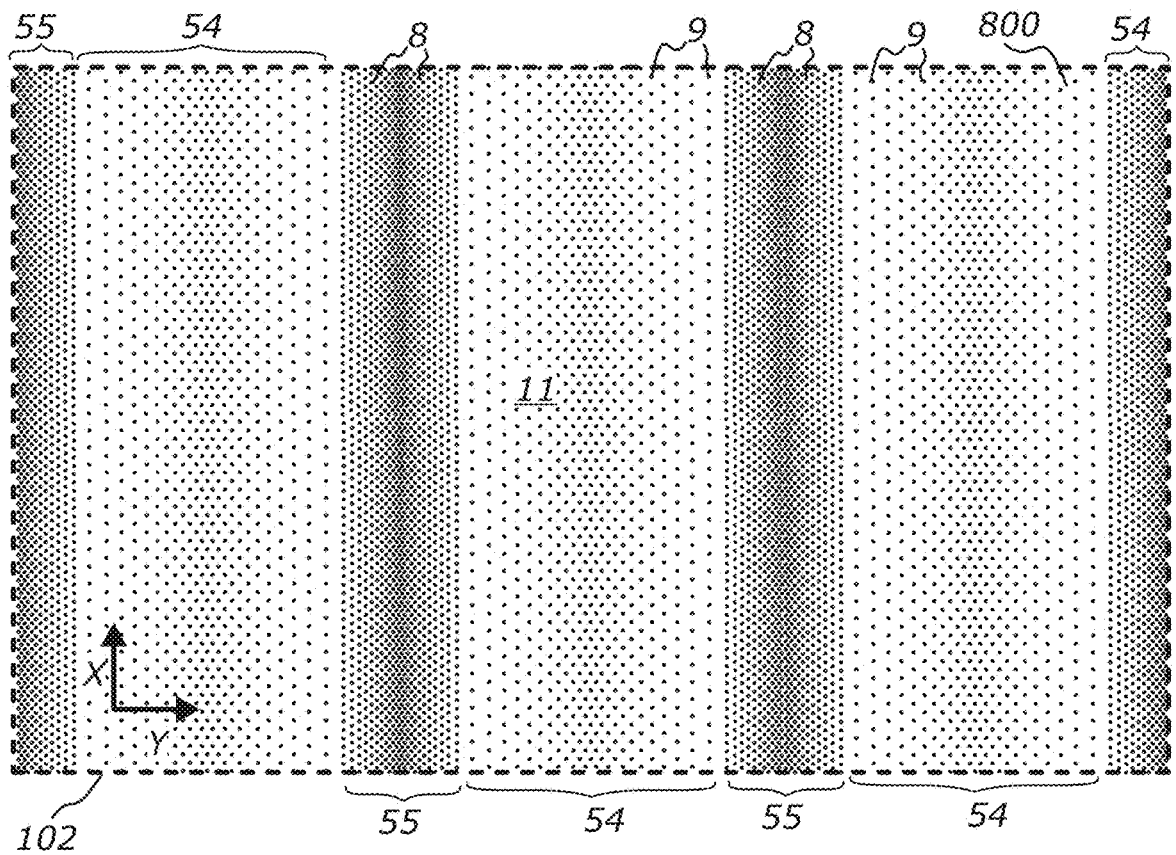
FIG. 8 is a schematic view showing an exemplary variable-density distribution pattern of light extraction features for a portion of a wide-area light guide illumination system, according to at least one embodiment of the present invention.

FIG. 8 schematically illustrates an exemplary light extraction pattern 102 including light extraction features 8 formed in patterned light extraction areas 55 and light extraction features 9 formed in separation areas 54 that are alternating with areas 55 along the Y axis. The areal density of light extraction features 9 within areas 54 of pattern 102 is much lower than the areal density of light extraction features 8 within areas 55 of the pattern. The spatial distributions of light extraction features 8 within each area 55 has a variable density. At least some areas 55 have a positive gradient of the areal density towards a central axis. Similarly, the spatial distributions of light extraction features 9 within each area 54 has a variable density with a positive gradient of the areal density towards a central axis. The areal density of light extraction features 8 and/or 9 may be expressed, for example, in terms of the number of respective light extraction features per unit area. According to an aspect, light extraction pattern 102 includes alternating bands having different areal densities of light extraction features 8 and 9. Furthermore, the areal density is variable within each band. According to one embodiment, the areal density within each of areas 55 and 54 may have a positive gradient along a light propagation path (e.g. a light path from LEDs 2 coupled to a nearest light input edge). Furthermore, an average areal density may increase from one area 55 to another area 55 and/or from one area 54 to another area 54 along the light propagation path.

A relative surface area of light extraction features 8 and/or 9 at any particular location of surface 11 and/or surface 12 may be defined as a sum of the individual areas of light extraction features 8 and/or 9 within a selected sampling area divided by the total area of the sampling area. For example, a relative surface area of 0.5 correspond to one-half of the respective sampling area being cumulatively occupied by the light extraction features (50% areal coverage). A relative surface area equal to one means that the light extraction features occupy 100% of the sampling area, with no spaces between adjacent light extraction features. Depending on the size and shape of individual light extraction features, the spatial density and relative surface area may be bound by various predefined relationships.

According to one embodiment, light extraction patterns of features 8 and/or 9 are characterized by spacing distances SPD which progressively decrease with a distance from LEDs 2 at least within some sampling areas. The sampling areas may be taken at any locations of patterned light extraction areas 55 or separation areas 54. According to one embodiment, spacing distances SPD progressively decrease with a distance from LEDs 2 within at least some sampling areas. According to one embodiment, the light extraction patterns of light extraction features 8 and/or 9 are characterized by spacing distances SPD which progressively decrease with a distance from LEDs 2 within at least a first sampling area and progressively increase with a distance from LEDs 2 within at least a second sampling area that is different from the first sampling area.

According to one embodiment, spacing distances SPD progressively decrease with a distance from LEDs 2 within at least some patterned light extraction areas 55. According to one embodiment, a first average spacing distance SPD characterizing a first patterned light extraction area 55 located at a first distance from a light input edge (e.g., edge surface 13) is greater than a second average spacing distance SPD characterizing a second patterned light extraction area 55 located at a second distance from a light input edge, which is greater than the first distance. According to different embodiments, a difference between the first and second average spacing distances SPD spacing can be at least 10%, at least 20%, at least 30%, at least 40%, at least 50%, or at least 100%.

FIG. 8 illustrates varying the spatial density of light extraction features 8 and 9 (and, hence, varying the relative area occupied by light extraction features 8 and 9) by varying the spacing between individual light extraction features. However, it should be understood than the relative area may also be varied by varying the size of individual features 8 and/or 9, even at a constant spacing. For example, increasing the area of each light extraction feature 8 or 9 by two times within a particular sampling area will increase the relative area of such features within the sampling area by two times.

According to one embodiment, LEDs 2 may be side-emitting LEDs. In some implementations, the side-emitting LEDs may be attached directly to surface 11 or 12 of sheet 10 (e.g. glued using a two-sided adhesive transfer tape). Examples of side emitting LEDs that may be suitable for LEDs 2 include but are not limited to Micro SIDELED product series commercially available from OSRAM (e.g., LW Y87C, CUW Y3SH.B1 and LW Y1SG models of white LEDs or LB Y8SG model of blue LEDs) or models NS2W364G and NS2W266G of white side-emitting LEDs manufactured by Nichia.

Figure 6:
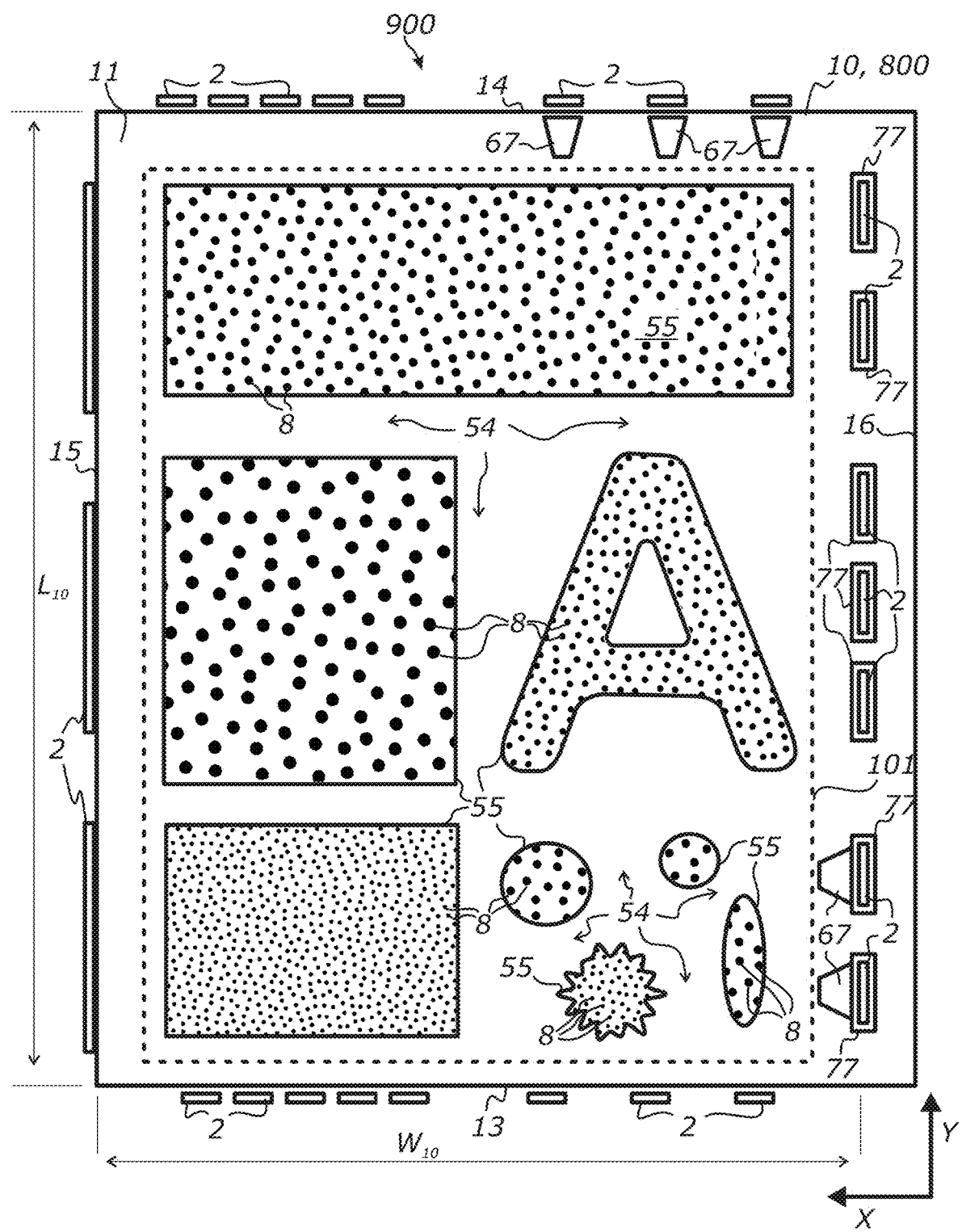
FIG. 6 is a schematic plan view of a wide-area light guide illumination system, showing an exemplary alternative arrangement of individual light extraction areas and separation areas of a light extraction pattern, according to at least one embodiment of the present invention.

Light can be injected/coupled into light guide/waveguide 800 not only through outer perimeter edges (e.g., edge surfaces 13, 14, 15, and 16), but also through any of surfaces 11 and 12 or inner edges which may be formed between the outer perimeter edges. According to one embodiment, sheet 10 may include a number of cutouts 77 (FIG. 6). At least some of top-emitting or side-emitting LEDs 2 may be inserted into respective cutouts 77 and optically coupled to one or more edges of the cutouts to illuminate waveguide 800 from the inside through those edges. According to one embodiment, side-emitting LEDs 2 may be provided on a rigid heat-spreading PCB substrate. According to one embodiment, side-emitting LEDs 2 may be provided on a flexible heat-spreading PCB substrate. The PCB substrate may be bonded to light guiding sheet 10. The PCB substrate may also be bonded to a support substrate disposed behind light guiding sheet 10. The support substrate may be coextensive with light guiding sheet 10. Suitable examples of such support substrates include but are not limited to a reflector sheet, transparent or translucent glass or plastic sheet, or a structural members such as aluminum extrusion.

Cutouts 77 may take the form of parallel channels or rectangular cavities aligned along an edge of sheet 10 (e.g. edge 16), see FIG. 6). At least some of the channels or rectangular cavities may also be located between patterned light extraction areas 55 (e.g., in separation areas 54), see, e.g., FIGS. 1-6 of the '423 Publication. Cutouts 77 may also take the form of discrete round openings in light guiding sheet 10 (waveguide 800) appropriately dimensioned to accommodate the size of individual side-emitting LED 2 (e.g., as disclosed in U.S. Pat. No. 9,256,007 in reference to FIGS. 35, 36A and 37B). For LEDs 2 having elongated rectangular shapes, cutouts 77 may have elongated rectangular shapes/outlines and may have slightly larger dimensions than the respective dimensions of the bodies of LEDs 2 (e.g., to accommodate the insertion of LEDs 2 into the cutouts). Cutouts 77 may be separated from each other and from edges of light guiding sheet 10 by portions of broad-area surfaces 11 and/or 12. According to an aspect, cutouts 77 may be exemplified by through holes formed in light guiding sheet 10 in selected locations. The through holes may be of a rectangular shape (with sharp or rounded corners), round shape, elongated oval shapes or other shapes (e.g., free-forms) and may likewise be dimensioned to accommodate the respective dimensions and shapes of LEDs 2. Cutouts 77 may also be configured to assist in positioning LEDs 2 relatively to sheet 10 and facilitate optical coupling (e.g., by preventing lateral and transversal shifting of sheet 10 and LEDs 2 relatively to each other).

Referring further to FIG. 6, sheet 10 may include light coupling elements 67 which may also be referred to as light couplers or light injectors. According to some embodiments, light coupling elements 67 may be exemplified by sheets 20 or optical couplers 88 of the '423 Publication, optical elements 6 of the '846 patent, and/or light coupling elements 2 of the '666 Publication. Light coupling elements 67 (along with respective LEDs 2) may be provided outside light extraction pattern 101 or inside light extraction pattern 101. Light coupling elements 67 (along with respective LEDs 2) may be provided at outer perimeter edges of sheet 10, at its inner edges (e.g., adjacent to cutouts 77) or at any locations of surfaces 11 and 12, including patterned light extraction areas 55 and separation areas 54.

It is noted that the embodiments of wide-area light guide illumination system 900 described herein may also be adapted to using many different types and form factors of side-emitting or top-emitting LEDs and may further be adapted to many different types, shapes (e.g., square, round or rectangular), configurations and architectures of LEDs, also including packageless LEDs, for example. Furthermore, non-LED light sources can be used in place of LEDs 2, such as, for example, lasers, fluorescent lamps, incandescent lamps, gas-discharge lamps, and OLEDs. LEDs 2 may incorporate LED arrays or arrays of LED die assembled within a single package. Suitable examples of such LEDs as well as related methods of LED coupling to light guides (waveguides) are disclosed, for example, in the '666 Publication. Additional exemplary embodiments of LEDs and light coupling structures that can be used to input light into light guide 800 are disclosed in the '423 Publication. "Example 1" in the '423 Publication further discloses an exemplary configuration of light extraction patterns for obtaining a substantially uniform light emission from the entire light emitting area of a planar-type light guide, which can be applied for patterning light guide 800 of this invention, according to at least some embodiments.

Figure 9:
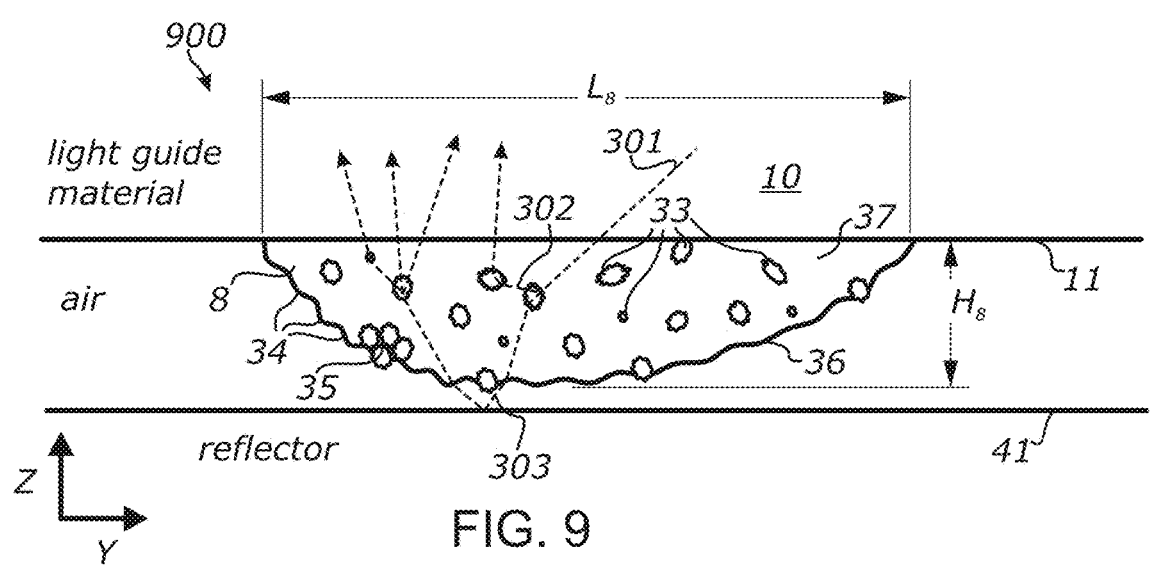
FIG. 9 is a schematic section view of a portion of a wide-area light guide illumination system, showing an irregularly shaped light extraction feature formed on a surface of a light guide, according to at least one embodiment of the present invention.

FIG. 9 schematically depicts a portion of light guiding sheet 10 and individual light extraction feature 8 exemplified by a fully-cured, solidified drop (microdot) of a UV-curable ink deposited to surface 11. It is noted that the illustrative example of FIG. 9 may also be applied to configuring light extraction features 9 discussed above and may further be applied to embodiments in which light extraction features 8 and/or 9 are formed in surface 12.

Referring FIG. 9, the UV-curable ink forming respective light extraction feature 8 includes a highly transparent, UV-reactive binder 37 and a suspension of high-refractive-index, light-scattering particles 33. A suitable example of light-scattering particles 33 having a high refractive index includes submicron-sized particles of titanium dioxide. Particles 33 are about evenly distributed throughout the volume of UV-reactive binder 37 and provide volumetric bulk scattering properties for light extraction feature 8. Some particles 33 may form agglomerates 35 in which a number of particles 33 may be disposed in contact with each other or at a very close distance to one another. Such distance can be much smaller than the average distance between individual particles 33 in binder 37. Agglomerates 35 may form two- or three-dimensional structures that have sizes from a fraction of the micrometer to several micrometers. Light-scattering particles 33 may be randomly varied in size within a single light extraction feature 8. Furthermore, any individual light extraction feature 8 may include a number of randomly formed agglomerates 35 that represent localized regions of increased density of light-scattering particles compared to surrounding areas. According to one embodiment, at least some of light scattering particles 33 include one or more fluorescent materials. Fluorescent materials may also be mixed with non-fluorescent (e.g., color filtering or light scattering) materials in various proportions, e.g., 10%:90%, 50%:50%, or 90%:10%.

According to one embodiment, light extraction feature 8 of FIG. 9 may have an irregular elongated shape having a length $L_8$ and a maximum height $H_8$. Maximum height $H_8$ may also be referred to as a maximum thickness of light extraction feature 8. A transverse width of the elongated light extraction feature 8 may be 1.2 times, 1.5 times, 2 times, 2.5 times, 3 times, 5 times or 10 times less than length $L_8$. An aspect ratio (length to width ratio) may vary randomly from one light extraction feature 8 to another. According to one embodiment, elongated light extraction features 8 may be arranged in groups having generally the same orientation of a longitudinal axis. In one embodiment, the orientations of elongated light extraction features 8 may be random within a predefined angular range. The angular range may be 10 degrees, 30 degrees, 45 degrees, 60 degrees, 90 degrees, 180 degrees, and 360 degrees (e.g., a completely random orientation).

A surface 36 of light extraction feature 8 that is exposed to air has a microstructured surface including random microstructures 34. Microstructures 34 produce a non-negligible surface roughness that is much greater than the roughness of surface 11 and that contributes to refractive or diffractive light scattering or dispersion produced by light extraction feature 8. The surface roughness may be characterized according to an American National Standard ASME B46.1-2009.

The surface roughness may be selected to maximize the diffractive light scattering operation of light extraction feature 8. According to different embodiments, an RMS surface roughness parameter $R_q$ of surface 36 is greater than 30 nanometers, greater than 40 nanometers, greater than 60 nanometers, approximately equal to or greater than 100 nanometers, and approximately equal to or greater than 200 nanometers. At the same time, it may be preferred that the RMS surface roughness parameter $R_q$ of surface 36 measured along the same sampling length is one of the following: less than 1 micrometer, less than 0.5 micrometers, and less than or equal to 0.3 micrometers.

Figure 10:
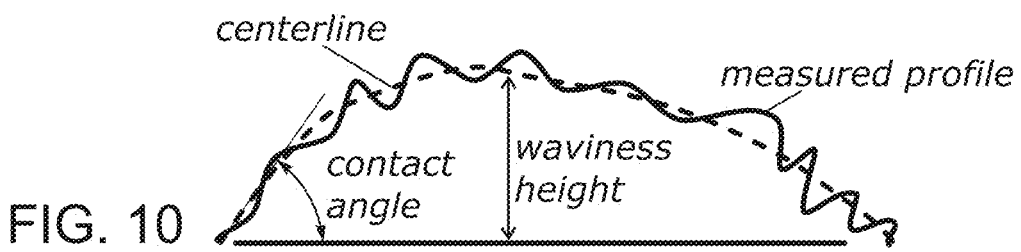
FIG. 10 is a schematic surface profile illustrating exemplary measurements of a surface waviness and a contact angle, according to at least one embodiment of the present invention.

According to different embodiments, the parameter $R_q$ can be measured along one of the following sampling lengths: 10 micrometers to 20 micrometers, 20 micrometers and 40 micrometers, 20 micrometers to 100 micrometers, and 5 micrometers to 200 micrometers. When measuring the roughness of surface 36, the profile waviness that characterizes the shape of surface 36 should normally be subtracted before evaluating $R_q$. The definition of surface waviness is illustrated in FIG. 10 which shows a surface profile (as it may be measured by a surface profilometer, for example) and a centerline characterizing the overall shape of the object and which should be subtracted from the measured profile to determine parameter $R_q$.

The surface waviness may be customarily subtracted by high-pass filtering with a cut-off wavelength $\lambda_f$ (see e.g., ASME B46.1-2009). The cut-off wavelength $\lambda_f$ should be at least 5 to 10 times less than the sampling length. On the other hand, the cut-off wavelength $\lambda_f$ should be at least several micrometers, for example, 2 to 5 micrometers or 5 to 20 micrometers. The upper limits for cut-off wavelength $\lambda_f$ may also be defined by the size of light extraction feature 8. For example, cut-off wavelength $\lambda_f$ may be set to at most the length $L_8$ or one-half of the length $L_8$.

According to one embodiment, the parameter $R_q$ of surface 11 should be less than 25 nanometers, more preferably less than 20 nanometers, even more preferably less than 15 nanometers and still even more preferably less than or equal to 10 nanometers. The measurements of parameter $R_q$ of surface 11 may be performed in a vicinity of light extraction feature 8. The measurements should preferably utilize the same or similar sampling length as that used for measuring $R_q$ of surface 36. According to one embodiment, the parameter $R_q$ of surface 11 should be performed along a direction that is perpendicular to a light input edge (e.g., perpendicular to edge surface 13).

According to some embodiments, the size of light extraction feature 8 may range from 10 micrometers to 200 micrometers, from 30 to 150 micrometers, from 30 to 80 micrometers or from 100 to 500 micrometers in the longest dimension. According to different embodiments, the volume of at least some of printed microdots forming individual light extraction feature 8 may range from 1,000 cubic micrometers to 10,000 cubic micrometers, from 1,000 cubic micrometers to 100,000 cubic micrometers, from 10,000 cubic micrometers to 100,000 cubic micrometers, from 20,000 cubic micrometers to 80,000 cubic micrometers, and from 30,000 cubic micrometers to 60,000 cubic micrometers. According to one embodiment, the volume of at least some of individual printed microdots is about 4,000 cubic micrometers. According to one embodiment, the volume of at least some of individual printed microdots is between 15,000 cubic micrometers and 20,000 cubic micrometers. According to one embodiment, the volume of each light extraction feature 8 formed by one or more printed microdots is between 2,000 cubic micrometers and 6,000 cubic micrometers.

The size of individual random surface microstructures 34 may range from several nanometers to several micrometers. According to a preferred embodiment, microstructures 34 may have sizes of less than 0.5 microns. According to one embodiment, at least some microstructures 34 may have top portions that can be approximated by spherical shapes having a radius of curvature between 50 nanometers to 200 nanometers.

According to one embodiment, each light extraction feature 8 may include a generally opaque material (e.g., white pigment) but at such a low thickness that the light extraction feature 8 is semi-opaque, non-absorbing and transmits at least a portion of light impinging on it. The term "non-absorbing", in reference to opaque or semi-opaque layers of various materials used for making light extraction features 8 or 9, such as white pigment inks, for example, is directed to mean that the respective layer(s) do not perceptibly absorb light. For instance, an exemplary non-absorbing layer may be formed by an optically clear resin loaded with submicron $TiO_2$ particles at 10-20% concentration (by weight). The non-absorbing layer may have a relatively low thickness between about 1 micrometer and 10 micrometers. Due to the low thickness and the presence of submicron $TiO_2$ particles, the layer can be configured to partially reflect light and partially transmit light without perceptible absorption. Accordingly, the sum of a total reflected light energy $E_R$ and a total transmitted light energy $E_T$ can be equal (preferably within 1%-5% error) to a total light energy $E_0$ incident onto the non-absorbing layer ($E_0 = E_R + E_T$). According to different embodiments, the absorption within the semi-opaque material at a thickness equivalent to the average thickness of light extraction features 8 and/or 9 is less than 5%, more preferably less than 3%, even more preferably less than 2% and still even more preferably less than 1%.

As employed in the present specification and claims, the term "opacity" refers to the extent to which a surface, an object or a layer of a material impedes the transmission of light through it. For example, a layer or surface that completely prevents light passage is considered completely opaque and having a 100% opacity. In contrast, a layer or surface that transmits essentially all of the incident light is considered having a 0% opacity. Accordingly, a layer or surface that transmits one-half of the incident light is considered having a 50% opacity. Light extraction features 8 and/or 9 may have a relatively high degree of opacity (e.g., 30%, 50%, 60%, 70%, 80%) and, at the same time, can be substantially non-absorbing (e.g., the sum of the energy of the transmitted and reflected light can be approximately equal to the energy of the incident light).

For a partially opaque (semi-opaque) surface or layer which is also reflective and non-absorbing, the opacity may be defined and measured as a ratio of the reflectance of the surface or layer against a light absorbing background surface to its reflectance against a highly reflective background surface, at least according to some embodiments. The light absorbing background surface should preferably have <5% reflectance and even more preferably <3% reflectance. The highly reflective backing surface should preferably have a hemispherical reflectance of at least 89%, more preferably at least 95% and even more preferably 98-99%. The highly reflective backing surface may be specularly reflecting, diffusely reflecting or reflect light both specularly and diffusely.

In an alternative, according to some embodiments, the opacity may be measured using standard techniques, such as those described in ASTM D1746-15 or ASTM D589-97 documents and using a suitable standardized opacity meter. When it is impossible to directly measure the opacity of individual semi-opaque light extraction features 8 or 9 (e.g., due to their small size), the measurements may be performed indirectly using a broad-area layer of the same semi-opaque material deposited to a transparent substrate with a uniform thickness corresponding to a weighted average thickness of the material in the individual light extraction features 8 and/or 9. For example, if a weighted average thickness of the semi-opaque light extraction features is 8 micrometers (as measured, for instance, by a 3D microscope or a profilometer), a transparent substrate may be coated with a uniform 8-micrometer-thick layer of the same (or very similar) material, and the opacity measurements may be performed for that layer in order to characterize the opacity of the light extraction features 8.

In a further alternative, the opacity may be expressed and measured in terms of light attenuation by the material of light extraction features 8 and/or 9. More specifically, the opacity may be defined by the following expression: 100% $(1-I_T/I_0)$, where $I_0$ is the intensity of light incident onto the semi-opaque layer of light extraction feature and $I_T$ is the intensity of light that is transmitted through the semi-opaque layer. According to one embodiment, the opacity and/or reflectivity of the semi-opaque layers may be measured and/or compared in accordance with one or more other applicable standards, such as, for example, ISO 2814, ISO 6504, BS 3900-D4, BS 3900-D7, ASTM E97, ASTM E1347, ASTM D4214, ASTM D2805, and ASTM D589.

For the purpose of characterizing and configuring light extraction features 8 and/or 9, the opacity may provide a useful measure of the fraction of light impinging onto such light extraction features from the side of light guiding sheet 10 that can be emitted from the other side of the light extraction features (e.g., away from surface 11 when features 8 and/or 9 are formed in that surface).

According to one embodiment, referring to FIG. 9, a desired opacity of light extraction feature 8 may be provided by scattering visible light in all directions in a tree-dimensional space using relatively transparent particles 33 volumetrically distributed within the bulk of binder material 37. Preferred mechanisms for scattering light using such particles and without perceptible absorption include refraction, diffraction, reflection or a combination thereof.

According to one embodiment, light scattering particles 33 suspended in binder material 37 may be formed by spherically shaped nanoparticles of a relatively transparent material having a very high index of refraction (n≥2). Suitable exemplary materials particularly include but are not limited to inorganic white pigments such as rutile or Anatase titanium dioxide (n=2.5-2.8), antimony oxide (n=2.1-2.3), Zinc Oxide (n≈2), white lead (basic lead carbonate, n=1.9-2.1), and lithopone (n=1.8). Alternatively, other inorganic materials or polymers having moderately high refractive indices (about 1.6 or greater) may also be used, including particularly magnesium silicate, baryte, calcium carbonate, calcium carbonate, polystyrene, or polycarbonate.

The sizes of particles 33 may be selected to maximize light scattering in a particular range of wavelengths (e.g., visible wavelengths centered around 0.5 micrometers). Suitable sizes of particles 33 to maximize diffraction can be calculated, for example, using the principles of Mie theory of light scattering. According to one embodiment, an average size of particles 33 is about 200 nanometers. According to one embodiment, an average size of particles 33 is about 250 nanometers. According to one embodiment, an average size of particles 33 is between 100 nanometers and 400 nanometers. According to one embodiment, the size of particles 33 is between 150 nanometers and 350 nanometers.

Two or more different sizes (or size distributions) of particles 33 can also be mixed within the material of the ink used to produce light extraction features 8. Such mixing may be directed to maximize light scattering at two or more different wavelength ranges. These different wavelength ranges may be non-overlapping (e.g., 400-450 nm and 570-590 nm) or overlapping (e.g., 400-550 nm and 450-600 nm).

The concentration of particles 33 in binder material 37 may vary in a broad range. According to a preferred embodiment, the concentration of particles 33 (pigment loading) is between 5% and 35% by weight or volume in the respective ink material used to produce light extraction features 8. According to one embodiment, the concentration is between 30% and 50% by weight. According to one embodiment, the concentration is between 5% and 25% by weight. According to one embodiment, the concentration is between 10% and 20% by weight. According to one embodiment, the concentration is from 1% to 5% by weight. According to one embodiment, the concentration may be less than 1% by weight.

According to some embodiments, light extraction features 8 and/or 9 may be substantially non-absorbing and may have an opacity of at least 10%, at least 20%, at least 30%, at least 40% or at least 50%. According to some embodiments, the opacity of at least some individual light extraction features 8 and/or 9 is less than 90%, approximately equal to or less than 80%, approximately equal to or less than 70%, or approximately equal to or less than 50%. According to one embodiment, the opacity of individual light extraction features 8 is between 30% and 70%. According to one embodiment, the optical transmittance of non-absorbing, semi-opaque light extraction features 8 is one of the following: greater than 10%, greater than 20%, greater than 30%, greater than 40% and equal to or greater than 50%.

According to one embodiment, the opacity of the material forming light extraction features 8 (e.g., white or fluorescent UV-curable ink) is between 40% and 70% when measured at a layer thickness of 10 micrometers or less. According to alternative embodiments, the opacity is between 30% and 50% when measured at a layer thickness of 0.5 micrometers to 5 micrometers, 1 micrometer to 2 micrometers, or 1 micrometer to 6 micrometers.

A further useful measure of the opacity of light extraction features 8 and/or 9 and a measure of the ability of light guiding sheet 10 to emit light from both sides (e.g., from both opposing surfaces 11 and 12) is a luminance ratio between the respective opposing surfaces. For example, let's consider an embodiments of wide-area illumination system 900 in which light extraction features 8 are formed by printing microscopic opaque or semi-opaque white-ink dots on surface 11. In an illustrative, non-limiting example, when light guiding sheet 10 is patterned with light extraction features 8 and illuminated from one or two edges by LEDs 2, an average measured surface brightness of surface 11 may be about 4,500 cd/m² while an average measured surface luminance of surface 12 may be about 1,500 cd/m², thus giving a 3 to 1 ratio. In other words, light guiding sheet 10 will emit about 75% of light from surface 11 and about 25% from opposing surface 12. For the purpose of determining the opacity and/or light transmittance of light extraction features 8 and/or 9 using this method, the surface luminance should preferably be measured from a perpendicular direction with respect to surfaces 11 and/or 12.

According to one embodiment, the opacity, light transmittance and light scattering properties of light extraction features 8 are configured such that each of surfaces 11 and 12 outputs 30% to 70% of the total light emitted by sheet 10 through surfaces 11 and 12. In other words, surface 11 may be configured to output no less than 30% of the total light energy emitted from sheet 10 as a result of light extraction by light extraction features 8, and, at the same time, surface 12 may also be configured to output no less than 30% of the total light energy emitted from sheet 10 as a result of such light extraction. According to different embodiments, the approximately proportions between light output from surfaces 11 and 12 may be 30%:70%, 35%:65%, 40%:60%, 45%:55%, 50%:50%, 55%:45%, 60%:40%, 65%:35%, 70%:30%, or any ranges in between.

According to some embodiments, the opacity of light extraction features 8 may be selected such that the ratios between the measured luminance of surfaces 11 and 12 are about 1:1 (about equal surface luminance of surfaces 11 and 12), 1.1:1, 1.2:1, 1.3:1, 1.4:1, 1.5:1, 1.6:1, 1.7:1, 1.8:1, 1.9:1, 2:1, 3:1, 3.5:1, 4:1, 4.5:1, and 5:1. According to some embodiments, the opacity of light extraction features 8 may be selected such that the ratio between the measured total output from surface 11 and surface 12 is about 1:1 (about equal amounts of light are emitted from both surfaces), 1.1:1, 1.2:1, 1.3:1, 1.4:1, 1.5:1, 1.6:1, 1.7:1, 1.8:1, 1.9:1, 2:1, 3:1, 3.5:1, 4:1, 4.5:1, and 5:1. Such configurations with two-sided light output may be advantageously selected, for example, for applications that will benefit from direct/indirect illumination. Furthermore, configurations of systems 900 with semi-opaque light extraction features 8 may be advantageously selected for applications which could benefit from the smallest size and/or thickness of the light extraction features and which require that the light extraction pattern is virtually invisible to a naked eye at relatively close viewing distances.

It is noted that the use of semi-opaque light extraction features is not limited to the cases of two-sided illumination. FIG. 9 further illustrates the operation of system 900 when semi-opaque, substantially non-absorbing light extraction feature 8 is used together with a reflective back sheet. Reflective sheet 41 should preferably have a specular or diffuse hemispherical reflectance of at least 80%, more preferably 85-90%, and even more preferably 90-98%.

In operation, a light ray 301 exemplifies light that is extracted-decoupled from light guiding sheet 10 and distributed/emitted from wide-area illumination system 900 using a multi-stage process. Ray 301 initially propagates in light guiding sheet 10 (light guide 800) in a waveguide mode. Subsequently, ray 301 enters semi-opaque light extraction feature 8 and encounters one of light scattering particles 33 which splits the energy of ray 301 into two distinct portions propagating toward different directions. A first portion of ray 301 is forward-scattered by one of particles 33, forming a ray segment 303. A second portion of ray 301 is forward-scattered by particle 33, forming a ray segment 302.

Ray segment 302 is further forward-scattered by an adjacent particle 33 and is directed towards surface 12 (not shown) at an angle below the critical TIR angle characterizing surfaces 11 and 12, so it can be finally extracted from sheet 10 and emitted from surface 12. Ray segment 303 is further emitted from surface 36 and reflected back towards sheet 10 by reflective sheet 41. Ray segment 303 re-enters the body of light extraction feature 8 and is further propagated back into sheet 10, undergoing additional interactions (and forward scattering) with one or more light scattering particles 33. Ray segment 303 enters onto sheet 10 at a below-TIR angle, allowing for decoupling ray segment 303 from light guide 800.

According to an aspect, ray segment 302 exemplifies light that is back-scattered by light extraction feature 8 towards surface 11 and that eventually re-enters light guiding sheet 10 and can be emitted from opposing surface 12 (not shown), contributing to the total useful emission from system 900. Ray segment 303 exemplifies light that is initially forward-scattered away from surface 11 and that contributes to the emission from surface 11. Accordingly, in the absence of reflective sheet 41, the total light emission from sheet 10 would be distributed between surfaces 11 and 12 according to a certain ratio. This ratio can be determined and controlled, at least in part, by the opacity of light extraction feature(s) 8. In the illustrated example, ray segment 303 is intercepted by highly reflective sheet 41 and reflected back towards light guiding sheet 10. Ray segment 303 further passes through the semi-opaque layer of light extraction feature 8 for the second time, undergoing some additional scattering, so that it can be ultimately emitted from opposite surface 12 of light guiding sheet 10, also contributing to the emission from that surface.

It is noted that individual light rays being extracted by semi-opaque light extraction features 8 may undergo multiple back- and forward-scattering deflections within the light-scattering layer, e.g., as schematically illustrated by various segments of ray 301 in FIG. 9. Additionally, the extracted light rays may further undergo multiple passages through the same light extraction feature 8 or even different light extraction features 8. The number of interactions of the extracted light ray with light-scattering particles 33 may depend on the size of such particles, their distribution density within the semi-opaque layer, height $H_8$, spacing between light extraction features 8, and other factors. The thickness, opacity, light transmittance and the size of particles 33 may be selected such that the light scattering is maximized (for example, by maximizing light diffraction by particles 33 and providing for at least double or multiple passage of light through the material of light extraction features 8) while light absorption within the body of light extraction features 8 is minimized.

According to one embodiment, the light scattering provided by semi-opaque, semi-transmissive light extraction features 8 with or without the aid of reflective sheet 41 is such that light emitted from light guiding sheet 10 has a Lambertian or quasi-Lambertian angular distribution. In other words, the luminous intensity observed from surface 12 of light guiding sheet 10 can be approximately proportional to the cosine of the observation angle (an angle between the observation direction and a surface normal). According to one embodiment, the angular emission distribution can be approximated by a Lambertian cosine law at least in the YZ plane. According to one embodiment, the angular emission distribution can be approximated by a Lambertian cosine law at least in the XZ plane. According to one embodiment, the angular emission distribution can be approximated by a Lambertian cosine law in both XZ and YZ planes. According to some embodiments, the ratio between a luminous intensity of surface 12 measured at 45° from the surface normal and a luminous intensity of surface 12 measured along a normal direction is from 0.5 to 0.95, from 0.7 to 0.9, from 0.75 to 0.9, or from 0.8 to 0.9. By way of example and not limitation, the luminance intensity measured from a perpendicular direction to surface 12 may be 500-600 cd and the luminance intensity measured from a 45° angle may be 400-500 cd.

According to some embodiments, light guide illumination system 900 of FIG. 9 may be used without a reflector (e.g., reflective sheet 41) and can still be configured for providing a Lambertian or quasi-Lambertian angular distribution of light emission, e.g., from surface 11, surface 12 or both surfaces 11 and 12. According to some embodiments, light extraction features 8 may be configured to provide a "batwing" angular distribution of light emission from either one or both surfaces 11 and 12, e.g., by appropriately configuring the opacity, transmittance and light scattering properties of the cured ink layer which forms the light extraction feature.

The average thickness of the semi-opaque layer of each micro-printed light extraction feature 8 may be selected to provide a prescribed ratio between forward-scattering and back-scattering. In order to maintain a minimum prescribed level of light transmittance for light extraction features 8, height $H_8$ (maximum thickness) or the average thickness of the respective semi-opaque layer may be limited to certain values. In some embodiments, height $H_8$ or the average thickness may be equal to or less than 60 micrometers, equal to or less than 50 micrometers, equal to or less than 30 micrometers, equal to or less than 20 micrometers, equal to or less than 15 micrometers, equal to or less than 10 micrometers, less than 8 micrometers, equal to or less than 6 micrometers, equal to or less than 5, equal to or less than 3 micrometers, equal to or less than 2, between 1 and 2 micrometers, between 1 and 1.5 micrometers, about 1 micrometer, or between 0.5 and 1 micrometers. At the same time, according to at least some embodiments, the characteristic size (e.g., dimension $L_8$ or diameter d) of features 8 may range from 30 micrometers to 150-200 micrometers and more preferably from 30 micrometers to 140 micrometers. According to different embodiments, a prevalent size or diameter of light extraction features 8 is about 50 micrometers, 60 micrometers, 70 micrometers, 80 micrometers, 90 micrometers, 100 micrometers, or 100-150 micrometers. According to one embodiment, the prevalent size or diameter of light extraction features 8 is between 50 micrometers and 80 micrometers. According to one embodiment, the maximum thickness of the semi-opaque layer of light extraction feature 8 may be greater or equal to 1 micrometer and less than or equal to 10 micrometers. According to one embodiment, the maximum thickness may have values from 1 micrometer to 8 micrometers, from 1 micrometer to 6, from 2 micrometer to 6, or from 2 micrometer to 4 micrometers.

According to at least some embodiments, the ratios between $L_8$ and $H_8$ may be as low as 3 or as high as 100 or so. According to some embodiments, the ratio between $L_8$ and $H_8$ may be between 5 and 100, between 10 and 200, between 10 and 100, between 20 and 100, between 40 and 100, and between 40 and 80.

According to one embodiment, highly reflective sheet 41 is configured to reflect primarily by a specular reflection (such that the angles of reflection are about equal to the angles of incidence). According to one embodiment, highly reflective sheet 41 is configured to reflect primarily in a diffuse regime and thus provide additional scattering for the extracted light compared to scattering/deflecting light using light extraction features 8 only.

The opacity of individual light extraction features 8 and the density of such light extraction features across surface 11 and/or 12 may be configured to control the opacity of light guiding sheet 10 in different areas. In an extreme exemplary case, the density of light extraction features 8 can be made very high (e.g., from 80% to 100%, such that there is practically no spacing between individual light extraction features 8 (e.g., separation distances SED are about zero or less than zero) and that light guiding sheet 10 or its portions are substantially opaque. In a further example, by selecting an even higher packing density (with separation distances SED being significantly less than zero but greater than −d/2) the opacity of light guiding sheet 10 may be made similar to that of individual light extraction features 8.

According to one embodiment, light extraction features 8 may be formed by stretchable ink. In different implementations, the fully cured ink material should allow for its reversible stretching without cracking in the elastic or plastic mode by at least 10%, 30%, 50%, 10%, 150%, or 200% elongation.

Example 1

Figure 11:
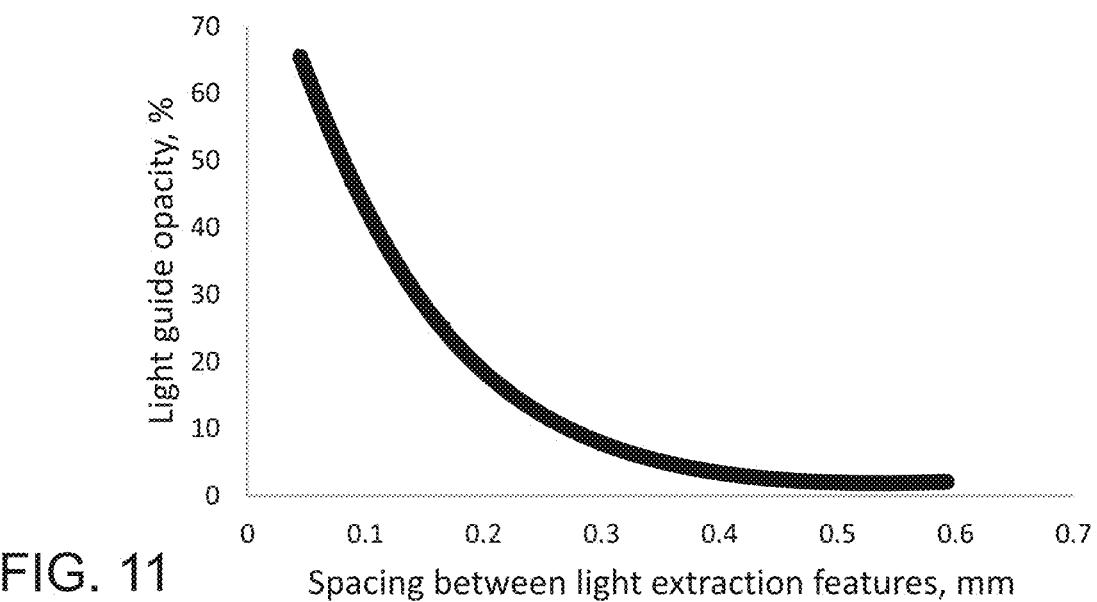
FIG. 11 is a schematic graph showing a measured dependency of the opacity of a light guiding sheet on spacing between light extraction features, according to at least one embodiment of the present invention.

FIG. 11 shows an exemplary measured dependence of the opacity of light guiding sheet 10 on spacing between light extraction features 8. In the illustrated example, light guiding sheet 10 was formed by an optically clear acrylic sheet having a 0.75-mm thickness. Light extraction features 8 were formed by depositing microdrops of UV-curable white ink on a surface of the acrylic sheet using a commercial flatbed UV printer with instant curing of the respective micro-droplets to a solid form using UV light.

The individual printed light extraction features 8 had sizes around 120-130 micrometers along the longest dimensions and an average total thickness of about 6-8 micrometers. In each sample pattern, light extraction features 8 were arranged in a two-dimensional array having a fixed spacing (pitch) in the X and Y dimensions (fixed spacing distance SPD for each sample). Multiple samples of patterned light guiding sheets 10 were produced using different spacing distances SPD between light extraction features 8.

The patterns having microdrop spacing SPD below 100 micrometers completely covered the surface with the ink (reaching a 100% fill factor) due to overlapping of adjacent microdrops, which corresponded to the case of near-zero or slightly negative separation distances SED. At a microdrop pitch of 84 micrometers (SPD=0.084 mm), the printing process produced a continuous layer of white ink with a measured average thickness of 7-8 micrometers (substantially overlapping microdrops with separation distances SED being significantly less than zero). At even lower SPD values and even greater overlap of the printed microdrops, the thickness of the resulting layer was measured at about 30 micrometers with approximately uniform coverage.

Referring further to FIG. 11, relatively sparsely populated, discrete light extraction features 8 (e.g., spaced by distances SPD of 0.3 mm to 0.6 mm) produced fairly low levels of opacity for light guiding sheet 10/light guide 800. On the other hand, densely populated light extraction features 8 (e.g., spaced by distances SPD of 0.1 mm and below) produced moderate to relatively high levels of opacity for the light guiding sheet.

At a pitch (or spacing distance SPD) of about 42 micrometers, the opacity of sheet 10 reached a maximum at about 66%. Accordingly, at this opacity level, light guiding sheet diffusely reflected about two thirds of the incident light and diffusely transmitted around one third of the incident light. The absorption within the layer of white ink was found to be less than 3-5% (less than or comparable to the measurement errors).

According to an aspect, each light guiding sheet 10 patterned with separation distances SED being about zero or less also produced a semi-opaque light diffuser having a relatively thin (2-30 μm) light scattering layer which was virtually lossless (e.g., non-absorbing). Accordingly, light guiding sheet(s) 10 may also be configured for efficiently diffusing light using minimal amounts of raw materials. Moreover, considering that the opacity, reflectance and transmittance of sheet 10 may be controlled by the thickness of the ink layer and that the angular directionality of the transmitted light may be controlled by the size, refractive index of forward-scattering particles mixed into the UV ink, the operation and optical parameters of the resulting lighting diffuser may be varied in a broad range. According to different embodiments, light guiding sheet 10 may be configured as a non-absorbing light diffuser having a transmittance of greater than 50%, greater than 60%, greater than 70%, or greater than 80% and may further be configured to scatter a parallel beam of light over an angle of at least 30°, at least 40°, at least 45°, at least 60°, at least 90°, at least 120°, at least 140°, or at least 160° (in a transmissive operation).

The graph of FIG. 11 can be approximated by a polynomial function and interpolated or extrapolated to calculate areal pattern coverage to achieve a prescribed level of opacity. In view of such results, it is noted that, according to at least some embodiments, the opacity of semi-opaque light extraction features 8 may also be approximately determined by measuring the opacity of light guiding sheet 8, particularly in the areas of relatively high density of light extraction features 8 and extrapolating the results to the 100% coverage of the surface with the respective semi-opaque layer, at the appropriate layer thickness.

End of Example 1

The term "surface coverage" may be defined as the ratio between a cumulative area of light extraction features 8 within a sampling region and the total area of the sampling region. The area of the sampling region should normally be at least 100 times greater than the average or typical area of individual light extraction features 8. According to one embodiment, light guiding sheet includes at least one region having a surface coverage of at least one of the following: 10% or more, 20% or more, 30% or more, 40% or more, 50% or more, 60% or more, 70% or more, 80% or more, and 90% or more. According to some embodiments, spacing areas between light extraction features 8 cumulatively occupy less than 50% of the total light guide area within a sampling region, less than 30%, less than 20%, or less than 10%. According to one embodiment, light guiding sheet 10 includes at least one region having the surface coverage of at least one of the following: less than 10%, less than 7%, less than 5%, and less than 2%.

Light guiding sheet 10 may be configured such that a first light extraction pattern of light extraction features 8 is formed in surface 11 and a second light extraction pattern of light extraction features 9 is formed in surface 12. The second pattern of light extraction features 9 may cover the same area of sheet 10 as the first pattern of light extraction features 8. The first and second patterns may superimpose on one another in terms of X and Y coordinates of the respective individual light extraction features 8 and 9. The second pattern may also be a rotated and/or translated copy of the first pattern. According to one embodiment, the first and second patterns may have different pitch or different surface distributions of the respective light extraction features 8 and 9, for example, for the purpose of reducing the chance of the so-called moiré effect when a light emitting surface of system 900 is observed by a viewer.

The shapes, sizes, distribution densities and orientations of light extraction features 8 and/or 9 may vary in a broad range. According to one embodiment, light extraction features 8 and/or 9 may have random shapes, sizes and/or orientations across respective surfaces 11 and/or 12. This may also be useful, for example, for reducing the conspicuity of the patterns and providing a perceptibly uniform light output from illumination system 900.

Figure 12:
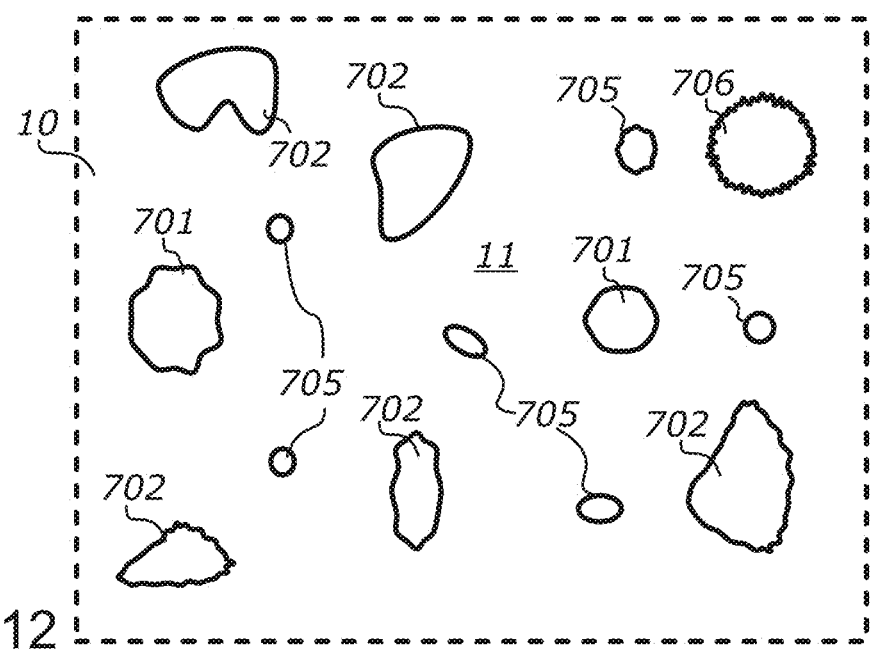
FIG. 12 is a schematic view of a surface portion of a light guiding sheet having a plurality of light extraction features having various shapes and sizes, according to at least one embodiment of the present invention.

FIG. 12 schematically shows various exemplary shapes, densities and orientations of various light extraction features that can be formed in or on surfaces 11 and 12 of light guiding sheet 10. Light extraction features 701, 702, 705, and 706 may exemplify various-shape microdots of white UV-curable ink printed on surface 11. More particularly, light extraction features 701 may exemplify regular or quasi-regular shapes of the microdots which may be have some small-scale shape irregularities. Light extraction features 702 exemplify printed microdots having irregular or highly irregular shapes. Light extraction feature 706 exemplifies regular or quasi-regular shapes of microdots that have a somewhat fussy outline. Light extraction features 705 exemplify printed microdots that have much smaller sizes compared to larger light extraction features 701, 702, and 706. The smaller-sized light extraction features 705 are provided in spaces between the large-sized light extraction features and can have a generally different distribution pattern than the larger light extraction features. In some configurations of sheet 10, the areas occupied by the patterns of light extraction features 701, 702, 705 and 706 may partially or entirely overlap in any combination. In some configurations, the areas may be adjacent to ether or spaced apart from one another.

According to one embodiment, light extraction features 705 may be formed by microdots of a first type of UV ink (e.g., a first pigment or a first phosphor) and configured to emit light in a first spectral range or color (e.g., blue color) when illuminated by LEDs 2. Light extraction features 701 may be formed by microdots of a second type of UV ink (e.g., including a second phosphor or second pigment) configured to emit light in a second spectral range or color (e.g., red color) when illuminated by LEDs 2. Light extraction features 702 may be formed by microdots of a third type of UV ink (e.g., including a third phosphor or third pigment) configured to emit light in a third spectral range or color (e.g., green color) when illuminated by LEDs 2, and light extraction features 706 are formed by microdots of a fourth type of UV ink (e.g., light-scattering particles) configured to emit light in a third spectral range or color when illuminated by LEDs 2 (e.g. the spectral range or color of the emission of LEDs 2). According to one embodiment, at least some of light extraction features 701, 702, 705 or 706 may be formed by optically clear UV ink.

Light extraction features formed by different-type UV ink materials may be distributed in different relative proportions (e.g., by number, size/density or area) over different areas of surface 11 to create various visual effects (e.g., emission in different colors, brightness levels, uniformity levels, patterns, etc.) in those areas. Each type of UV ink may be printed according to a surface distribution pattern which is different than the distribution patterns of the other types of UV ink and which density generally increases with a distance from a light input edge (or edges, if multiple) of sheet 10. For example, light extraction features 705 may be distributed over surface 11 according to a first distribution pattern having a first density gradient (e.g., an increase in the surface density of the light extraction features with a distance from a light input edge), light extraction features 701 may be distributed over surface 11 according to a second distribution pattern having a second density gradient which is different than the first gradient, light extraction features 702 may be distributed over surface 11 according to a third distribution pattern having a third density gradient which is different than the first gradient, and so on. According to one embodiment, the density gradient of the spatial distribution of light extraction features 705 along the optical path in light guiding sheet 10 may be greater than the density gradient of the spatial distribution of other types of light extraction features (e.g., features 701 and 702). This embodiment may be particularly advantageous for an exemplary case when at least some of LEDs 2 are configured to emit a monochromatic light in a first spectral range, light extraction features 705 are formed by light scattering ink, and the other-type light extraction features (e. g., 701 and 702) are formed by inks including phosphors or other types of fluorescent materials responsive to the first spectral range (e.g., being configured to absorb light in the first spectral range and convert the absorbed light into one or more different spectral ranges). For example, light extraction features 705 may be configured to separately control the light extraction rate and emission in the first spectral range relatively to the light extraction rate and emission in those different spectral ranges.

According to one embodiment, individual patterns of light extraction features formed by different types or compositions of UV ink may be configured to homogenize light output from surface 11 by means of mixing the light energy and/or color. According to one embodiment, the individual patterns are configured to produce a homogenous surface emission such that the brightness/luminance and/or color of each portion of surface 11 is about the same (e. g., within 5%, 10%, 15%, or 20%). Considering that different types of UV ink will generally deplete light within light guiding sheet 10 at a different rate relatively to each other, homogenizing the light output from surface 11 and/or 12 may be non-trivial and require more than just routine experimentation. For example, it may be appreciated that light extraction features having the same composition but located at different distances from a light input edge of light guiding sheet 10 patterned using several different colors of ink may emit light with different spectral distributions. Furthermore, interactions of one type of light extraction features with light which has already been deflected, scattered, filtered or color-converted by other-type light extraction features nay produce unexpected effects and should be accounted for. Accordingly, a method of homogenizing the emission from surface may include adjusting the light emission in one color, intensity and/or angular distribution at one location of surface 11 by adjusting the density and optical/geometrical properties of light extraction features at that location while also adjusting the density and optical/geometrical properties of more than one type/composition of light extraction features at that one and other locations of surface 11.

According to one embodiment, light extraction features 701, 702, and 706 may have volumes between 30,000 and 100,000 cubic micrometers while each of light extraction features 705 can have a volume below 10,000 cubic micrometers, below 5,000 cubic micrometers, between 1,000 cubic micrometers and 5,000 cubic micrometers, or less than 1,000 cubic micrometers.

Referring to FIG. 10, a fully cured micro-drop of UV-curable ink may be characterized by a contact angle which is defined, by an analogy from the wettability characterization of liquid drops on a solid substrate, as the angle between a curved surface of the micro-drop and the substrate surface (e.g., surface 11) where the respective surfaces meet. When the micro-drop has a rough, microstructured surface, the surface roughness may be subtracted from the surface profile before measuring the contact angle. For example, a suitable waviness profile may be used as a representation of the shape of the micro-drop and the contact angle may be measured using such waviness profile.

According to one embodiment, at least some of light extraction features 8 and/or 9 are formed by UV-cured micro-drops having a contact angle of about 10 degrees. According to one embodiment, the contact angle is about 5 degrees. According to one embodiment, the contact angle is about 15 degrees. According to one embodiment, the contact angle is about 20 degrees. According to one embodiment, the contact angle is between 2 degrees and 5 degrees. According to one embodiment, the contact angle is greater or equal to 1 degree and less than or equal to 2 degrees. According to one embodiment, the contact angle is less than 1 degree. According to one embodiment, the contact angle is greater than 0.1 degree and less than 1 degree. According to one embodiment, the contact angle is between 5 degrees and 25 degrees. According to one embodiment, the contact angle is between 5 degrees and 20 degrees. According to one embodiment, the contact angle is between 10 degrees and 20 degrees. According to one embodiment, the contact angle is less than 5 degrees. According to one embodiment, the contact angle is greater than 25 degrees.

It is noted that the contact angle of liquid (uncured) micro-drops, may be about the same but may also be generally different from that of the fully-cured, solidified micro-drops. Furthermore, at least some embodiments may include printed light extraction features that are formed by solvent-based micro-drops in which case the contact angles of the liquid and fully-cured micro-drops may differ significantly due to the evaporation of the solvent during the curing process. According to one embodiment, light extraction features 8 are formed by microdrops of either radiation-curable or solvent-based materials which are deposited to the respective surfaces using known methods other than printing. For example, such materials may be deposited to surface 11 in the form of liquid microdrops using tightly controlled pressure spraying, ultrasonic spraying, or a combination thereof.

According to one embodiment, a method of making wide-area illumination system 900 may include a step of generating a two-dimensional pattern of discrete locations (e.g., X, Y coordinates) of light extraction features 8 where spacing distances between the discrete locations gradually increase or decrease with a distance from an edge of the pattern. The two-dimensional pattern may be generated, for example, using computer-based modeling, such as raytracing. The optical modeling may be constrained to provide a substantially uniform expected light output from light guide 800.

The method of making wide-area illumination system 900 may further include a step of converting the pattern of discrete locations to a computer readable raster bitmap having a two-dimensional array of pixels. Suitable examples of computer readable raster bitmaps that can be used to store coordinates of light extraction features 8 include, but are not limited to bitmap image file format (e.g., the BMP file format), device independent bitmap (e.g., DIB), tagged image file format (TIFF), portable document format (PDF), JPEG file format, portable network graphics (PNG) file format, graphics interchange format (GIF), and the like. According to one embodiment, it may be preferred that the raster bitmap is stored in a bitonal (e.g., black-and-white) form. For example, in a black-and-white bitmap, pixels corresponding to the locations light extraction features 8 may be white and pixels corresponding to spacing areas can be black, or vice versa.

The method of making wide-area illumination system 900 may further include steps of providing a UV printing machine (a UV printer), providing a light guide substrate (e.g., highly transparent acrylic sheet), loading UV-curable inks of a preselected color (e.g. white UV-curable inks) into the UV printing machine, loading the bitmap containing information on the locations of light extraction features 8 into a software that is used to control the UV printing machine, printing the bitmap on the light guide substrate using the UV printing machine, and curing the droplets deposited onto the surface of the light guide substrate (e.g., using UV light from UV LED sources). The curing process can be performed simultaneously with the printing process (instant curing) or as a separate post-printing step (delayed curing).

The method of making wide-area illumination system 900 may further include various software and/or printer configuration steps, such as, for example, specifying the print resolution, target print area dimensions, volume of individual droplets (e.g., based on the target size of the printed dots/microdots), and ink curing regimes (e.g., the intensity of UV lamp or time delay for curing). According to one embodiment, printing can be performed at a resolution of 600 dots per inch (DPI). According to one embodiment, printing can be performed at a resolution of 1200 DPI, 1800 DPI, 2400 DPI or a higher DPI. According to one embodiment, printing can be performed at a resolution of 300 DPI or lower. The DPI resolution of the bitmap associated with the print may be selected to match that of the printing resolution. The size of printed dots may be specified directly, e.g., via appropriate software settings, or indirectly, e.g., by selecting appropriate printing regimes that result in a prescribed size of the individual microdots. The surface to be patterned (e.g., surface 11 or 12) may be conditioned for an enhanced receptivity of ink and improved wettability. For example, it may be pre-washed in de-ionized water with added surfactants, cleaned in an ultrasonic batch or treated using corona discharge or atmospheric plasma.

The formation of individual microdrops within the printer may ordinarily be performed using a drop-on-demand print head that electrically actuates a piezoelectric crystal to produce ink drops of a prescribed size in response to voltage pulses. According to one embodiment, it may be preferred that each actuation of the piezoelectric crystal results in depositing a single drop of ink to each prescribed location of the surface being patterned (e.g., the location corresponding to an individual "white" or "black" pixel in the raster bitmap), such that individual light extraction features 8 may be produced by curing that drop to a solid state.

According to one embodiment, the method of making wide-area illumination system 900 includes a continuous or at least intermittent recirculation of the ink during the printing process. Including the recirculation step or process can be especially important for white ink compositions that include heavy particles suspended in a much lighter liquid material (e.g., light-scattering nanoparticles of $TiO_2$ suspended in a clear UV-reactive acrylate resin/binder material). Without the recirculation, the heavy particles may cause various issues such as, for example, ink sedimentation in the fluid paths, clogging the jetting nozzles, and creating non-uniformities of volumetric particle loading in the ink. This, in turn, may impact ink discharge and severely affect or even eventually prevent the formation of single-droplet microdots (individual light extraction features 8) of the prescribed size and volume. The continuous recirculation may be performed continuously or intermittently by agitating the dispersion or suspension of the heavy particles within a closed-path independent fluid circuit using a recirculation pump. The closed-path fluid recirculation circuit may be located anywhere along the ink supply line, e. g, between a reservoir containing the ink and the printing head. According to one embodiment, the closed-path fluid recirculation circuit may also be built into the printhead.

The print head may incorporate multiple individual print heads bundled together and forming a wide-area multi-element print head which can pattern a relatively large area in a single pass. The area may be from several millimeters to several tens or even hundreds of centimeters in width. For example, the wide-area multi-element print head may have a span equal to a width of the area to be patterned. Alternatively, the print head may have an active printing area which is much smaller than the area to be patterned and may be configured to pattern such area in multiple passes. According to one embodiment, the print head is configured for printing in a reciprocal motion in one dimension and the substrate to be patterned (e.g., light guiding sheet 10) can be incrementally fed in an orthogonal dimension in regular intervals.

According to one embodiment of the method of making wide-area illumination system 900, depositing of different microdots within a relative small area (e.g., within a band having a width from several millimeters to several centimeters) may be performed using two or more consecutive printing passes of the print head over the same area. According to one embodiment, the method of making wide-area illumination system 900 includes setting a prescribed number of individual drops to be deposited to the same location. This printing regime can be advantageously selected for building the prescribed thickness of light extraction features using a finite pre-defined number of relatively small microdots. According to one embodiment where individual light extraction features 8 are formed using multiple microdrops of UV curable ink, each microdrop may be cured to a solid form before depositing a next microdrop on top of it or with a light offset (e.g., to form overlapping microdots). According to one embodiment, at least some microdrops (or layers of light extraction feature 8) may be uncured or partially cured (e.g., by reducing the intensity of the UV lamp or tuning it off) before depositing a next microdrop on top of it or with a light offset. This may be useful, for example, for enhancing the adhesion between the layers forming light extraction feature 8.

According to one embodiment, the method of making wide-area illumination system 900 may further include bending the light guide substrate (light guide 800) to a curved shape and making it operable for distributing light while being in a bent or curved state. According to one embodiment, the light guiding substrate may be sandwiched between a flexible back-sheet reflector and a flexible, film-thickness optically transmissive diffuser sheet (e.g., for a single-sided diffuse emission), all of which can be bent and flexed together with the light guiding substrate. The back-sheet reflector may specular or diffuse and may conventionally have a film thickness for enhanced flexibility. According to one embodiment, the back-sheet reflector may be replaced with another flexible, film-thickness transmissive diffuser sheet (e.g., for a two-sided diffuse emission). According to one embodiment, light extraction features 8 may be located on a concave side of curved light guide 800. According to one embodiment, light extraction features 8 may be located on a convex side of curved light guide 800. According to one embodiment, light extraction features 8 may be located on both the convex and concave sides of curved light guide 800.

Figure 13:
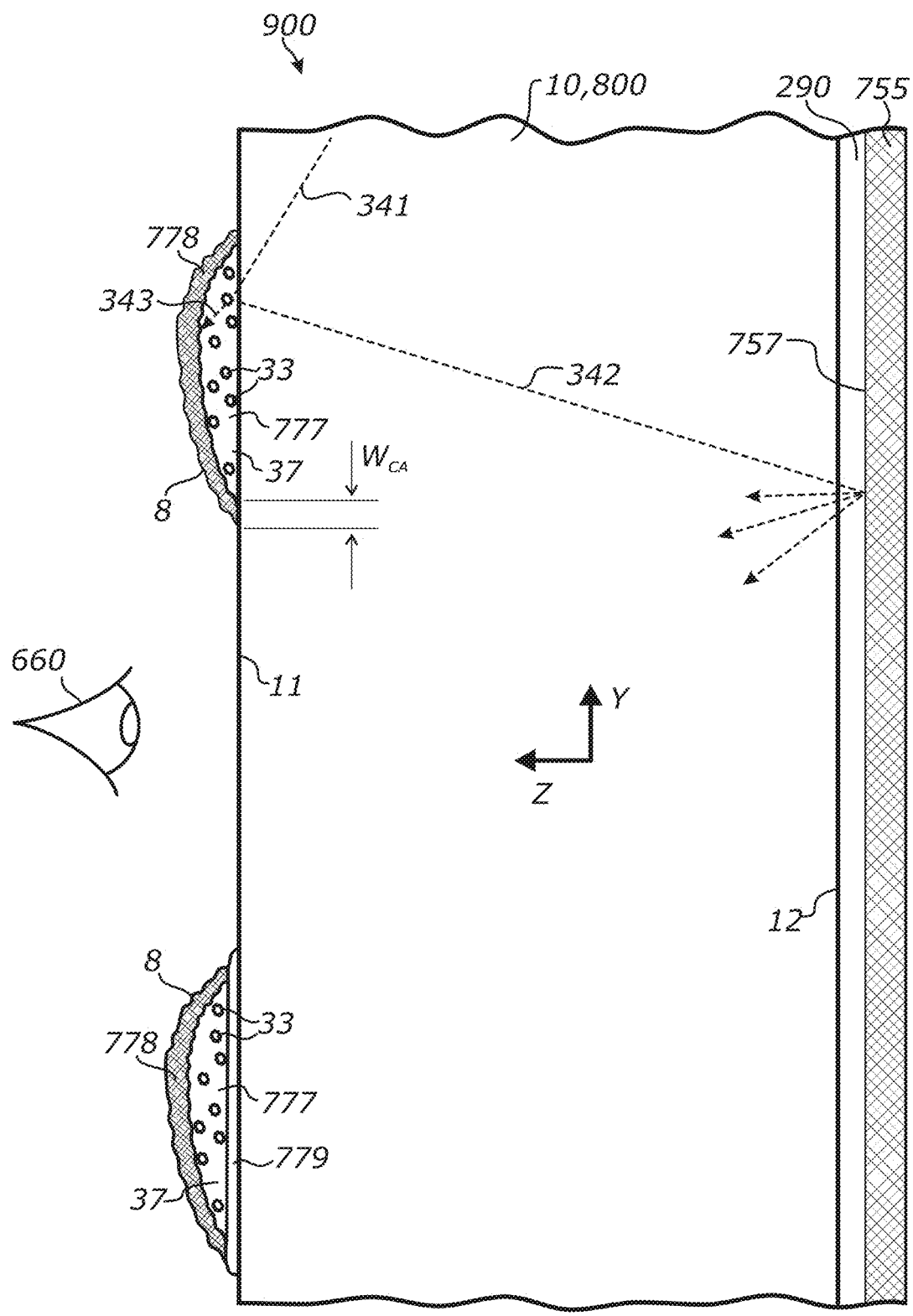
FIG. 13 is a schematic section view and raytracing of a portion of a wide-area light guide illumination system, showing light extraction features including at least two layers of different materials, according to at least one embodiment of the present invention.

FIG. 13 schematically illustrates an embodiment of wide-area illumination system 900 in a front light configuration with a substantially single-sided emission. Referring to FIG. 13, there is provided an image print 755 having a full-color viewable surface 757. Image print 755 is separated from light guiding sheet 10 by a spacing layer 290 which may be filled with ambient air or an optically transparent material having a lower refractive index that the material of light guiding sheet 10. Light extraction features 8 are configured for illuminating surface 757 in a reflective mode of operation. Surface 11 is facing away from image print 755 and configured as a front viewing surface of system 900 through which image print 755 can be observed from a distance. Surface 12 is facing towards image print 755 and configured for illuminating the image print. According to one embodiment, image print may be spaced apart from light guiding sheet 10 by a distance that is greater than the thickness of light guiding sheet 10 (e.g., at least by 1.5 times, 2 times, 3 times, 5 times or 10 times).

It is noted that the front light implementation of illumination system 900 is not limited to illuminating an image print and may be used for illuminating space in front of surface 12 (e.g., a room in a building) or illuminating any types of objects or surfaces. In different embodiments, image print 755 may be replaced with a textured surface, graphics, pattern, indicia, logo, sign, letters, background surface (white, monochrome or colored), fabric, conventional printed image, stereoscopic image, photograph, or LCD display. According to one embodiment, a three-dimensional object or surface may be used in place of image print 755. According to one embodiment, a layer of fluorescent material may be used in place of or in conjunction with image print 755.

Each light extraction feature 8 of FIG. 13 is formed by an inner reflective layer 777 and an outer opaque layer 778. The inner layer 777 is formed by a semi-opaque, highly reflective material which includes transparent binder material 37 and high-refractive-index light scattering particles 33 distributed throughout the volume of binder material 37. According to one embodiment, inner layer 777 is formed by light-scattering UV curable ink. Outer layer 778 is formed by a highly opaque material having a sufficient thickness to block at least a substantial portion of light that may be escaping from inner layer 777. According to one embodiment, the highly opaque material may include a light absorbing material. The opacity of outer layer 778 is preferably greater than 75%, more preferably greater than 80%, even more preferably greater than 85%, even more preferably greater than 90%, even more preferably greater than 95%, and still even more preferably greater than 97%. According to one embodiment, the opacity of outer layer 778 is substantially 100%.

Suitable materials for light absorbing outer layer 778 may include, for example, black or dark-colored ink containing a carbon black pigment. Suitable materials for reflective outer layer 778 may include, for example, UV-curable or solvent-based metallic ink (e.g., silver or aluminum nano- or micro-particle ink), aluminum foil, a relatively thick layer of material having a high-brightness reflective pigment, shiny glitter (which can be colored or non-colored), and various types of metallic particles, flakes or powder (e.g., gold, silver, bronze or aluminum). The outer layer 778 may be further coated with a protective layer (e.g. clear UV cured ink or lacquer).

Inner light-reflecting layer 777 is facing towards image print 755 and outer absorptive layer 778 is facing towards a viewer 660. It may be appreciated that, by utilizing the inner layer which is highly reflective, light scattering and semi-opaque (also preferably being bright-white in color) and the outer layer which is light-absorbing and highly opaque, illumination system 900 may be configured to suppress or even completely eliminate glare associated with a light emission from light extraction features 8 towards viewer 660. Accordingly, this configuration may be advantageously used as a front light for illuminating image print 755 with a high contrast and with minimal glare.

For example, it can be shown that, if the opacity of inner layer 777 is 70% and the opacity of outer layer 778 is 90%, the combined opacity can be about 97% (resulting in only 3% of light being emitted towards viewer 660). When the reflectance of inner layer 777 is 60% or more, a ratio between light energy emitted towards image print 755 and towards viewer 600 may be as high as 20. Accordingly, if an average reflectance of image print 755 is 50%, a visual contrast between illuminated image print 755 and light extraction features may be as high as 10 (the visual contrast may be defined as a ratio between the luminance of the visible surface of image print 755 and the visible surface of light extraction features 8). According to different embodiments, the total (combined) opacity of layered light extraction features 8 is one of the following: 90%, 92%, 94%, 96%, 98%, and 99%.

Opaque layer 778 of light absorbing material is conformably coating the surface of the semi-opaque inner layer 777 such that minimum or virtually no light is emitted from the respective light extraction feature 8 directly towards viewer 660, even when illumination system 900 is fully lit by LEDs 2 coupled the respective edges of light guiding sheet 10. According to one embodiment, light extraction features 8 are configured to be essentially invisible to viewer 660 when illumination system 900 is in the "on" (illuminated) state. This can be achieved, for example, by making the size of individual features 8 sufficiently small and by making the opacity of respective outer layers sufficiently high. According to one embodiment, light extraction features 8 are also made essentially invisible to a viewer 900 when illumination system 900 is in the "off" state (i.e., when not illuminated by LEDs 2). According to one embodiment, light extraction feature 9 are also essentially invisible to a viewer 900 when illumination system 900 is either in the "off" or "on" state. According to one embodiment, light extraction features 8 are made essentially invisible to viewer 660 at a normal viewing distance when illumination system 900 is a non-illuminated state but visible at the same distance when system 900 is in an illuminated state. The normal viewing distance may be defined as a distance from which image print is designed to be viewed. In a non-limiting example, for illumination system 900 configured as an information display, the normal viewing distance may be from 50 cm to 10-20 meters.

It may be preferred that opaque layer 778 is formed on top of the three-dimensional structure of semi-opaque inner layer 777 as a conformable coating. The term "conformable" with respect to a coating refers to a layer that generally conforms in shape to the underlying three-dimensional surface, layer and/or structure, such as a curved outer surface of the inner layer 777 of light extraction feature 8 of FIG. 13, for example. Outer opaque layer 778 preferably has the dimensions and shape approximating those of the inner semi-opaque layer 777 so as to completely cover inner layer 777. According to different embodiments, outer layer 778 covers at least 80%, at least 90%, or at least 95% of the surface of inner layer 777. According to one embodiment, outer layer 778 covers 100% of the surface of inner layer 777.

According to one embodiment, outer opaque layer 778 may have slightly larger dimensions or slightly larger area (e.g., by 5-10%) than those of inner layer 777, for example, to ensure that no perceptible amount of stray light can escape from light extraction feature 8 towards the viewer. According to one embodiment, at least some outermost portions of outer layer 778 of light absorbing material are disposed in contact with surface 11 such that outer layer 778 completely encapsulates inner layer 777. On the other hand, the size of layer 778 should be limited to reduce unwanted extraction and absorption of light propagating in light guide 800. According to different embodiments, it is preferred that a width $W_{CA}$ of optical contact area of outer layer 778 with surface 11 on either side of inner layer 777 is less than 30%, less than 20% or less than 10% of the diameter of the surface structure formed by inner layer 777.

The operation of wide-area illumination system 900 in a glare-suppressing front-light configuration is further illustrated in FIG. 13 by the example of a path of a light ray 341.

Ray 341 propagating in light guiding sheet 10 in a waveguide mode enters binder material 37 where it optically interacts with one or more light scattering particles 33. A light ray segment 343 exemplifies a portion of light ray 341 that is forward-scattered upon such interaction. A light ray segment 342 exemplifies a portion of light ray 341 that is back-scattered (diffusely reflected back towards sheet 10 and towards image print 755).

Ray segment 342 propagates back to light guiding sheet 10 where it overcomes TIR at surface 12 and illuminates surface 757 of image print 755. Surface 757 further reflects and scatters light exemplified by ray segment 342 and directs the reflected light towards viewer 660. Accordingly, viewer 660 can see image print 755 being illuminated with high contrast and without glare that could be otherwise caused by stray light emanated from light extraction feature 8 in the absence of opaque layer 778.

Ray segment 343 propagates further towards outer layer 778. In an embodiment where outer layer 778 is light-absorbing, ray segment 343 may be substantially absorbed by that layer. In an embodiment where outer layer 778 is reflective (e.g., formed by reflective ink or metallic foil), at least a substantial portion of the energy of ray segment 343 (e.g., at least 30%, at least 40%, at least 50%, at least 60%, or at least 70%) may be reflected (optionally with some scattering) by that layer and may re-enter light guiding sheet 10 at below-TIR angle (with respect to a normal to surface 12) and illuminate image print 755.

To prevent or minimize the visibility of individual light extraction features 8 or to enhance the visibility of image print 755 at relatively short viewing distances (e.g., 50 cm or less for signage-type applications), the light extraction features should preferably be smaller than 150-200 micrometers, more preferably smaller than 100-150 micrometers, even more preferably smaller than 100 micrometers, and still even more preferably smaller than 80 micrometers. In some instances, however, e.g., when the viewing distances are one meter, several meters or more, the size of light extraction features 8 may be selected to be 300 micrometers or more, 0.5 millimeter or more, 1 millimeter or more, and up to several millimeters or more.

The spacing distances SPD between light extraction features 8 should preferably be equal to or less than the combined thickness of light guiding sheet 10 and spacing layer 290 such that individual light beams formed by light extraction features 8 could overlap on one another at surface 757. This may be particularly critical for achieving a relatively uniform illumination of image print 755 According to some embodiment, the combined thickness of light guiding sheet 10 and spacing layer 290 is greater than the spacing distances SPD between at least some adjacent light extraction features 8 by at least 1.5 times, at least 2 times, at least 2.5 times, at least 3 times, at least 5 times, at 10 times, or at least 20 times.

The opacity of the material forming outer light absorbing layer 778 should preferably be significantly greater than the opacity of the material forming the inner layer of light extraction features 8. According to one embodiment, outer layer 778 may include a color pigment. It may also include highly reflective (e.g., metallic) particles in concentrations sufficient to provide enhanced opacity for the layer. According to one embodiment, opaque outer layer 778 may have reflective properties and provide enhanced opacity due to reflection rather than absorption. According to one embodiment, opaque outer layer 778 may be replaced with a highly reflective layer that likewise provides enhanced opacity. In this case, light rays striking the respective opaque layer (e.g., ray segment 343 of FIG. 13) may be recycled by reflecting such rays back towards light guiding sheet 10 and image print 755. This configuration may be advantageously selected to enhance system efficiency and the apparent brightness of illuminated image print 755 compared to the case of employing outer layer 778 in a light-absorbing configuration.

Light extraction features 8 and/or 9 may include other layers having various useful functions. According to one embodiment, an optically transmissive (or transparent) layer 779 may be provided between particle-loaded binder material 37 and surface 11, as further illustrated in FIG. 13. Optically transmissive layer 779 may be formed by a highly transparent material (e.g., optically clear UV curable ink). Layer 779 may be provided, for example, for enhancing light extraction from light guiding sheet 10 or to promote adhesion of inner layer 777 to surface 11. Transparent layer 779 should preferably have a refractive index that is about the same or greater than that of light guiding sheet 10 to suppress TIR at the optical interface with surface 11. Transparent layer 779 may also include a material that has enhanced adhesion to surface 11 compared to the material of layer 777. According to one embodiment, the adhesion of the material of transparent layer 779 to surface 11 is greater than the adhesion of binder material 37 to surface 11.

According to one embodiment, optically transmissive layer 779 may include color filtering materials (e.g., colored ink). According to one embodiment, optically transmissive layer 779 may include fluorescent or phosphorescent materials (e.g., phosphors) configured for converting light from a shorter wavelength to a longer wavelength. color filtering materials (e.g., colored ink).

According to one embodiment of a method of making wide-area illumination system 900 in a front light configuration, layered light extraction features 8 may be formed by a sequential deposition or reflective and opaque materials to the same discrete X and Y locations of surface 11. For example, light extraction features 8 may be formed by initially printing a suitable pattern of microdots of a UV-curable white ink on surface 11 in a first pass followed by printing the same pattern of microdots of a UV-curable black ink on top of the white-ink microdots in a second pass. According to one embodiment, such overprinting may be performed in succession without repositioning the substrate (light guiding sheet 10) between the first and second passes. This can be done, for example, using a commercial inkjet printer that is capable of printing with different types/colors of ink simultaneously. Similarly, triple-layer light-extraction features 8 (such as that shown on the bottom of FIG. 13) may be printed sequentially in three passes of a print head, without substrate repositioning between the printing passes.

Figure 14:
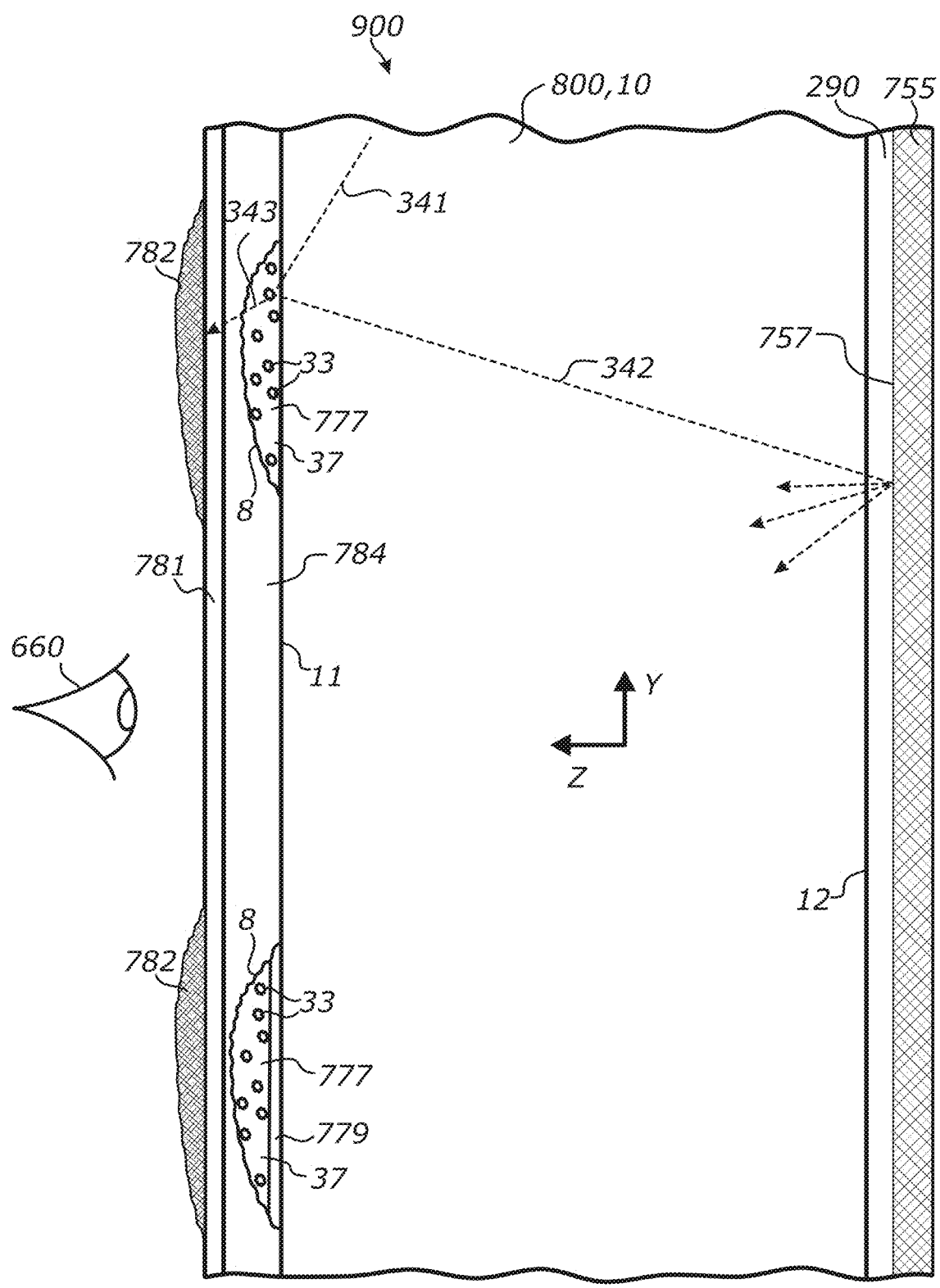
FIG. 14 is a schematic section view and raytracing of a portion of a front light including light blocking areas provided on a transparent substrate, according to at least one embodiment of the present invention.

FIG. 14 schematically depicts an embodiment of wide-area illumination system 900 in a front-light configuration which is similar to that of FIG. 13 except that light absorbing outer layers 778 conformably coating an inner layer of light extraction features 8 are replaced with detached light blocking features 782 disposed in registration with reflective layers 777. Light blocking features 782 are formed on a thin transparent substrate sheet 781 covering surface 11. Light blocking features 782 may be distributed over substrate sheet 781 according to the same two dimensional pattern as light extraction features 8. Furthermore, the patterns of light blocking features 782 and light extraction features 8 may be precisely aligned relatively to each other so that each light blocking feature 782 provides a discrete opaque cover for the respective light extraction feature 8.

Substrate sheet 781 may be advantageously separated from light guiding sheet 10 by a thin spacing layer 784 to accommodate the thickness of light extraction features 8 and to provide an air gap sufficient to maintain TIR in sheet 10. Substrate sheet 781 may conventionally have a film thickness which can be much less than the thickness of light guiding sheet 10, e.g., by at least 2 times, 3 times, 5 times, 10 times or more.

Each light blocking feature 782 is formed by an opaque material which can be light absorptive or reflective. It may be formed by the same materials and using the same methods described in reference to outer layers 778 of FIG. 13. According to one embodiment, light blocking features 782 may be deposited to a surface of substrate sheet 781 that is facing light guiding sheet 10. According to one embodiment, light blocking features 782 are deposited to a surface of substrate sheet 781 that is facing away from light guiding sheet 10 (e.g., as illustrated in FIG. 14). Each light blocking feature 782 should be disposed in registration with the respective light extraction feature 8 and should preferably cover the entire area of light extraction feature 8 from the viewer.

According to one embodiment, the size of each light blocking feature 782 is at least the same or larger than the size of the respective light extraction feature 8. According to different embodiments, the size of light blocking features 782 may be greater than the size of the respective light extraction features 8 by at least 10%, 20%, 30%, 50%, or 100%. According to different embodiments, the area of light blocking features 782 may be greater than the area of the respective light extraction features 8 by at least 10%, 20%, 30%, 50%, 2 times, 3 times and 4 times.

According to one embodiment of a method of making wide-area illumination system 900 in a front light configuration, the method includes a step of depositing a predetermined pattern of microdots of white, colored or fluorescent UV-curable ink (light extraction features 8) to a surface of a light guiding substrate (e.g., surface 11 of light guiding sheet 10) with variable spacing, a step of covering the surface of the light guiding substrate with a thin transparent substrate (which can be exemplified by substrate sheet 781) and a step of depositing the same pattern of microdots of a highly opaque (preferably black or reflective) ink to a surface of the thin transparent substrate (e.g., to form light blocking features 782). The method may further include a step of bonding the thin transparent substrate (substrate sheet 781) to the light guiding substrate (light guiding sheet 10) at select locations (e.g., at edges or corners) to prevent shifting the substrates relatively to each other and ensure that light blocking features 782 are kept in registration with light extraction features 8 when in handling or operation. At the same time, light extraction features 8 may be configured to provide an air gap between substrate sheet 781 and light guiding sheet 10 and minimize optical cross-talk between them.

In operation, the embodiment of wide-area illumination system 900 of FIG. 14 is similar to that of FIG. 13 except that forward-scattered light (as exemplified by ray segment 343) can escape from light extraction features 8 and can propagate a relatively short distance away from surface 11 and towards viewer 660 before it is blocked from further propagation towards viewer 660 by light blocking features 782. Depending on the type of the opaque material used for making light blocking features 782 (e.g., absorbing or reflective), ray segment 343 may be absorbed or reflected and recycled, similarly to several embodiments described above in reference to FIG. 13.

According to an aspect, transparent substrate sheet 781 and a pattern of light blocking features 782 form an opaque mask or overlay that selectively blocks light emitted from areas of light guiding sheet 10 corresponding to light extraction features 8. At the same time, the transparent spacing areas between light blocking features 782 allow for a general unimpeded transverse light passage from image print 755 to viewer 660 and thus allow for a generally unimpeded viewing of image print 755. It may be appreciated that, with a proper alignment of the mask or overlay and with the proper sizing of light blocking features 782, the glare associated with individual semi-opaque light extraction features 8 may be suppressed or even practically eliminated such that the apparent contrast for illuminated image print 755 may be significantly enhanced compared to the case where no such mask or overlay is used.

FIG. 15 schematically shows an embodiment of wide-area light guide illumination system 900 that has three planar light guides stacked on one another along the Z axis. Light guiding sheet 10 represents a first planar light guide, a light guiding sheet 20 represents a second planar light guide, and a light guiding sheet 30 represents a third planar light guide.

According to one embodiment, sheets 20 and 30 may be made from the same material as sheet 10. Sheets 20 and 30 may also have similar or identical dimensions and structure as sheet 10. According to one embodiment, each of sheets 10, 20 and 30 may differ from the other two sheets in one or more of the following: material, structure, composition, thickness, length and/or width dimensions, color, surface texture, and light extraction patterns.

Sheets 10, 20 and 30 are disposed in a close proximity to each other but are also separated from each other by a small air gap of the order of several micrometers. The air gap may be provided, for example, to accommodate the height of light extraction features and also to prevent optical contact between the surfaces of the sheets.

Sheet 10 has light extraction features 8 formed in surface 11 and light extraction features 9 formed in surface 12. Sheet 20 has light extraction features 91 formed in a broad-area surface 21 and light extraction features 92 formed in an opposing broad-area surface 22. Sheet 30 has light extraction features 93 formed in a broad-area surface 31 and light extraction features 94 formed in an opposing broad-area surface 32.

According to one embodiment, substantially all of light extraction features 8, 9, 91, 92, 93 and 94 are formed by microdots of a UV-curable ink, such as white-color light scattering ink, colored ink, fluorescent ink, or any combination of suck inks. The light guiding sheets are patterned such that, when all three sheets are pressed against each other, the light extraction features formed in one sheet can touch the respective surface of an adjacent sheet. For example, light extraction features 9 can touch surface 21 and light extraction features 91 can touch surface 12. In this case, the air gap between sheets 10 and 20 may be primarily defined by the height (or thickness) of light extraction features 9, 91, 92 and/or 93. As shown in FIG. 15, at least some light extraction features 9 may be disposed in spaces between light extraction features 91 and at least some light extraction features 92 may be disposed in spaces between light extraction features 93.

Three different arrays of LEDs are provided to independently illuminate light guiding sheets 10, 20 and 30. Sheet 10 is illuminated by an array of LEDs 2 optically coupled to light input edge surface 13, sheet 20 is illuminated by an array of LEDs 2' optically coupled to a light input edge surface 96, and sheet 30 is illuminated by an array of LEDs 2" optically coupled to a light input edge surface 97.

According to one embodiment, LEDs 2, 2' and 2" may be configured to emit light in different colors (e.g., LEDs 2 can be red, LEDs 2' can be green, and LEDs 2" can be blue) such that the respective patterns of sheets 10, 20 and 30 can emit light in the respective colors. Light guide illumination system 900 of FIG. 15 can be configured to independently emit light in three different colors simultaneously or in a succession. For example, according to one embodiment, light extraction features 8 and 9 may cumulatively form a first pattern configured to display a first image when illuminated, light extraction features 91 and 92 may cumulatively form a different second pattern configured to display a different second image when illuminated, and light extraction features 93 and 94 may cumulatively form a different third pattern configured to display a yet different third image when illuminated. LEDs 2, 2' and/or 2" may be independently controlled and selectively turned on and off to illuminate and display the first, second and/or third pattern or image, respectively. The relative intensity of light emitted from the respective patterns may be controlled by selectively controlling the brightness of the arrays of LEDs 2, 2' and/or 2" (e.g., by individual dimming).

According to one embodiment, light guide illumination system 900 of FIG. 15 may be configured to emit light from both outermost surfaces 11 and 32 and to be viewable from both sides. According to one embodiment, a reflective sheet or surface may be provided on either side (e.g., at surface 11) to limit light emission to one side only (e.g., surface 32). According to one embodiment, light extraction features 8, 9, 91, 92, 93 and/or 94 may have different optical properties (e.g., different colors of the ink used to form the respective light extraction features). Accordingly, when illuminated by LEDs 2, 2' and/or 2", system 900 may be configured to display two, three or more different patterns in different colors or intensity. According to one embodiment, all of the patterns may be displayed simultaneously in an illuminated state by illuminating sheets 10, 20 and 30 by respective LEDs 2, 2' and 2". According to one embodiment, the patterns may be displayed one by one, e.g., by dimming or turning LEDs 2, 2' and 2" on and off in a rapid succession, to produce various conspicuous visual effects, including but not limited to flashing, fading or motion effects.

According to one embodiment, a single LED source (e.g., LED 2) may be used to illuminate all of the three light guiding sheets 10, 20 and 30. In this case, the LED source should preferably have a light emitting aperture that is equal to or slightly less than the combined thickness of light guiding sheets 10, 20 and 30 but greater than a combined thickness of any two of the sheets. According to one embodiment, the LED source may be configured to emit light in a single narrow color range (e.g., in blue color) and the light extraction patterns of different light guiding sheets 10, 20 and 30 may be configured to extract light with different optical effects, e.g., converting the LED light to different colors.

For example, referring to FIG. 15, light extraction features 8 and/or 9 may be configured to scatter a blue light without conversion, light extraction features 91 and/or 92 may include a first fluorescent material configured to convert the blue light into a first color, and light extraction features 93 and/or 94 may include a second fluorescent material configured to convert the blue light into a second color which is different than the first color. Accordingly, wide-area light guide illumination system 900 of FIG. 15 may be configured to display different illuminated patters in different colors from the same wide area even when single-color LED light sources are used.

According to an alternative embodiment, the LED source illuminating all three light emitting sheets 10, 20 and 30 may be configured to emit a generally white light and the emission in different colors may be provided by incorporating various color pigments into the respective light extraction features of different sheets. For example, light extraction features 8 and/or 9 may include a blue or cyan pigment, light extraction features 91 and/or 92 may include a red or magenta pigment, and light extraction features 93 and/or 94 may include a green or yellow pigment.

According to one embodiment, sheets 10, 20 and 30 may be positioned slightly father apart and optical sheets 71 may be inserted in the spaces between the spaced-apart sheets (FIG. 16). According to one embodiment, each optical sheet 71 is a transmissive light diffusing sheet. The transmissive light diffusing sheets may be configured, for example, to mask individual light extraction features or blur the outlines or optical irregularities of the light extraction patterns. According to one embodiment, additional sheets 71 may also be provided on the sides of surfaces 11 and 32 and configured to diffuse light emitted from those surfaces. Alternatively, or in addition to that, a reflective surface may be provided on either side (at surfaces 11 or 32) to recycle light emitted from the respective surface (11 or 32) and cause emitting substantially all of the light extracted from sheets 10, 20 and 30 through the opposite surface (32 or 11, respectively).

FIG. 17 schematically illustrates an embodiment of light guide 800 including several different types of light extraction features formed in both opposing broad-area surface 11 and 12. Light extraction features 402 exemplify round dome-shaped, fully cured microdots of a UV ink formed on surfaces 11 and 12 of light guiding sheet 10. Light extraction features 404 exemplify flat-top microdots of a UV ink. Each flat-top microdot may have a rounded trapezoidal shape having a constant or near-constant thickness for at least 50%, 60%, 70%, 80% or 90% of its area.

Light extraction features 406 exemplify small spherically shaped bumps, protrusions or microlenses formed in surfaces 11 and 12. Light extraction features 408 exemplify rounded dimples formed in surfaces 11 and 12. Light extraction features 410 exemplify conical dimples or triangular prismatic grooves formed in surfaces 11 and 12. Light extraction features 412 exemplify conical or triangular prismatic protrusions formed in surfaces 11 and 12.

Light extraction features 414 exemplify high-aspect-ratio cavities or grooves formed in surfaces 11 and 12. By way of example and not limitation, the cavities, dimples or grooves may be formed by any of the following methods: molding (e.g., compression or injection molding), embossing (e.g., hot embossing), etching (e.g., chemical or ion bombardment), or laser ablation. According to one embodiment, sheet 10/light guide 800 is made from an acrylic material and the cavities, dimples or grooves are formed using a $CO_2$ laser ablation. Light extraction features 407 exemplify a continuous series of microstructures or undulations formed surfaces 11 and 12. Such microstructures or undulations may include both cavities and protrusions formed in the respective surfaces and may be configured to scatter the extracted light across a wide range of directions.

A light extraction feature 416 exemplifies a compound light extraction structure that is formed by light extraction feature 406 (spherically shaped bump, protrusion or microlens) overprinted with light extraction features 402 formed by a round dome-shaped, fully cured microdot of a UV ink that has approximately same or slightly larger dimensions as the underlying light extraction feature 406 and that is conformably coating light extraction feature 406. A light extraction feature 418 exemplifies a different compound light extraction structure that is formed by light extraction feature 408 (rounded dimple in surface 11) overprinted with light extraction features 402 which fills the respective dimple with a light scattering ink material and has approximately same (or slightly larger) dimensions as the underlying dimple. A light extraction feature 419 exemplifies a yet different compound light extraction structure that is formed by light extraction feature 407 overprinted with flat-top light extraction features 404 which overcoats the respective surface microstructures or undulations formed in surface 12. The same principles of forming compound light extraction structures may be applied without limitations to other types light extraction features employing surface structures (e.g., such as those illustrated in FIG. 17). The compound light extraction structures may include several printed optical layers and may be advantageously used, for example, for enhancing the light extraction efficiency or for adding further control to the angular distribution of light emitted from light guide 800.

It is noted that FIG. 17, illustrating a cross-section of light guide 800, also exemplifies highly elongated (linear) geometrical configurations of light extraction features 402, 404, 406, 408, 410, 412, and 414, which may have a longitudinal axis perpendicular to the YZ plane (parallel to the X axis). The longitudinal lengths of the light extraction features 402, 404, 406, 408, 410, 412, and 414 (in a linear configuration), as measured along the X axis, may vary in a broad range. According to one embodiment, the lengths of the respective light extraction features may be at least two or three times of their width measured along the Y axis but much less than the respective dimension of sheet 10, as measured along the X axis. According to one embodiment, at least some of linear light extraction features 402, 404, 406, 408, 410, 412, and 414 may have lengths that approximates the respective dimension of sheet 10, as measured along the X axis. According to one embodiment, linear light extraction features 402, 404, 406, 408, 410, 412, and 414 may be oriented along a perpendicular direction, e.g., parallel to the Y axis. According to one embodiment, linear light extraction features 402, 404, 406, 408, 410, 412, and 414 may be oriented at an oblique angle with respect to the X axis and/or Y axis.

It should be understood that the above teachings in reference to light extraction features 402, 404, 406, 408, 410, 412, and 414 may be applied, without limitations, to configuring any of light extraction features 8, 9, 91, 92, 93, and 94 described in the preceding embodiments and any of the light extraction features of the embodiments described below. Furthermore, the different types or configurations of light extraction features described above can be combined within the same light guiding sheets (e.g., sheets 10, 20 and/or 30), for example, to achieve different visual effects (e.g., displaying different illuminated patterns and/or colors, statically or in succession) or to obtain different predefined luminance distributions. For example, surface 11 of light guiding sheet 10 may have micro-dots of white UV-curable ink having one composition (e.g., a first volumetric density of light scattering particles within a transparent binder), micro-dots of white UV-curable ink having a different composition (e.g., a second volumetric density of light scattering particles within the transparent binder), and micro-cavities, dimples or micro-bumps distributed across the surface according to a two-dimensional pattern. According to one embodiment, light extraction features of one type or composition may be formed in surface 11 and light extraction features of a different type or composition may be formed in opposite surface 12.

Furthermore, the teachings of embodiments described herein in reference to light extraction features 8 or 9 may be applied, without limitations, to configuring any of light extraction features described in reference to other embodiments of illumination system 900. According to one embodiment, light extraction features 402, 404, 406, 407, 408, 410, 412, and 414 may be configured to overlap with one another, including the case when the overlapping light extraction features are of a different type. For example, light extraction features 402 and/or 404 formed by printed microdots of a UV ink may be disposed on top of light extraction features 406, 407, 408, 410, 412 and/or 414 representing surface relief structures formed in surfaces 11 and/or 12 (e.g., by means of overprinting. When the bottom light extraction features represent protrusions in surface 11 or 12 (e.g., light extraction features 406, 407 or 412), the overprint (e.g., light extraction features 402 and/or 404) may conformably coat such protrusions. When the bottom light extraction features include cavities in surface 11 or 12 (e.g., light extraction features 407, 408, 410, 414), the overprint (e.g., light extraction features 402 and/or 404) may be configured to seal the respective cavities and preserve the refractive or TIR optical interfaces of the cavities. Alternatively, the overprint may be configured to partially or completely fill the respective cavities. According to one embodiment, the volume of the overprint may be less or equal to the volume of the cavity. According to one embodiment, the volume of the overprint may be greater than the volume of the cavity such that the respective overlapping light extraction features cumulatively form a protrusion in surface 11 or 12.

FIG. 18 through FIG. 21 schematically show polar luminous intensity distribution graphs calculated using optical raytracing for different configurations and combinations of light extraction features formed in broad-area surfaces of a thin planar light guide illuminated from two opposite edges by arrays of LED sources, e.g., as illustrated by the example of LEDs 2 optically coupled to edge surfaces 13 and 14 in FIG. 1. The sampling plane selected for each graph is perpendicular to the prevalent plane of the planar light guide and to both light input edges. In other words, the sampling plane illustratively corresponds to a plane parallel to the YZ plane in FIG. 1 when light is input through edge surfaces 13 and 14 only. Assuming a horizontal orientation of the planar light guide, the upper half of each graph corresponds to an upward emission from the top surface of the light guide and the lower half of each graph corresponds to a downward emission from the bottom surface of the light guide.

Figure 18:
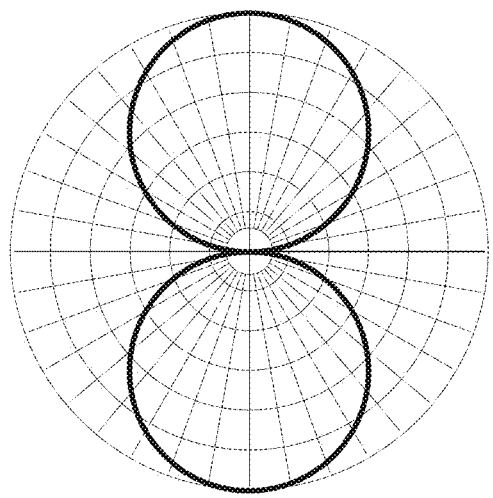
FIG. 18 is a calculated polar luminous intensity distribution graph for an exemplary configuration of light extraction features, showing a symmetrical Lambertian emission from opposing broad-area surfaces of a planar light guide with equal top/bottom light output, according to at least one embodiment of the present invention.
Figure 19:
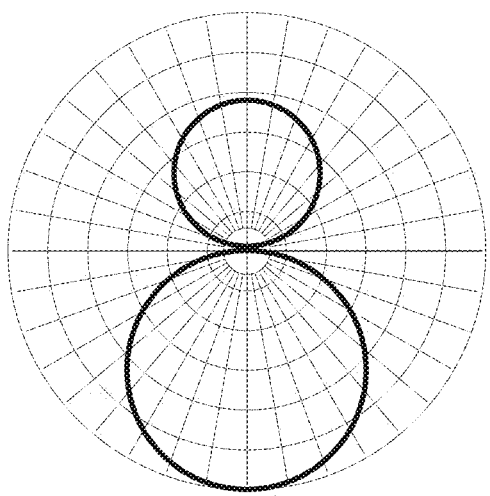
FIG. 19 is a calculated polar luminous intensity distribution graph for an alternative exemplary configuration of light extraction features, showing a Lambertian emission from opposing broad-area surfaces of a planar light guide with unequal top/bottom light output, according to at least one embodiment of the present invention.
Figure 20:
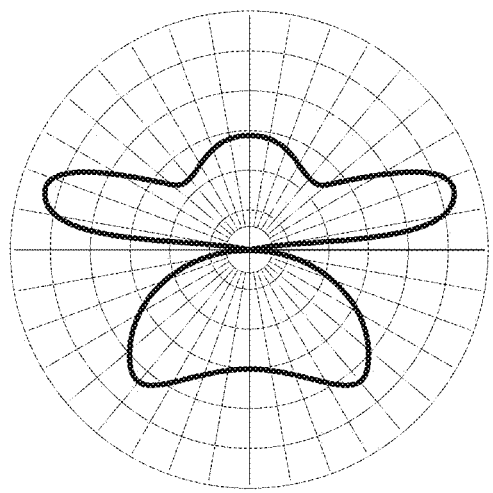
FIG. 20 is a calculated polar luminous intensity distribution graph for a further alternative exemplary configuration of light extraction features, showing different types of "batwing" emission from opposing top and bottom broad-area surfaces of a planar light guide, according to at least one embodiment of the present invention.
Figure 21:
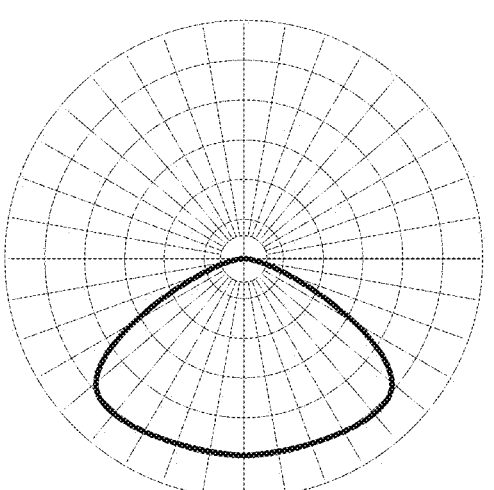
FIG. 21 is a calculated polar luminous intensity distribution graph for a yet further alternative exemplary configuration of light extraction features, showing a directional emission from a broad-area surface of a planar light guide, according to at least one embodiment of the present invention.

By way of example and not limitation, the optical configurations of wide-area light guide illuminations systems which angular emission distributions are illustrated in FIG. 18 through FIG. 20 may be advantageously selected for direct/indirect illumination (e.g., incorporated into a suspended lighting fixture) while the configuration corresponding to FIG. 21 may be advantageously selected for direct-only illumination (e.g., incorporated into a recessed or surface-mount downlight troffer).

FIG. 18 shows a symmetrical luminous intensity distribution in which light output from opposite top and bottom broad-area surfaces of the light guide is near identical in terms of both the angular dependence and the total energy of emitted light. The angular distribution patterns for each side (e.g., top and bottom) of the light guide closely approximate that of a Lambertian (cosine) emission having an equivalent overall light output.

FIG. 19 is a calculated polar luminous intensity distribution graph for an alternative exemplary configuration of light extraction features which produce a substantially Lambertian emission from both the top and bottom surfaces with the overall light output from the bottom surface being significantly greater than the overall light output from the top surface. According to different embodiments, the light extraction pattern may be configured to produce a ratio between the peak luminance of the top surface and the peak luminance of the bottom surface (e.g., along a normal direction) which may take one of the following values (or any ranges in between): 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 4, or 5.

FIG. 20 is a calculated polar luminous intensity distribution graph for a further alternative exemplary configuration of light extraction features that produces two different angular emission distributions of a "batwing" type. The top surface produces a "batwing" angular emission with a wide throw and a small on-axis "bulge". The bottom surface produces a "batwing" angular emission with a much narrower throw and with a reduced on-axis intensity.

FIG. 21 is a calculated polar luminous intensity distribution graph for a yet further alternative exemplary configuration of light extraction features and for the case where a semi-specular reflective sheet is placed on top of the top surface of the edge-lit light guide such that the light is emitted in a downward direction only. The resulting angular intensity distribution is directional with the intensity being near constant within a range of angles between about −50° to about +50° from a surface normal.

Example 2

A wide-area light guide illumination system was made using an edge-lit planar acrylic light guide having a thickness of about 1.5 mm and major dimensions of about 600 mm by 600 mm. The light guide was patterned on one side using microdots of a UV-cured white ink. The light guide was illuminated from two opposing edges using two strips of phosphor-converted white SMD LEDs positioned in a close proximity to the respective edge surfaces. The total light output of the two bare LED strips (without the light guide) was measured at 4,500 lumens.

The dimensions of the light emitting aperture of each LED were about 1.2 mm by 1.2 mm. The light extraction pattern was produced by a randomized two-dimensional array of microdots deposited to the light guide surface using a commercial flatbed UV printing machine (a UV printer). The density of the pattern was made gradually increasing from the light input edges towards the center of the light guide. Each light extraction feature was represented by an individual microdot produced by a single droplet of the UV ink. Each microdot had a size of approximately 100-130 micrometers and a maximum thickness of about 6 micrometers in the center. The volume of each microdot was about 40,000 cubic micrometers. No light diffusing or reflective sheets were included into the wide-area light guide illumination system of this example.

The luminous intensity distributions of the emission from the top and bottom surfaces were measured using a Type C Goniophotometer System. The light guide was oriented horizontally with the surface patterned with light extraction features facing up. The results of the goniophotometric measurements are summarized in the annotated polar luminous intensity distribution graph shown in FIG. 22. The intensity units on the graph are candelas.

Figure 22:
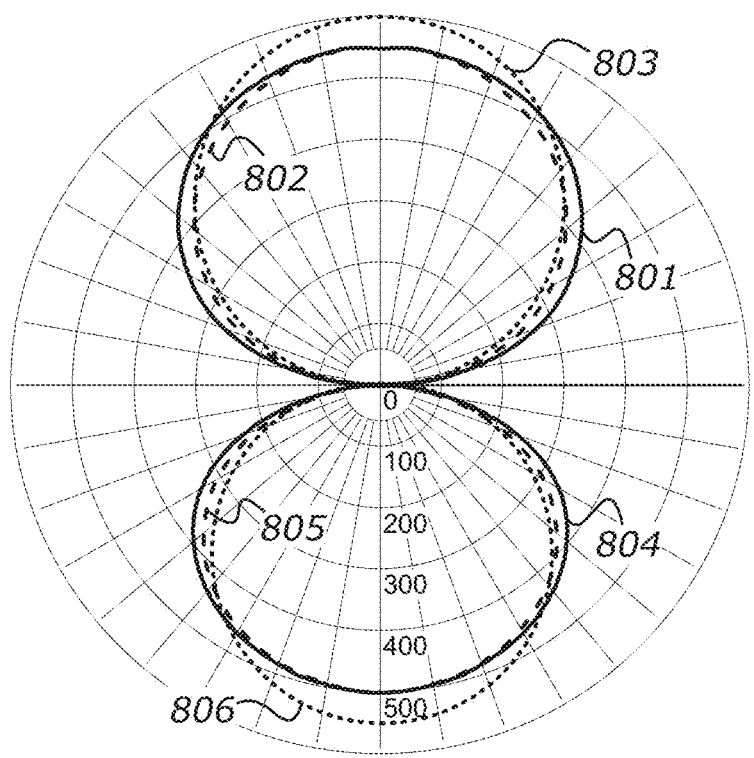
FIG. 22 is a measured polar luminous intensity distribution graph for an exemplary configuration of a wide-area illumination system, showing a quasi-Lambertian emission from opposing top and bottom broad-area surfaces of a planar light guide, according to at least one embodiment of the present invention.

Referring to FIG. 22, a curve 801 represents a measured angular dependence of the luminous intensity of the emission from the top surface of the light guide in a first vertical plane (through horizontal angles 0°-180°). A curve 802 represents a measured angular dependence of the luminous intensity of the emission from the top surface in a second (orthogonal) vertical plane (through horizontal angles 90°-270°). A curve 803 represents a calculated reference angular dependence of the luminous intensity for a Lambertian emitter of a similar total light output compared to the top surface.

Referring further to FIG. 22, a curve 804 represents a measured angular dependence of the luminous intensity of the emission from the bottom surface of the light guide in a first vertical plane (through horizontal angles 0°-180°). A curve 805 represents a measured angular dependence of the luminous intensity of the emission from the bottom surface in a second (orthogonal) vertical plane (through horizontal angles 90°-270°). A curve 806 represents a calculated reference angular dependence of the luminous intensity for a Lambertian emitter of a similar total light output compared to the bottom surface.

As it can be seen from the graph, both the top and bottom surfaces produced near-Lambertian angular intensity distributions with the deviations from the "ideal" Labmertian distribution being about 10% or less for most observation angles. The total light output from the patterned top surface was about 10% greater than that from the non-patterned bottom surface.

Example 3

Figure 23:
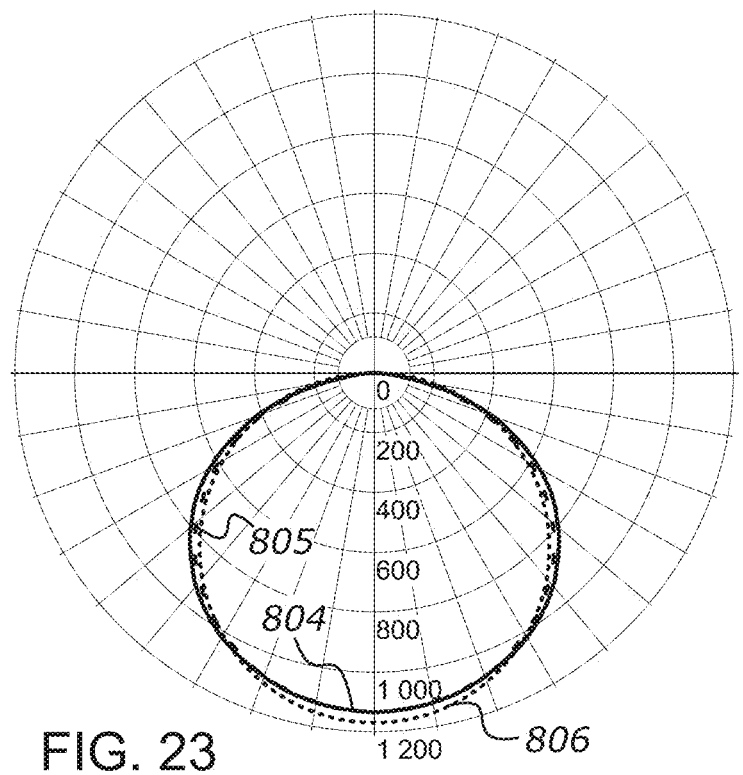
FIG. 23 is a measured polar luminous intensity distribution graph for an exemplary configuration of a wide-area illumination system, showing a near-Lambertian emission from a single broad-area surface of a planar light guide, according to at least one embodiment of the present invention.

The wide-area light guide illumination system described the Example 2 was modified by adding an opaque diffuse reflector above the top surface of the planar light guide and measured using the same procedure. The measurement results are summarized in the annotated polar luminous intensity distribution graph shown in FIG. 23. Referring to FIG. 23, the total light output from the bottom surface approximately doubled compared to the Example 2 as a result of light reflection from the opaque diffuse reflector. Furthermore, the measured emission in both orthogonal planes became even more closely resembling the "ideal" Lambertian emission normalized to the same total light output. The deviation between the measured intensity and the calculated intensity based on the Lambertian law constituted 5% or less for most measured angles. Due to the high opacity of the top reflector (~100%), virtually no light was emitted from the top surface of the device.

Example 4

Figure 24:
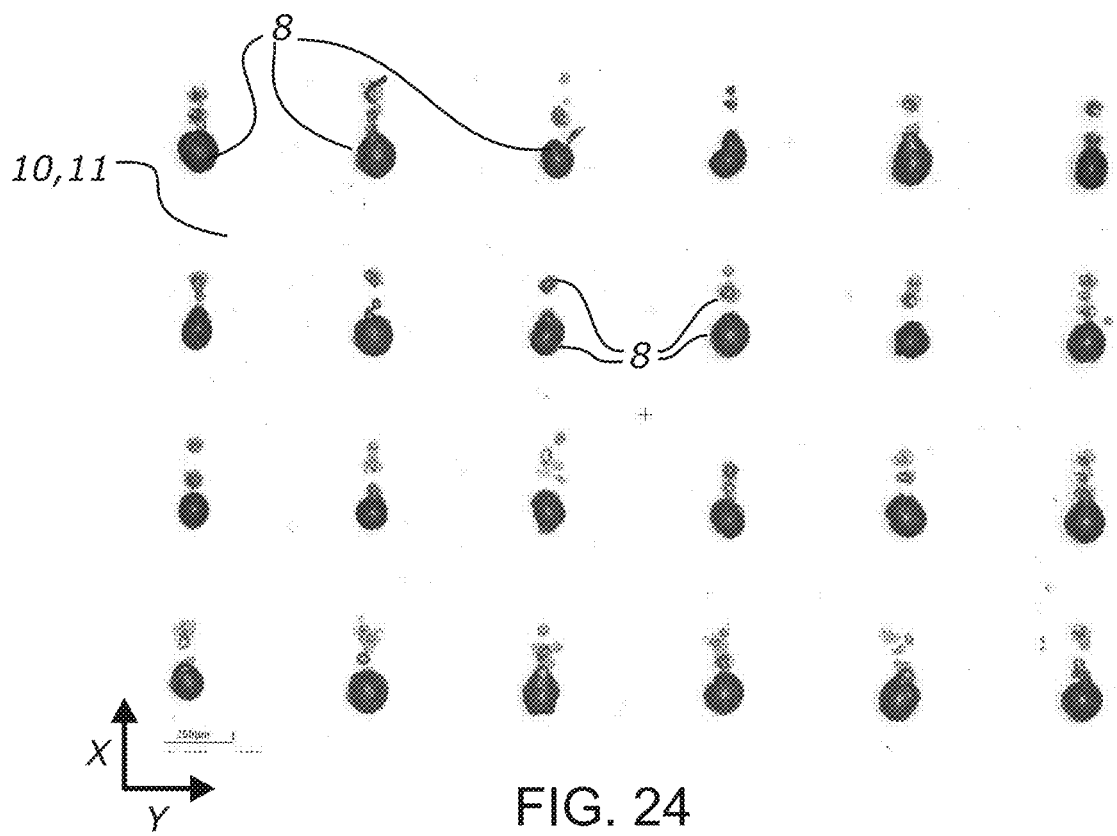
FIG. 24 is a photograph of an ordered pattern of semi-opaque light extraction features printed on a surface of a light guiding sheet, according to at least one embodiment of the present invention.

FIG. 24 shows an annotated photograph of an ordered light extraction pattern of semi-opaque microdots printed on a broad-area surface (exemplifying surface 11) of a planar acrylic sheet (exemplifying light guiding sheet 10). Each of the printed microdots formed a discrete light extraction feature on the surface (exemplifying individual light extraction feature 8). The light extraction pattern was printed using a semi-opaque UV-curable white ink containing $TiO_2$ particles in concentrations from 5% to 15% by weight. The printed pattern had a fixed pitch in both X and Y directions and included microdots of different sizes. At least some of the larger light extraction features 8 were formed by individual microdrops of the UV ink each having a volume of around 40,000 cubic micrometers.

Example 5

Figure 25:
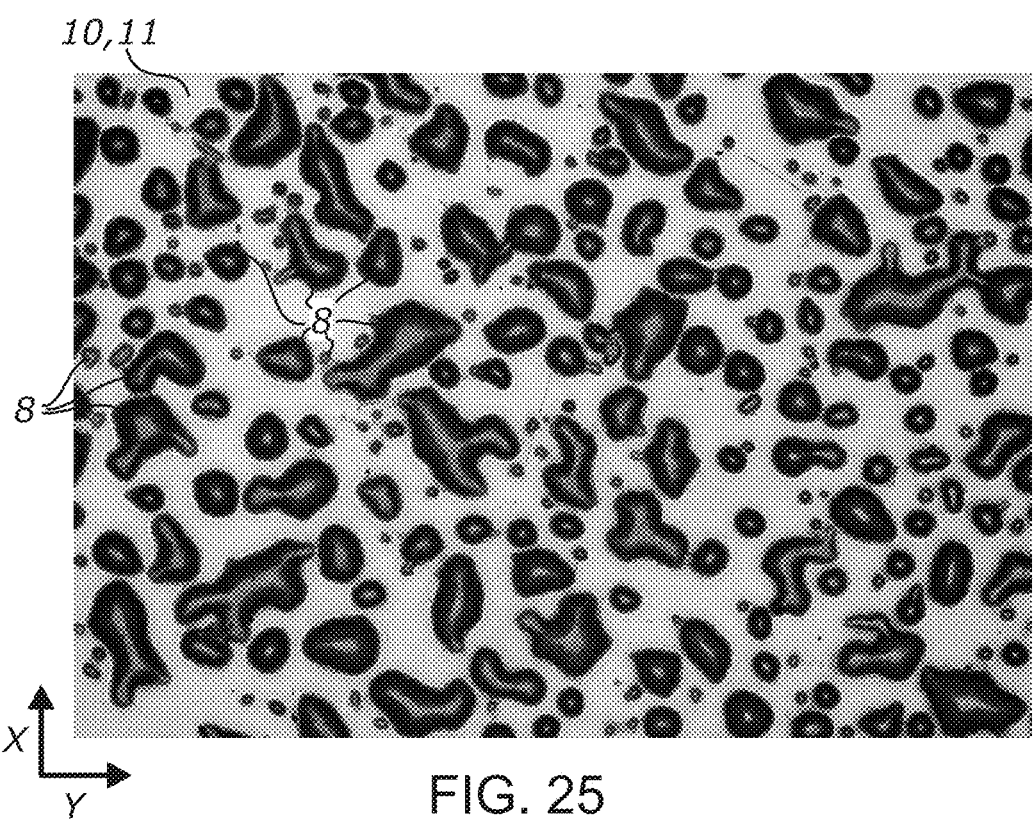
FIG. 25 is a photograph of a random pattern of semi-opaque light extraction features printed on a surface of a light guiding sheet with a relatively high areal density, according to at least one embodiment of the present invention.

FIG. 25 shows an annotated photograph exemplifying a random pattern of light extraction features 8 printed using the same type of ink and printing hardware as in the Example 4. The resulting printed pattern of FIG. 25 included a random mix of different shapes (including regular, quasi-regular, round, elongated, irregular and highly irregular shapes), orientation and sizes.

Example 6

Figure 26:
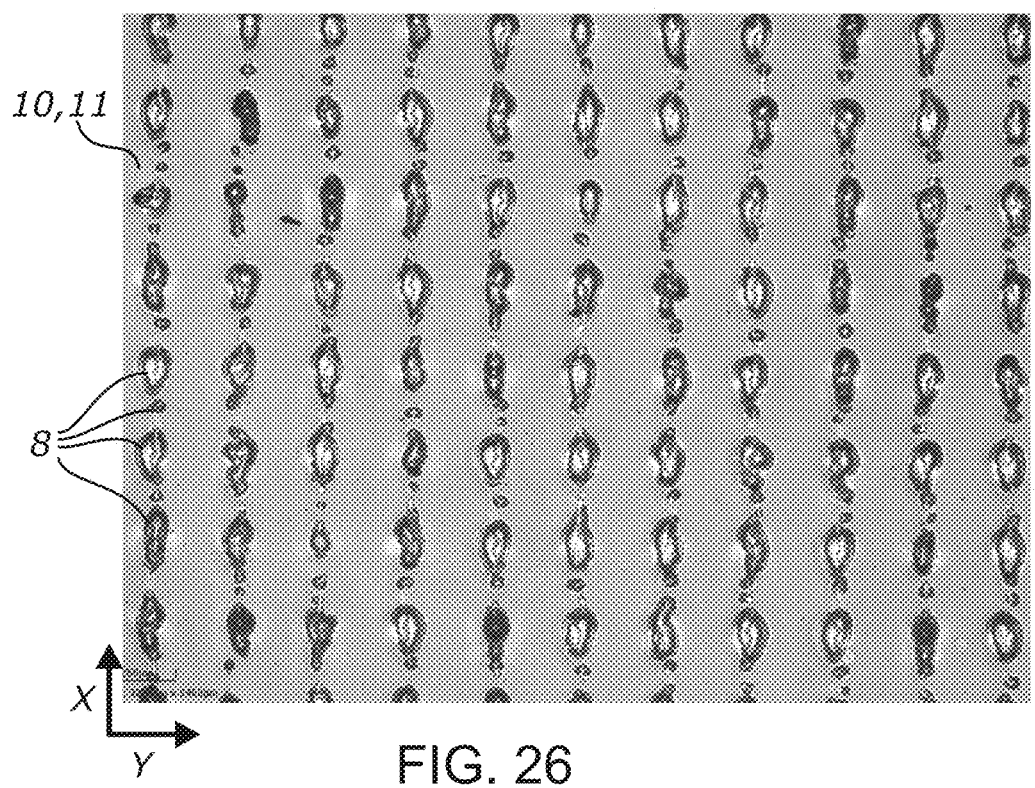
FIG. 26 is a photograph of an ordered pattern of optically clear, elongated light extraction features printed on a surface of a light guiding sheet, according to at least one embodiment of the present invention.

FIG. 26 shows an annotated photograph of an ordered pattern of optically clear microdots (transparent light extraction features 8) printed on a surface of light guiding sheet 10 using a transparent UV-curable ink. The microdots in this print had elongated shapes generally aligned parallel to the X axis.

Example 7

Figure 27:
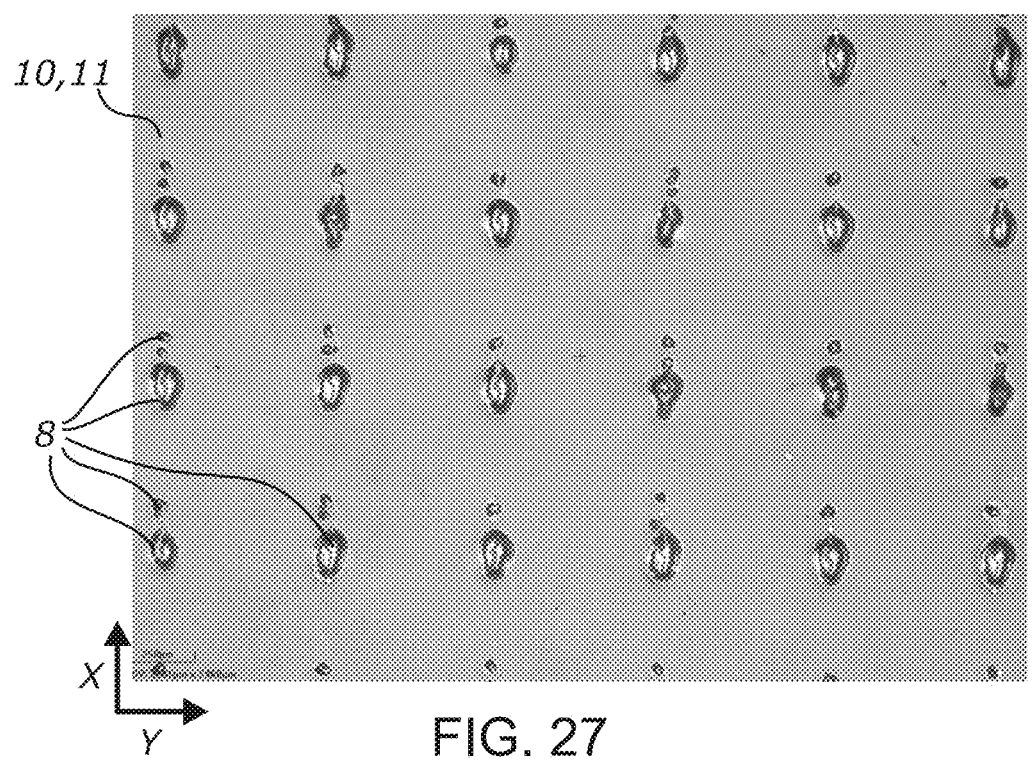
FIG. 27 is a photograph of a lower-density ordered pattern of optically clear, elongated light extraction features printed on a surface of a light guiding sheet, according to at least one embodiment of the present invention.

Similarly, FIG. 27 shows an annotated photograph of optically clear microdots (transparent light extraction features 8) that were printed at a different location of the same substrate (light guiding sheet 10) using the same type of ink as in the Example 6 but using a lower density of the pattern (greater spacing distances SPD between adjacent microdots).

Example 8

Figure 28:
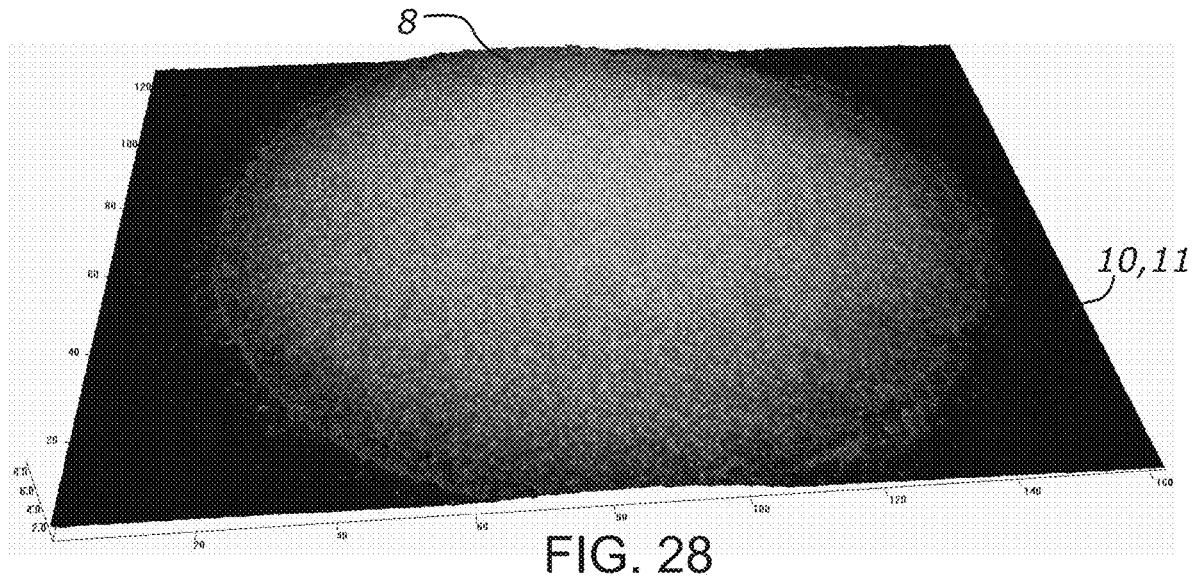
FIG. 28 is a microphotograph of an individual semi-opaque light extraction feature printed on a surface of a light guiding sheet and having a round or near-round shape at the base, according to at least one embodiment of the present invention.

FIG. 28 shows an annotated three-dimensional photograph (obtained using an imaging 3D microscope/optical surface profiler) of individual light extraction feature 8 formed by a microdot of semi-opaque, UV-curable white ink. The microdot had a shallow spherical shape with a substantially round, regular outline. The diameter of the shallow dome-shaped microdot was about 130 micrometers and the maximum thickness at the center was about 8 micrometers.

Example 9

Figure 29:
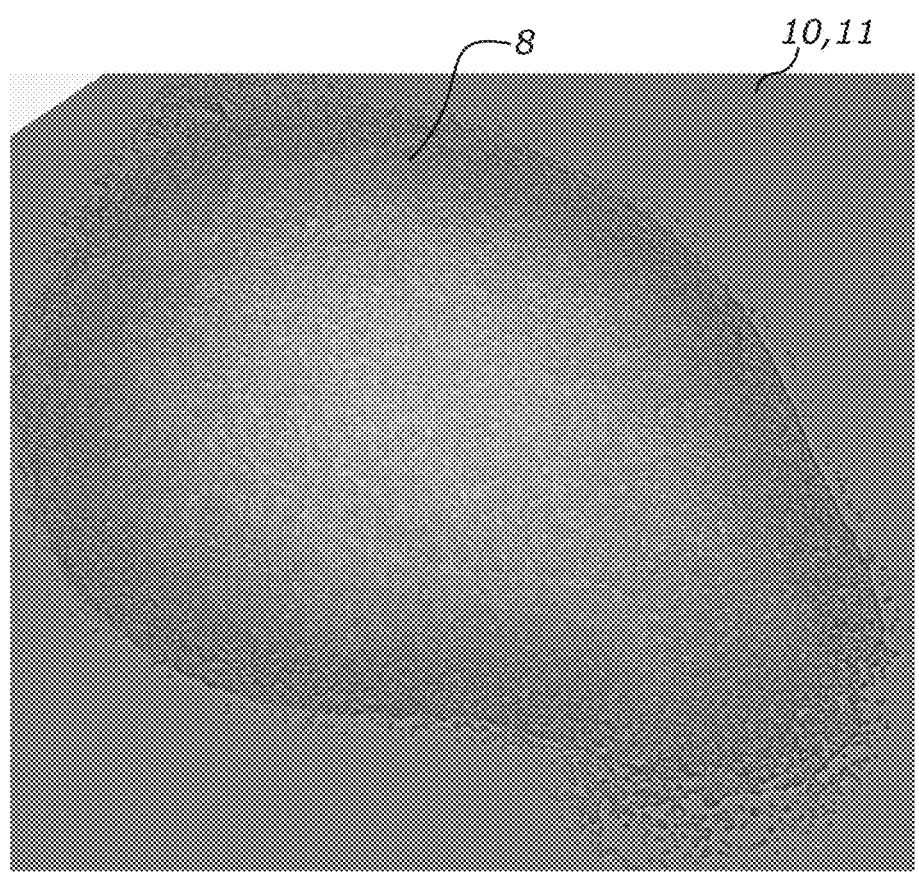
FIG. 29 is a microphotograph of an individual semi-opaque light extraction feature printed on a surface of a light guiding sheet and having an irregular elongated shape at the base, according to at least one embodiment of the present invention.

FIG. 29 illustrates an individual printed microdot (light extraction feature 8) which is similar in size and composition to that of the Example 8, except that is has an irregular, elongated shape with somewhat fuzzy borders at the longitudinal ends of the elongated shape.

Example 10

Figure 30:
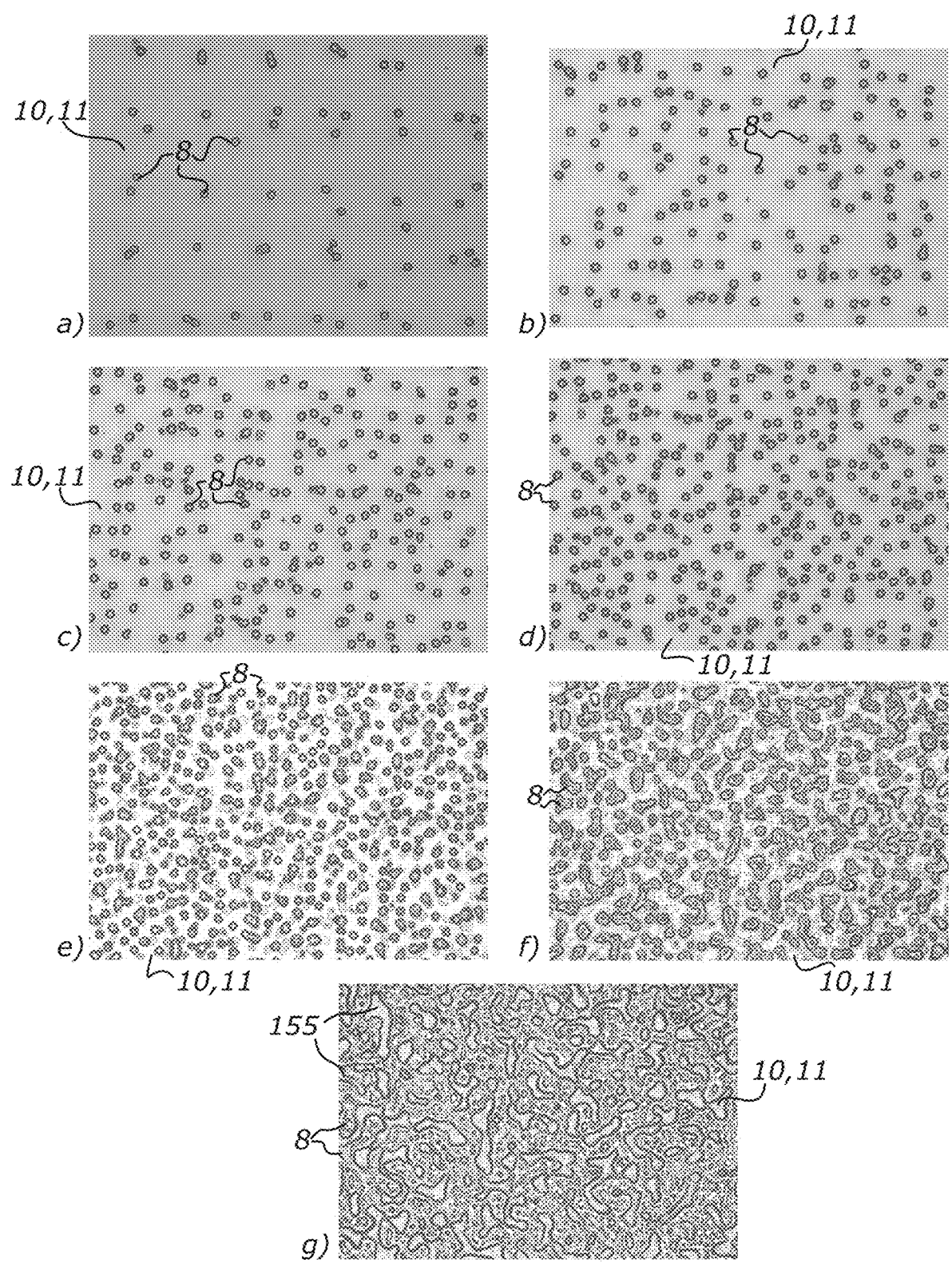
FIG. 30 is a series of photographs of portions of a surface of a planar light guide, showing different patterns and distribution densities of microdots of a light scattering material, according to at least one embodiment of the present invention.

A planar acrylic light guide (exemplifying light guiding sheet 10) was patterned for light extraction using a two-dimensional randomized pattern of microdots formed by a white-color UV-curable ink including light-scattering nanoparticles suspended in a clear binder material. The microdots were deposited to one of the broad-area surfaces of the light guide using a different commercial UV printing machine and using a different printing regime compared to the previous Examples. The overall light extraction pattern included areas of different distribution density of the microdots (sub-patterns). A series of photographs of different sampling areas of the patterned surface corresponding to different distribution densities of the microdots was taken using a microscope camera. The resulting photographs, enumerated a) through g), are shown in FIG. 30. The field of view of each photograph is approximately 3.3 mm by 2.5 mm.

Photograph a) shows relatively sparsely populated microdots (representing individual light extraction features 8) which correspond to an area of surface 11 that is relatively close to a light input edge (not shown). The microdot patterns within same-sized sampling areas gradually become denser with the increase of the distance from the light input edge, as shown in photographs b) through d), but still without significant overlaps of individual microdots.

Photograph e) illustrates a sampling area that is located even further away from light input edge and has an even greater density of the microdots (with lower spacing distances SPD) compared to the sampling areas depicted on photographs a) through d). As it can be seen from photograph e), at least some of the adjacent microdots partially overlap one another.

Photograph f) illustrates a sampling area located even further away from light input edge and having an even greater distribution density of the microdots. There is also a substantial amount of overlap between adjacent microdots (having less-than-zero separation distances SED), including groups of 2, 3 or more overlapping microdots. Photograph g) depicts a sampling area characterized by yet even greater density of the microdots which overlap in large groups and create a continuous, randomly textured three-dimensional light extraction surface with occasional random voids 155. Voids 155 were substantially free from the light scattering material or contained a substantially reduced amount of the light scattering material compared to the adjacent surface textures produced by the fully loaded light scattering ink material.

Figure 32:
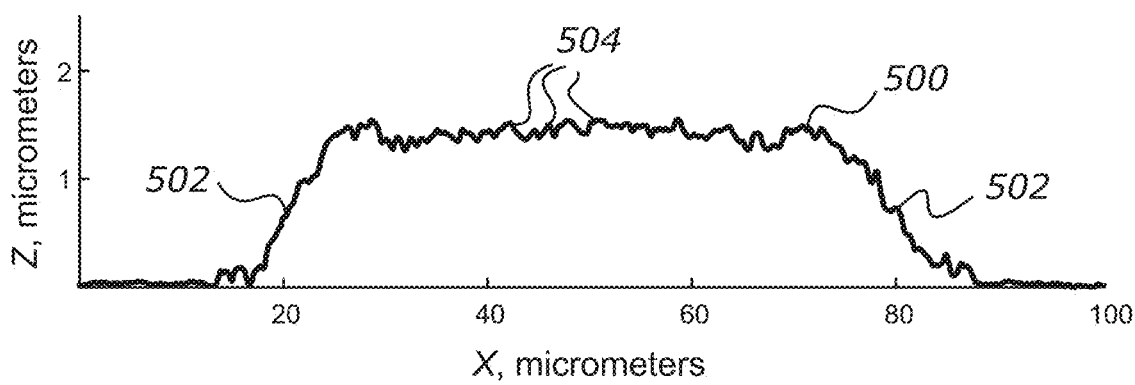
FIG. 32 is a graph showing a measured cross sectional height profile of the microdot depicted in FIG. 31.
Figure 31:
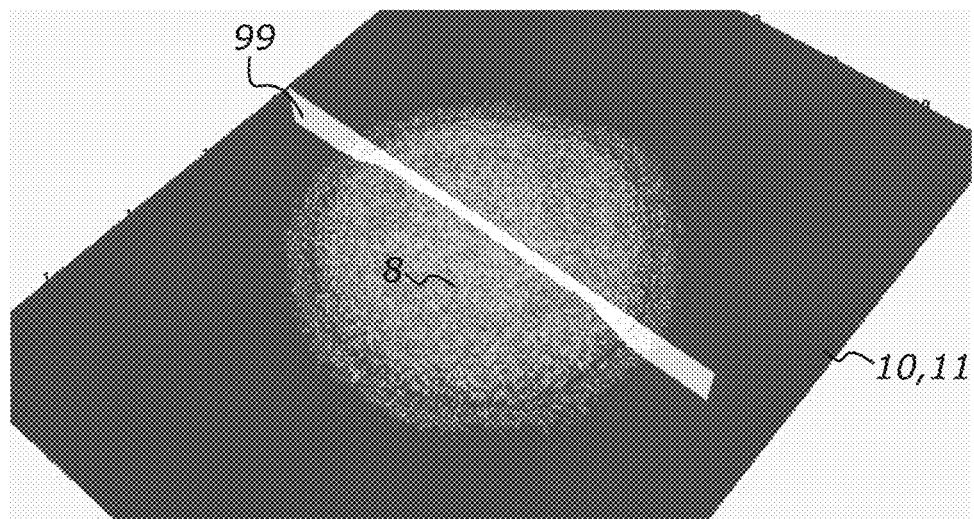
FIG. 31 is a three-dimensional composite image of an exemplary individual microdot of a light scattering material on a surface of a planar light guide, according to at least one embodiment of the present invention.

FIG. 31 shows a composite three-dimensional image of an individual printed microdot (exemplifying individual light extraction feature 8), which shape and dimensions were typical for at least some portions of the light extraction pattern produced in this Example. The image was obtained using a 3D surface profiler/microscope from Zeta Instruments (model Zeta-200). FIG. 32 shows a cross-sectional surface profile (a curve 500) of the printed microdot taken along a cutting plane 99 passing through a mid-section of the microdot.

As can be seen from FIG. 31 and FIG. 32, the exemplary printed microdot has a generally round shape with a "flat-top" (truncated cone) 3D geometry, a narrow (<5 micrometers) outer rim with a relatively low (<0.2-0.3 microns) thickness, sloped side walls (visualized as walls 502 of curve 500), a diameter between 70 and 80 micrometers, and a near-constant thickness between 1.2 and 1.5 micrometers in the area between the sloped side walls. The volume of the exemplary printed microdot (in the fully cured, solid state) was measured at about 4,000 cubic micrometers.

As demonstrated by surface profile curve 500, the surface of the exemplary microdot had random surface irregularities 504 on a scale of the order of 0.1 micrometer. The random surface irregularities can also be seen in the form of a visible matte-finish surface texture on the microphotograph of FIG. 31. Somewhat similar surface irregularities may also be noted for light extraction feature 8 depicted in FIG. 28. According to an aspect, the exemplary printed microdot represented a thin, semi-opaque layer of a light scattering material (white ink) having a near-constant thickness of the order of one micrometer and occupying a round area having a diameter of less than 80 micrometers.

Example 11

A thin and flexible sheet of highly transparent plastic material (which was subsequently used as a planar light guide in an edge-lit illumination system) was patterned for light extraction using a two-dimensional randomized pattern of microdots. The microdots were formed by a light-scattering, non-absorbing, white-color UV-curable ink including light-scattering nanoparticles suspended in an optically clear binder material. The binder material has a refractive index of about 1.52. The microdots were deposited to one of the broad-area surfaces of the thin and flexible sheet (light guide) using a yet different commercial UV printing machine and using a yet different printing regime compared to the previous Examples. Each microdot was formed by an individual drop of the UV ink which was instantly cured (within a fraction of a second) upon printing to the sheet surface. An LED UV lamp operably attached to the print head was used for UV ink curing. The UV ink was recirculated within a closed-path fluid recirculation circuit within the UV printing machine and heated to about 40-45° C. within the print head. The volume of each ink drop (microdrop) was selected at approximately 15-20 picoliters. Upon curing, each printed microdot formed a solid, round-shape light extraction surface feature/structure having a volume of about 15,000-20,000 cubic micrometers and a diameter of about 100 micrometers.

Figure 41:
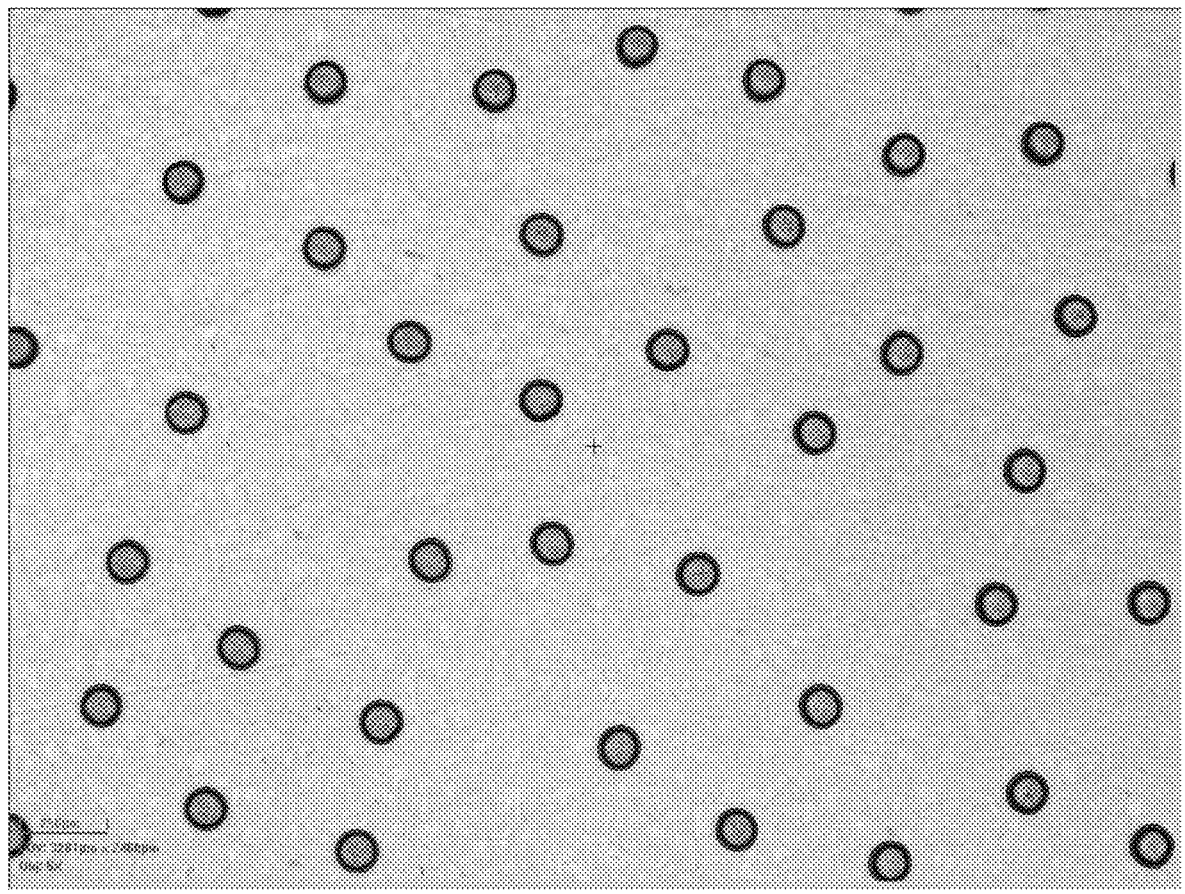
FIG. 41 is a photograph of an exemplary randomized pattern of light extraction features printed on a surface of a light guiding substrate using UV curable light scattering ink and an instant cure printing process.

The density of the printed pattern was gradually increased with a distance from the light input edge such that at least some microdots formed at the opposite edge overlapped on one another. The density gradient was calculated using computer raytracing and optical modeling configured to identify a density distribution which would produce a relatively uniform emission pattern. FIG. 41 shows the photograph of a 3.3 mm×2.5 mm sampling area of the resulting printed pattern of light extraction surface features/structures.

The light guide retained a perceptibly high degree of transparency after it was patterned. For example, objects could clearly be seen through the patterned light guide when it was not illuminated from the inside. When illuminated by a series of LEDs optically coupled to an edge of the sheet, the resulting printing-patterned light guide produced a highly uniform emission with the intensity variations of surface emission of about 5% or less from the average intensity. The emission was distributed between the sides of the light guide approximately 55%/45% proportions. The angular distribution of the emission was nearly-Lambertian from each side of the light guide.

End of Example 11

Figure 33:
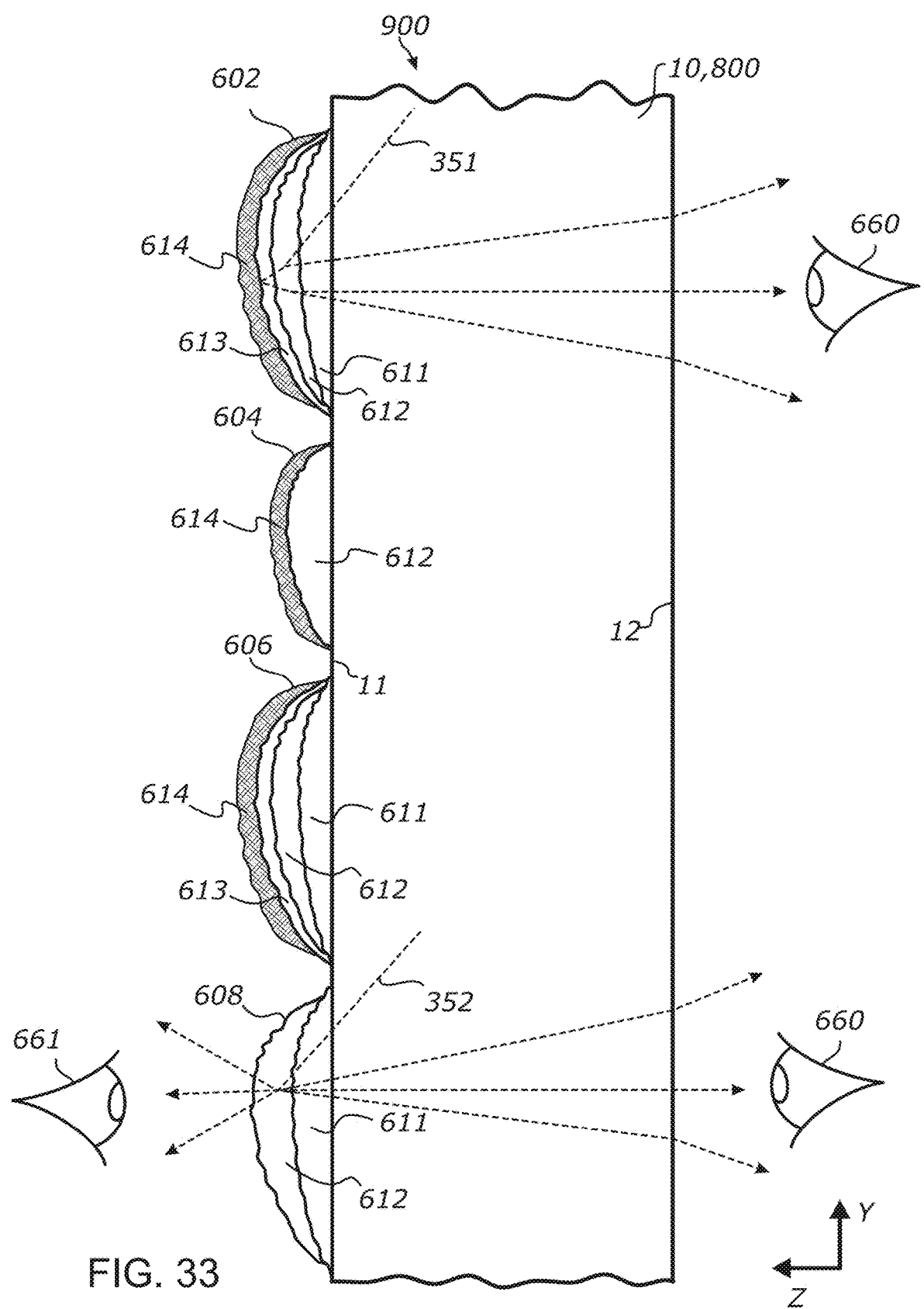
FIG. 33 is a schematic section view and raytracing of a portion of a wide-area light guide illumination system in a backlight configuration, showing light extraction features having different structures and composition, according to at least one embodiment of the present invention.

FIG. 33 shows an embodiment of light guide illumination system 900 having light extraction features of different types and composition. A light extraction feature 602 is formed by a layered surface structure including layers 611, 612, 613 and 614 disposed on top of each other. Each outer layer may be conformably coating the respective layer disposed below. Layer 611 is formed by an optically transmissive UV-curable color ink (e.g., red, green, blue, yellow, magenta, or cyan) having a refractive index which is equal to or greater than the refractive index of light guiding sheet 10. Layer 612 is formed by a UV-curable light scattering ink provided at a thickness such that the resulting layer is semi-opaque and substantially non-absorbing. Layer 613 is formed by an optically clear adhesive material (e.g., UV-curable clear primer ink). Outer layer 614 is formed by a highly opaque reflective material (e.g., UV-curable metallic ink or aluminum foil) conformably coating the inner layers. A further protective layer (e.g., clear lacquer or colored ink) may be further deposited on top of layer 614. At least some or all layers forming light extraction feature 602 may have elastic or viscoelastic properties even when fully cured. Such properties may be advantageously selected, for example to support repeated flexing of the patterned portions of sheet 10. Sheet 10 of FIG. 33 may be illuminated from one or more edges using LEDs 2 (not shown) emitting white light.

According to one embodiment of a method of making light guide illumination system 900, light extraction feature 602 may be formed by sequential depositing the respective layers to surface 11 using UV-curable ink with instant UV curing. Multiple print passes may also be used, for example, to enlarge the area and/or thickness of the color ink on surface 11. For example, layer 611 may be formed by printing one or more drops of a color ink directly to surface 11. This can be done using a single printing pass or multiple passes. Each ink drop can be deposited to approximately the same location of surface 11. Alternatively, the drops can be deposited with some offset relatively to each other to cover a larger area of surface 11. Each individual drop of the ink may be partially or completely cured between the print passes. In an alternative, multiple drops of color ink may be overprinted on top of each other and then the resulting volume can be cured at once.

Similarly, layer 612 may be formed by overprinting layer 611 with a light scattering (e.g., high-reflectance white) UV ink such that the overprinted area closely approximates the area of layer 611, which may require multiple drops of ink (multiple print passages) or even a very large number of drops (e.g., more than 10 drops, more than 50 drops, more than 100 drops), depending on the desired size of light extraction feature 602 and a minimum desired thickness of the light scattering ink material. Adhesive layer 613 may be overprinted on top of light scattering layer 612 to promote the adhesion of opaque reflective layer 614 to layer 612 and/or surface 11.

Surface 11 may include any number of individual light extraction features 602. The size of individual light extraction features 602 may vary from several tens of microns to several centimeters. According to some embodiments, the area of light extraction feature 602 (and the areas of respective layers 611, 612, 613 and 614) may be relatively large (e.g., much larger than the area of an individual printed drop). For example, one light extraction feature 602 may represent an individual letter or distinctly visible image segment in an illuminated sign. According to one embodiment, individual light extraction features 602 may have sizes exceeding the thickness of sheet 10 by 2 times, 5 times, 10 times or more.

When the light guiding substrate of sheet 10 is made from certain types of glass or plastics that have a relatively low surface energy, the area of surface 11 may be selectively coated using a primer ink layer (not shown) before depositing layer 611, to promote adhesion and/or scratch resistance. By way of example, the same adhesive ink material that is used for forming layer 613 may also be used as primer/adhesive layer underneath layer 611. According to one embodiment, a support layer of uncured or partially cured UV ink having strong adhesive properties may be deposited to surface 11 before depositing layer 611 on top of it. The support layer may be subsequently cured to a solid form such that layer 611 permanently bonds to the support layer.

According to one embodiment, optically clear adhesive primer ink (which can be exemplified by layer 613) may also be provided between any of the optical layers of light extraction feature 8 (e.g., between layers 611 and 612). For example, layer 613 may be overprinted (with instant UV cure) on top of layer 611 before overprinting layer 611 with layer 612. According to one embodiment, adhesive/primer layer 613 may be provided between each of several coats of colored ink material to promote sub-layer to sub-layer adhesion (e.g. when forming layer 611 or layer 612 using several print passes to build the required layer thickness).

According to one embodiment, an additional encapsulation layer of scratch resistant ink or lacquer (which can be clear or opaque) can be deposited on top of opaque layer 614. The encapsulation layer may be configured to shield the inner layers from the environment (e.g., air and/or moisture) and prevent or slow down the wear and/or oxidation of opaque layer 614 or provide additional protection for photoactive layers underneath it (e.g., layer 611). According to one embodiment, the encapsulation layer may be used in place of layer 614, in which case the respective light extraction feature(s) may be configured to emit light into opposite directions from surfaces 11 and 12.

According to one embodiment of a method of forming layered light extraction feature 602, each its individual layer may be formed using an instant UV curing process such that the next layer is deposited on a partially or fully cured bottom layer. It may be preferred that the UV light (which can be exemplified by a LED lamp or a series of LED packages arranged into a strip or two-dimensional array and emitting UV light in a 365-396 nm wavelength range) it attached to a movable print head such that the drops of ink are cured immediately after being deposited to the surface. It may further be preferred that the intensity of UV source can be controlled to adjust the speed of curing. According to one embodiment, the UV source may be configured to provide UV light intensity of 1 W/cm$^2$ or less. According to one embodiment, the UV source may be configured to provide UV light intensity of between 1 W/cm$^2$ and 100 W/cm$^2$ in gradual increments.

It is particularly recognized that, unlike conventional UV digital printing of images on various substrates), precisely controlling the process of forming and curing of each individual ink drop on surface 11 can be critical for the operation of system 900. For example, in a conventional image print produced using a UV printer, the dimensions of individual drops of UV curable ink may not be as important for the intended purpose (e.g., for visual perception of the image print as a whole), in part, due to the smallness of the individual ink drops compared to the size of the image or macroscopic image features. However, the dimensions and shape (including, for example, the size/diameter/area, roundness/elongation, thickness, and cross-sectional profile) of individual ink drops deposited to surface 11 of light guiding sheet 10 may be critical for the operation and effectiveness of illumination system 900.

It may be appreciated that the rate of light extraction from light guiding sheet 10 is generally proportional to R$^2$, where R is a characteristic radius of the light extraction feature 602. Accordingly, when each light extraction feature 602 (or light extraction feature 8, referring to other previously described embodiments) is formed by a single drop of light-scattering ink, even relatively small systematic deviation in drop size can result in significant differences in emission distribution from the surface of sheet 10. For example, this can make system 900 designed for uniform surface emission to appear non-uniform and can also affect the overall brightness and efficiency or result in energy loss. Furthermore, significant variations in the thickness of some optically active layers (e.g., layer 611) may also notably affect their operation, including, for example, the rate of color filtering or color conversion (e.g., when layer 611 contains colored or luminescent ink material). Thus, precisely controlling the dimensions and profile of the individual ink drops may be important and even critical at least for some embodiments of illumination system 900.

It is further recognized that the dimensions and cross-section profile of individual ink drops may be defined, among other factors, by the time elapsed between the deposition of the drop to surface 11 and exposing the drop to UV light. For example, it was found that longer delays tend to result in greater diameters and lower thicknesses of the fully cured ink drops, thus also resulting in larger-area and thinner light extraction features compared to shorter delays between drop placement to surface 11 and its curing. In view of this, the timing before UV exposure, as well as the UV light intensity and duration may be advantageously selected to result in forming ink drops of prescribed dimensions (e.g., according to the examples described above).

According to one embodiment, a time period $T_s$ between the deposition of each ink drop and beginning of UV exposure is less than 1 second. According to alternative embodiments $T_s$ is less than 0.5 s, less than 0.3 s, less than 0.2 s, and equal to or less than 0.1 s. This can be achieved by positioning a UV lamp at a distance from the print head which can be calculated based on the motion velocity of the print head. According to one embodiment, $T_s$ is about zero (practically no delay). This can be achieved, for example, by positioning a UV source very close to the print head (e.g., within several mm) or exposing the respective area of surface 11 to UV light at the time of ink jetting. At the same time, it may be preferred that the ink jetting area of the print head itself is shielded from the UV light to prevent premature ink drop curing and/or clogging the ink passages or nozzles within the printhead. According to one embodiment, $T_s$ can be made greater than 1 s, greater than 10 s, and even greater than 1 minute or so, e.g., for allowing the ink drop to spread to a prescribed size/diameter before curing or depositing a next drop. According to one embodiment, light extraction feature 602 (or its individual layers) may be formed by multiple ink drops that are only partially cured, e.g., to promote adhesion between layers or preventing excessive flow of the upper layer(s).

In operation, referring to FIG. 33, a light ray 351 exemplifying light propagating in sheet 10 in a waveguide mode strikes an area of surface 11 underneath light extraction feature 602. The refractive index of layer 611 is preferably at least equal to or greater than the refractive index of the material of sheet 10 such that substantially all of the light entering onto the respective optical interface is extracted from sheet 10 and enters layer 611. Ray 251 further propagates through the bulk of color ink forming layer 611 and changes its color (e.g., due to filtering out unwanted colors by the material of layer 611).

According to one embodiment, the ink used to form layer 611 may contain color pigments that are suspended in a clear binder and provides some forward scattering. On the other hand, the ink may be configured to minimize back scattering. Furthermore, layer 611 may be provided at a relatively low thickness such that most of the light incident onto the layer is transmitted to light scattering layer 612 without appreciable absorption. According to one embodiment, the material of layer 611 may be substantially transparent at least at the thicknesses in which it is used to form layer 611.

Layer 612 is configured to efficiently scatter light into all directions (e.g., using non-absorbing $TiO_2$ nanoparticles and light diffraction as the primary light scattering mechanism. Layer 612 is further configured to direct a first portion of the scattered light to back to layer 611 and direct a second portion of the scattered light to reflective layer 614. The first portion of the scattered light is propagated through layer 611 for the second time and emitted from surface 12 towards viewer/observer 660 such that the area of light extraction feature 602 can be conspicuously seen in the desired color (which is defined by the color of the ink used for layer 611). The second portion of the scattered light is diffusely reflected from layer 614 and is also directed towards viewer 660 at it passes through the bulk of layers 613, 612, 611 and sheet 10, contributing to the visual brightness and conspicuity of light extraction feature 602.

A light extraction feature 606 has the same basic structure, composition and operation as light extraction feature 602 except that layer 611 is formed by a UV ink having a different-color than that of light extraction feature 602. A light extraction feature 604 includes light scattering layer 612 and opaque reflective layer 614, with no color ink, and is configured to extract white light (or whatever color of light emitted by LEDs 2) from sheet 10 without perceptible color change. Light extraction features 602, 604, and 606 may be distributed over the area of surface 11 in a pattern that creates a desired visual impression in two, three or more different colors. According to one embodiment, a two-dimensional pattern of multiple light scattering/non-colored light extraction features 604 may be used in conjunctions with two-dimensional patterns of light scattering/colored light extraction features 602 and 606. All these three patterns may overlap such that light extraction features 602, 604 and 606 alternate with one along longitudinal and lateral dimensions of surface 11. The areal density (and, hence, spacing between individual features) of each pattern may be controlled independently from each other such that the color or color tint of the surface emission at certain locations of surface 12 can be different from other locations of the surface.

Additional light extraction features 602 or 606 may be configured to include other colors (in any suitable number or colors, hue and/or intensity). Furthermore, system 900 FIG. 33 may be configured to include monochromatic or narrow-band light sources (e. g, blue LEDs or RGB LEDs) and the color ink of layers 611 in at least some light extraction features 602 or 606 may be replaced with a fluorescent ink. Suitable examples of commercially available fluorescent inks may include but are not limited 32530-series (fluorescent orange), 32550-series (fluorescent red), 32590-series (fluorescent green), and 32600-series (fluorescent magenta) sold by Nazdar Ink Technologies. According to one embodiment, a custom-color fluorescent ink may be made by mixing a clear UV curable ink material with a powder of microscopic fluorescent particles (e.g., phosphors or quantum dots). Suitable examples of such fluorescent powders include but are not limited to yellow, orange, green and red phosphors commercially available from PhosphorTech Corporation in different particles sizes and bandgaps. It may be appreciated that some of the high-efficiency phosphors have particle sizes in the range from 10 to 20 micrometers and using smaller-size particles may degrade the conversion efficiency due to charge carrier surface recombination and other effects. On the other hand, it was found that efficient piezoelectric ink jetting of picotiter-scale microdrops generally requires particle sizes much less than 1 micrometer, and preferably below 0.1 micrometers. Accordingly, when phosphors are used to make fluorescent ink, according to some embodiments, it may be critical to select a proper size of the phosphor particles to facilitate ink jetting and yet maintain acceptable light conversion efficiency of the phosphor material. According to one embodiment, the size of the phosphor particles is between 0.1 micrometers and 1 micrometer. According to one embodiment, the size of the phosphor particles is about 0.5 micrometers. According to one embodiment, the size of the phosphor particles is about 0.2 micrometers. According to one embodiment, the size of the phosphor particles is about 0.1 micrometers. According to one embodiment, phosphors or other types of fluorescent/luminescent materials (e.g., quantum dots) with particle sizes below 0.1 micrometers may be used.

A light extraction feature 608 is formed by a layered surface structure including layers 611, and 612 disposed on top of each other. Layer 611 is formed by a color UV ink. Layer 612 is formed by a light scattering (e.g., white-color) ink. A light ray 352 exemplifies light which is extracted from light guiding sheet 10 by light extraction feature 608. Layer 612 is provided at a thickness that causes a first portion of light ray 352 entering layer 612 to pass through light extraction feature 608 and a second portion of light ray 352 to be redirected/reflected back to light guiding sheet 10. The transmitted portion of light may be at least partially colored by layer 611 and may therefore be emitted towards a viewer 661 in that color. Likewise, the reflected light portion will pass through layer 611 at least twice and will also be colored. Depending on the angle of the re-entrance into sheet 10, the reflected light rays may be continue propagating in light guiding sheet 10 or may be emitted towards viewer 660, as illustrated in FIG. 33. Accordingly, wide-area light guide illumination system 900 may be configured to emit light from both opposing surfaces 10 and 11 using a large number of light extraction feature 608 distributed over surface 11.

The thickness of layers 611 and 612 may be varied in a broad range. For example, for some light extraction features 608, layer 611 may have a relatively low thickness to provide a subtle coloring effect (low color saturation). In contrast, for some light extraction features 608, layer 611 may have a relatively high thickness to provide a highly saturated color. This may be achieved by printing the respective layers 611 using multiple passes. The thickness of layer 612 may be likewise controlled to provide different reflectance and transmittance characteristics for light extraction features 608. For example, one light extraction feature 608 may be provided with relatively thin layer 612 and configured to reflect and transmit about equal amounts of the incident light, while another light extraction feature 608 may be provided with relatively thick layer 612 and configured to reflect at least two times more light than is transmitted.

Light extraction feature 602, 604, 608, and/or 608 may be arranged into various two-dimensional patterns to display lines, dots, geometrical shapes, images, letters, and the like. Layers 611 of different light extraction features 602, 604, 608, and/or 608 may be configured to filter or convert different wavelengths causing different areas of surfaces 11 and/or 12 to emit light in different colors. According to an aspect, light extraction features 602, 604, 608, and/or 608 may be used as pixels to form various patterns that emit light in multiple colors when illuminated by LEDs 2 emitting a white color (e.g., using color-converting or RGB LED packages). One or more light extraction features may include fluorescent inks that have different bandgaps and are configured to convert light to different colors. Two or more prime colors may be mixed within a single light extraction feature (e.g., by mixing pigments of different colors or fluorescent materials having different bandgaps).

Figure 34:
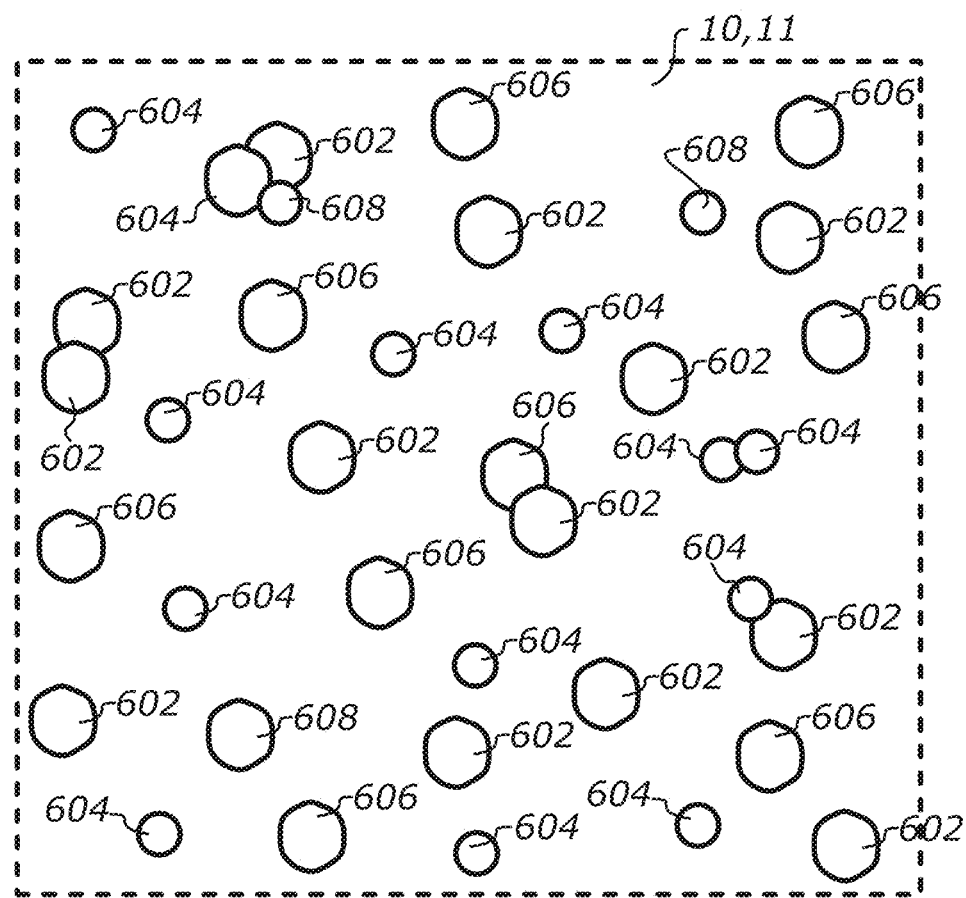
FIG. 34 is a schematic top plan view of a portion of a light emitting surface of a wide-area light guide illumination system, showing different types of light extraction features, according to at least one embodiment of the present invention.

FIG. 34 illustrates exemplary randomized patterns of light extraction features 602, 604, 606, and 608 formed in surface 11 of sheet 10, according to one embodiment, showing several discrete/spaced-apart and several overlapping individual light extraction features, some of the light extraction features forming discrete clusters. According to one embodiment, the clusters of overlapping light extraction features 602, 604, 606, and 608 may form relatively large areas with a high fill factor (which can be defined as a ratio between the projected cumulative area of light extraction features and the total area outlining the respective cluster) and may also form various image objects such as letters or geometrical shapes, for example. According to one embodiment, the fill factor or the density of respective density of light extraction features 602, 604, 606 and 608 may be made gradually increasing with the distance from light input edges/LEDs 2 (e.g., towards an opposite edge for single-edge light input or towards the mid-portion of sheet 10 for light input through multiple edges).

Figure 35:
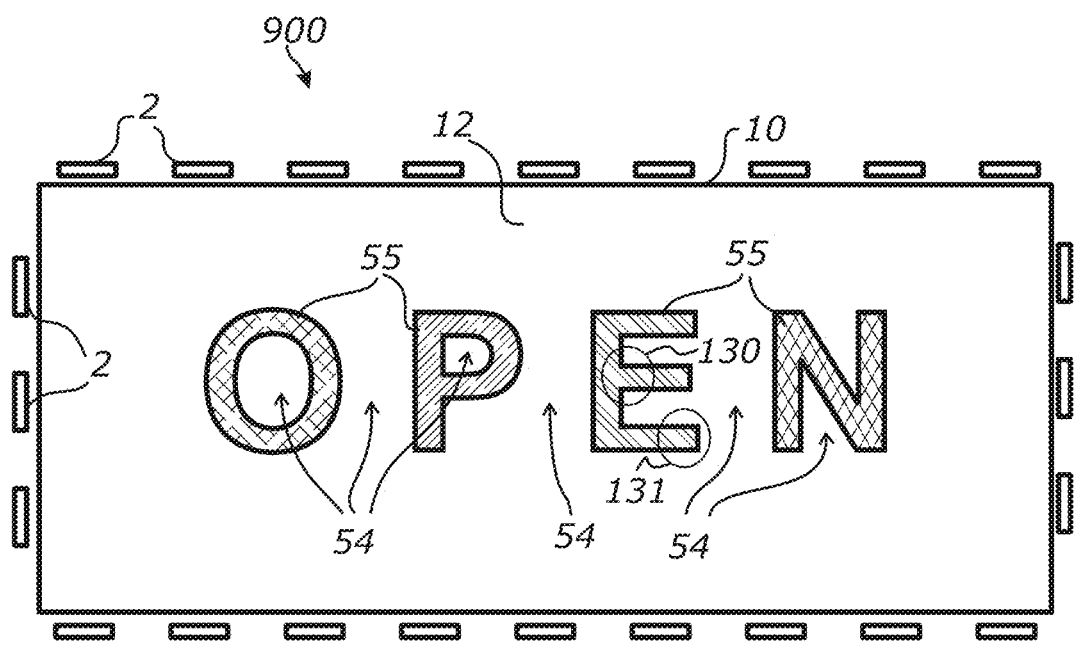
FIG. 35 is a schematic front view of a wide-area light guide illumination system in the form of an edge-lit illuminated sign having letter images emitting light in different colors, showing different types of light extraction features, according to at least one embodiment of the present invention.

FIG. 35 schematically depicts an embodiment of wide area waveguide illumination system 900 in an edge-lit illuminated sign implementation in which each letter of the word "OPEN" emits light in a different color according to the principles discussed above. In a non-limiting example, the illuminated sign may be configured such that the letters "O", P", "E", and "N" emit light in red, green, cyan and magenta colors, respectively. According to one embodiment, area portions or edges of the letters "O", P", "E", and "N" facing the light input edges of sheet 10 may have a lower density of light extraction features 602, 604, 606, and/or 608 compared to the inner area portions of the letters. The density may be particularly varied to create an approximately constant rate of light extraction from each portion of patterned areas 55. For example, it may be appreciated that an area 131 of the letter "E" in FIG. 35 may receive less light that an area 130 of the same letter when the density of light extraction features is constant. Accordingly, the average density of light extraction features within area 130 may be made at least 2 times, at least 3 times, at least 4 times, at least 5 times, at least 6 times, at least 10 times greater than the average density of light extraction features within area 131 such that the luminance or visual brightness of areas 130 and 131 is approximately the same or the difference is within a desired range (e.g., within 10%, within 30%, within 50%, within 100% or within 150%).

Figure 36:
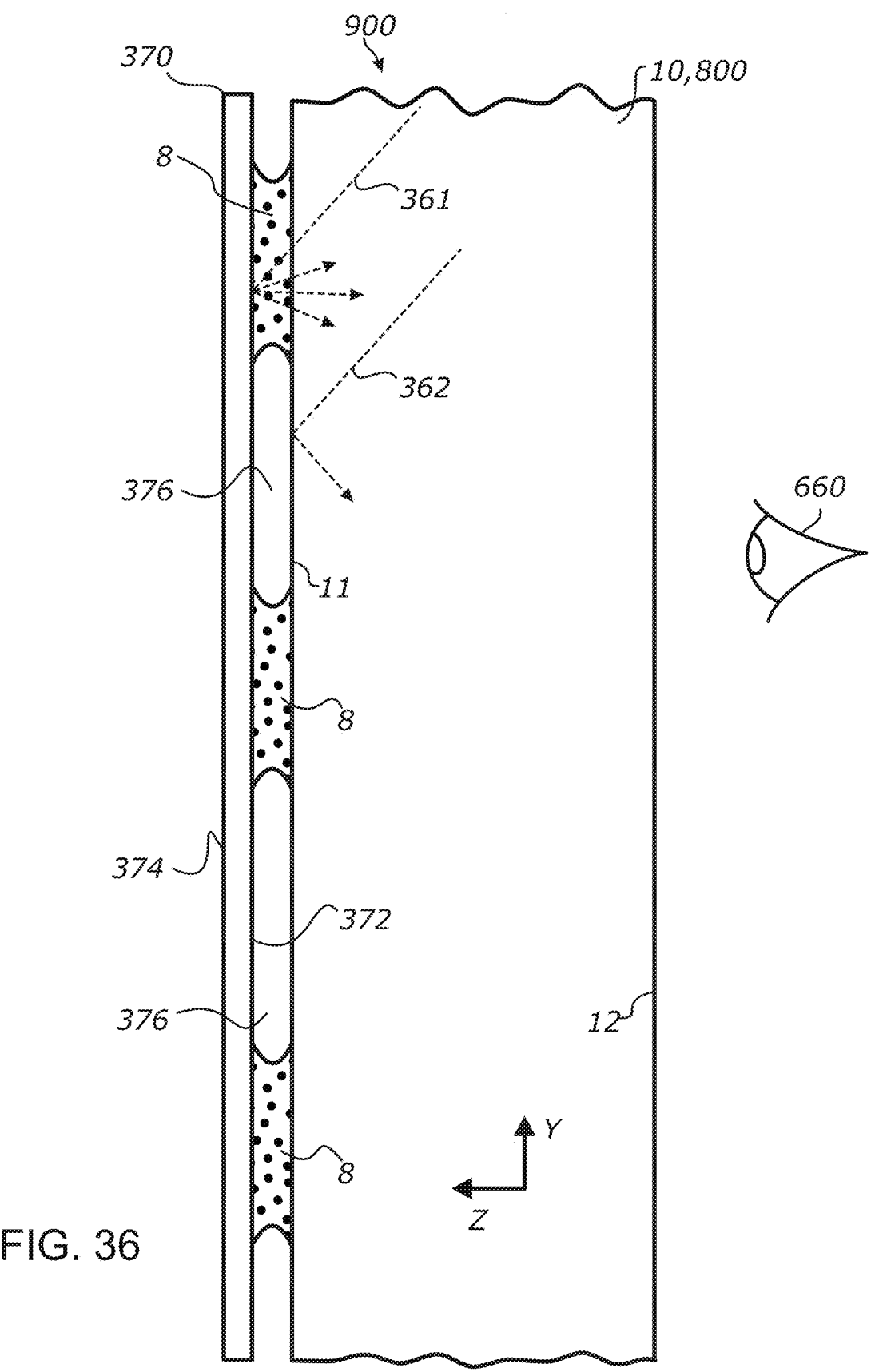
FIG. 36 is a schematic section view of a wide-area light guide illumination system having light deflective elements formed from an adhesive ink material and configured for bonding e reflective sheet to a light guiding sheet.

FIG. 36 schematically depicts an embodiment of illumination system 900 in which light extraction features 8 are formed from an adhesive ink material and used to bond light guiding sheet 10 to a reflector 370. Reflector 370 may be exemplified by an opaque film-thickness sheet of diffusely reflecting material having high hemispherical reflectance, preferably above 90%. Light extraction features 8 are configured at a sufficient thickness such that the bonded structure creates air gaps 376 between sheet 10 and reflector 370. Air gaps 376 ensure the TIR operation of sheet 10. The adhesive ink material preferably has a refractive index that is about the same or greater than the refractive index of the material of sheet 10 to completely suppress TIR at the respective locations. According to one embodiment, the adhesive ink material is optically clear. According to one embodiment, the ink may contain light scattering particles, one or more color pigments or any combination thereof. The material of the ink preferably has a high tack strength so that it bonds strongly to both surface 11 of sheet 10 and a reflective surface 372 of reflector 370.

In operation, a light ray 361, propagating in sheet 10 using optical transmission and TIR, is extracted by light extraction feature 8 and is diffusively reflected from surface 372 such that a significant fraction of the reflected light exits from surface 12 of sheet 10 (e.g., towards viewer/observer 660). A parallel light ray 362 that misses light extraction feature 8 is reflected from surface 11 and continues to propagate in sheet 10 in a waveguide mode.

The structure of system 900 depicted in FIG. 36 may be formed by applying (e.g., laminating using a roll laminator, vacuum laminator, or plate press) reflector 370 to surface 11 having uncured or partially-cured printed drops (or larger printed areas including multiple drops) of a UV curable adhesive primer ink. The partial curing may be achieved, for example, by exposing the drops to a shorter curing time or lower UV intensity than would otherwise be needed for fully curing the UV ink. The UV exposure may be adjusted such that the viscosity of the ink material significantly increases (compared to the low-viscosity jettable ink fluid) and prevents excessive flow and such that the ink material remains soft and tacky to enable adhesion to other surfaces. Once the adhesive primer ink sufficiently wets surface 372, it can be fully cured to complete the adhesion process (e.g., by illuminating surface 12 using a UV light source). For this process, it may be preferred that the material of sheet 10 has sufficient transmittance in the respective UV light spectrum.

According to one embodiment, reflector 370 may be formed from a thin, stretchable and compressible material and is configured to bend together with sheet 10 while maintaining a strong bond to surface 11 (using light extraction features 8). For this purpose, it may also be preferred that the material of light extraction features 8 remains flexible and elastic after the full cure. According to some embodiments, reflector 370 may be formed by a transparent sheet or plate having a reflective surface 374. Reflective surface 374 may be exemplified by a reflective coating on surface 374, which can be of a specular or diffuse type. Reflective surface 374 may also be exemplified by an image print or indicia having areas that reflect more light than the areas disposed in between. According to one embodiment, the thickness of the transparent body/layer forming a part of the reflector 370 may be configured at a thickness that is equal to or greater than one half of the average spacing between light extraction features 8. This configuration may be advantageously selected, for example, to enhance mixing of the light beams produced by individual light extraction features 8 on surface 374 and thus enhance the uniformity of the illumination of surface 374. According to one embodiment, reflector 370 may be replaced by a thin sheet of an optically transmissive material, which may also be configured to diffuse light. In this case, system 900 may be configured to emit at least a portion of light from the surface of such thin sheet towards an opposite direction from viewer/observer 660.

Figure 37:
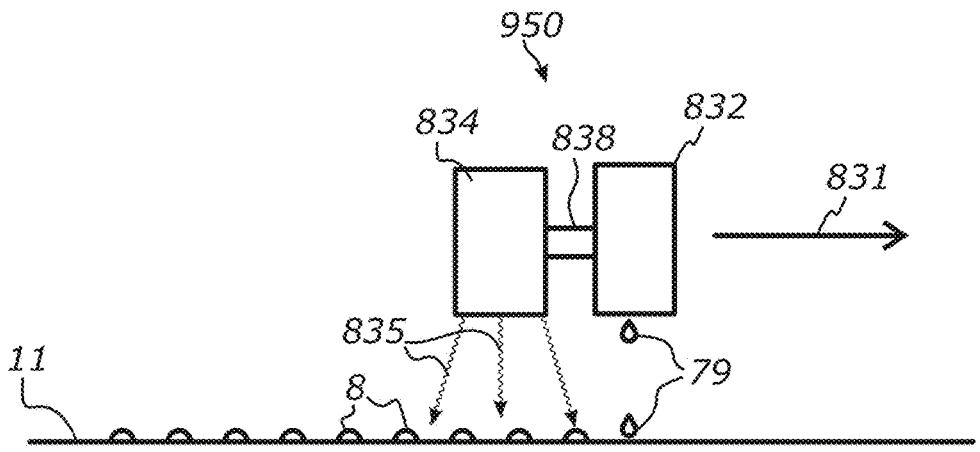
FIG. 37 is a schematic view of an apparatus for forming light extraction features on a surface of a light guide using radiation-curable ink, according to at least one embodiment of the present invention.

FIG. 37 schematically depicts an exemplary method/ process and an apparatus 950 for forming light extraction features 8 (and/or light extraction features 9, 602, 604, 606 and 608) discussed above or any their layers) on surface 11 using a UV curable ink. Apparatus 950 includes a print head 832 configured for jetting (e.g., using piezoelectric mechanism) individual drops 79 of UV-curable ink while scanning surface 11 along a direction 831 with a constant velocity. A UV lamp 834 is mounted to print head 832 using a spacer 838. Spacer 838, together with the velocity of the print head, defines time $T_s$ between the deposition of each drop 79 and irradiating the deposited drop by UV light (which is exemplified by light rays 835) illuminating surface 11. Making spacer 838 longer extends time $T_s$, allowing drops 79 to flow to a larger diameter on surface 11 before being cured by UV rays 835. Conversely, shortening spacer 838 longer shortens time $T_s$ and limits the size of cured drops 79, which form individual light extraction features 8, and also maximizes their thickness. Additionally, the intensity of UV light may be adjusted to increase or decrease the rate of curing.

According to one embodiment, apparatus 950 may be configured for a delayed curing, in which the light extraction pattern is printed in a first pass, with UV lamp 834 turned off, and cured in a second pass with the UV lamp turned on. The delay between the first and second passes can be defined by time $T_s$, e.g., calculated based on the desired size/thickness of light extraction features 8. Additional layers of light extraction features 8 may be formed by depositing additional drops 79 to the same locations of surface 11, without repositioning the light guiding substrate. The inkjetting passages and nozzles of print head 832 should preferably be shaded from the UV lamp 834 to prevent premature curing and clogging the passages or nozzles. According to one embodiment, UV lamp 834 may be set to a relatively low intensity such that each layer is cured only partially in a single pass. It was found that instant or delayed partial curing may sometimes promote the layer-to-layer adhesion and allow for additional control over the uniformity of the printed layer compared to the full cure, resulting in well-defined shapes of light extraction features 8. A stack of partially cured layers can be fully cured after the process of forming light extraction features 8 is complete. This can be done, for example, by scanning UV lamp 834 over the printed areas.

Figure 38:
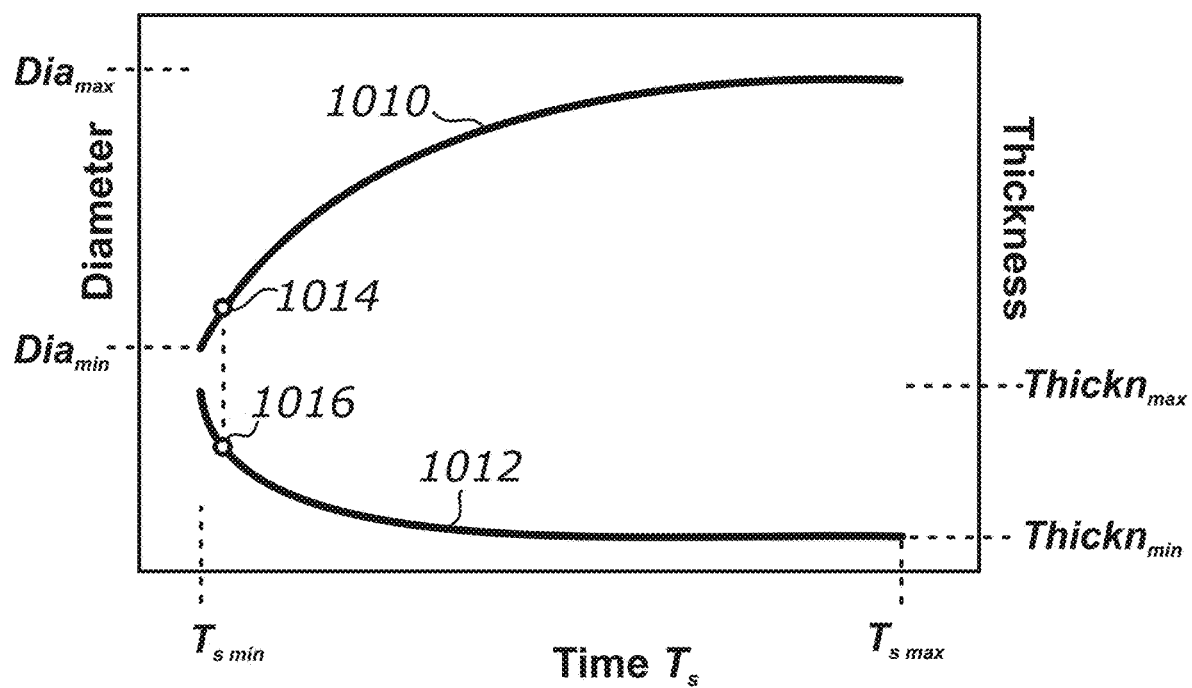
FIG. 38 is a graph schematically showing dependencies of the diameter and thickness of a light extraction feature from the time between a deposition of a microdrop of a UV-curable ink to the surface of a light guiding substrate and beginning of irradiation of the microdrop by a UV light source, according to at least one embodiment of the present invention.

FIG. 38 shows a schematic graph showing exemplary dependencies of the diameter and thickness of UV printed light extraction features 8 depending on the curing delay time $T_s$. This graph may be particularly representative of the case where each light extraction feature 8 is formed by a single drop of UV curable ink. However, the same or similar principles may generally apply to cases where each light extraction feature is formed by multiple drops printed adjacent to each other or overprinted on top of each other.

The diameter of light extraction feature 8 is represented by a curve 1010 and the thickness of light extraction feature 8 is represented by a curve 1012. Points 1014 and 1016 represent an exemplary target combination of the diameter and thickness at an optimum curing delay. Minimum diameter $Dia_{min}$ and maximum thickness $Thickn_{max}$ correspond to a minimum value of delay time $T_s$, ($T_{s\ min}$), which may represent a "true" instant curing regime, e.g., when the respective ink drop is exposed to UV light immediately upon contact with surface 11. Maximum diameter $Dia_{max}$ and minimum thickness $Thickn_{min}$ correspond to a maximum value of delay time $T_s$, ($T_{s\ min}$), which may be defined, for example, based on the operator's choice and the desired optical properties of light extraction features 8.

As it can be seen, the optimum value of delay time $T_s$ corresponds to fairly steep portions of curves 1010 and 1012, where both the diameter and thickness of light extraction feature 8 are quite sensitive to variations in the delay time. Accordingly, the rate of light extraction, which is proportional to the square of the diameter, is even more sensitive to the delay time $T_s$ near the optimum value/range, which illustrates the criticality which may exist in defining the proper delay time in apparatus 950. According to one embodiment, delay time $T_s$ for a given volume of individual drops of UV curable ink may be determined with the aim to produce a uniform surface emission and/or to maximize overall light output from the illumination system or a designated light extraction area. This can be done, for example, based on computer-based optical modeling, which may include raytracing, or based on actual experiments in which delay time $T_s$ (and, optionally, other printing process parameters) may be varied to produce the required surface emission uniformity and/or overall light output.

Figure 39:
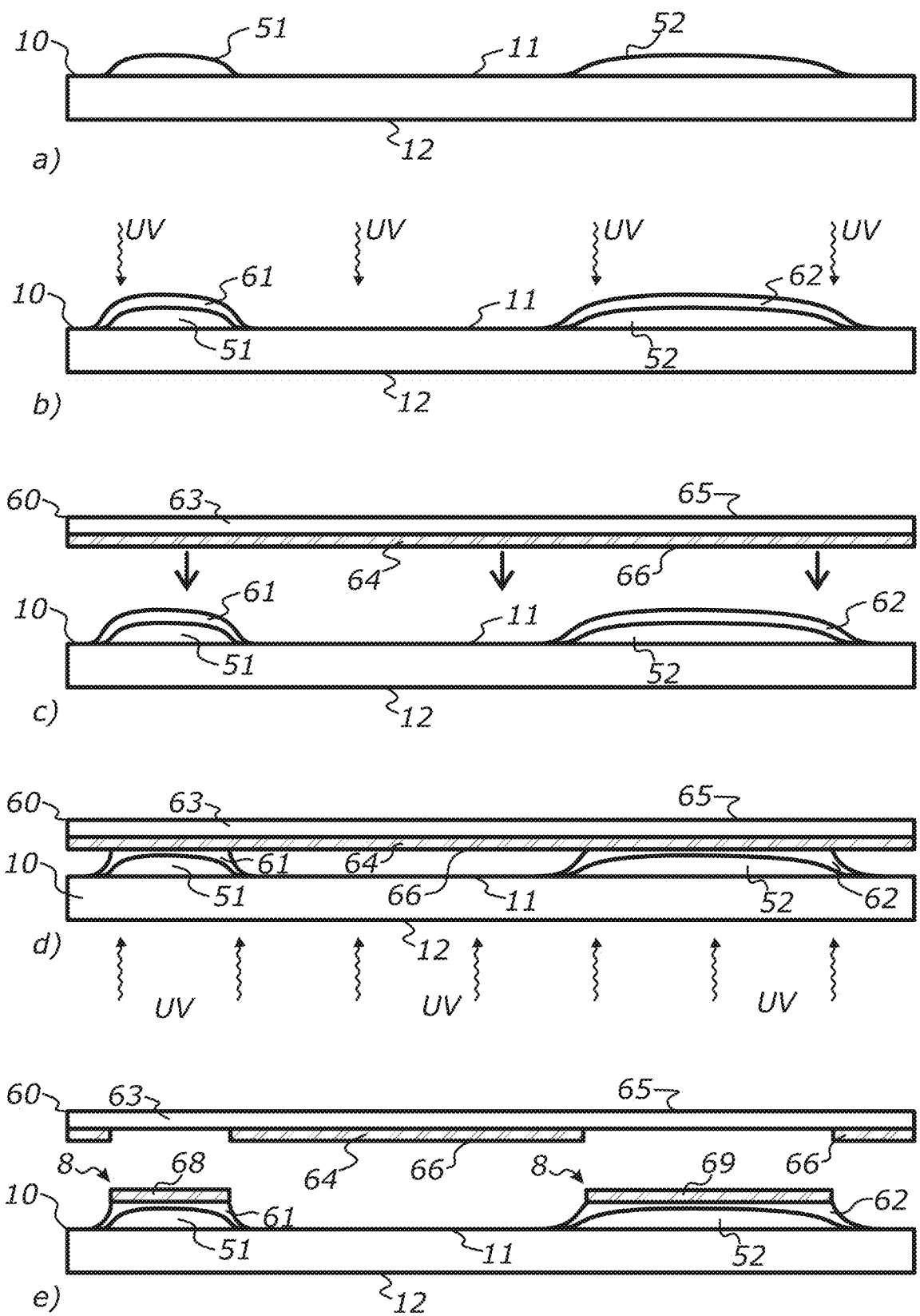
FIG. 39 is a schematic view illustrating a method of forming a pattern of light extraction features on a surface of a light guide using radiation-curable ink and a material transfer film, according to at least one embodiment of the present invention.

FIG. 39 is a schematic view illustrating an embodiment of a method of forming a pattern of light extraction features 8 on surface 11 of light guiding sheet 10 using printed UV-curable ink and a material transfer film. FIG. 39*a*) illustrates a first step in which light-scattering mesa structures 51 and 52 are formed on surface 11. Mesa structures 51 and 52 may be formed by direct printing using non-absorbing light scattering ink (e.g., commercial UV-curable white ink containing $TiO_2$ particles and forming microdots of relatively low thickness minimizing light absorption). For example, mesa structure 51 may be formed by a single drop of the UV ink and mesa structure 52 may be formed by several individual drops of the UV ink which are overlapping and/or overprinted on top of one another. Printed mesa structure 51 may be instantly cured upon forming. Printed mesa structure 52 may be instantly cured drop by drop or layer by layer. Mesa structures 51 and 52 may also include various color pigments, dyes or phosphors. According to some embodiments, either one or both mesa structures 51 and 52 may have a layered structure and may be formed by two or more cured ink layers overprinted on top of each other, e.g., as described above in reference to FIG. 13, FIG. 17 and/or FIG. 33. According to one embodiment, either one or both mesa structures 51 and 52 may have a very thin (e.g., 1-5 micrometers or 5-10 micrometers) bottom layer formed by a color UV ink (e.g., red, green, blue, cyan, magenta or yellow ink) or a fluorescent UV ink (e.g., containing a phosphor converting blue light into red, green or both colors), an intermediate layer of a non-absorbing light scattering ink (which may have a white color when illuminated by white light), and a protective top layer. The bottom layer may have one or more sublayers which may be formed, for example, by UV inks having different-color pigments or different-bandgap phosphors. The material of a layer of non-absorbing light scattering ink adjacent to a layer formed by a color or fluorescent ink may include light scattering particles (e.g., titanium dioxide) having sizes optimized for maximum light dispersion by diffraction in the respective color. The optimal sizes may be calculated, for example, using the principles of Mie theory of light scattering.

FIG. 39*b*) schematically illustrates a step of overprinting mesa structures 51 and 52 using layers 61 and 62, which can be formed, for example by optically clear UV-curable adhesive ink. The adhesive ink is selected such that it flows well around mesa structure 51 and 52 and adheres strongly to the material of the mesa structures. According to one embodiment, layers 61 and 62 are partially cured using a UV light source such that the material of layers 61 and 62 becomes solid but retains some softness and tackiness. According to one embodiment, the adhesive ink may be configured to retain strong adhesiveness even after being fully cured.

According to one embodiment, layers 61 and 62 may be partially cured instantly, e.g., upon being printed, using a UV lamp attached to the respective printhead and set to provide UV intensity significantly below what is necessary for the full cure. This embodiment may be advantageously selected to significantly increase the viscosity of the adhesive ink, causing it to gel, and limit the unwanted spread of the adhesive ink under the forces of gravity and/or adhesion/cohesion. According to one embodiment, layers 61 and 62 may be partially cured at once after the printing process is complete, e.g. by briefly exposing surface to a wide-area UV light source, as further illustrated in FIG. 39b). The UV source may also be configured to illuminate surface 12.

FIG. 39c) schematically illustrates a step of applying of a selective material transfer film 60 to surface 11. Film 60 has an easy-release carrier layer 63 and a transfer layer 64. Carrier layer 63 may be exemplifies by a thin polyester film preferably having a thickness between 10 and 50 micrometers, and even more preferably between 10 and 25 micrometers. Transfer layer 64 is formed by a thin layer of material which can be selectively transferred to other surfaces. Film 60 may be configured such that the adhesion of transfer layer 64 to carrier layer 63 is relatively low, allowing the transfer layer to be easily released by applying a slight pull force.

According to some embodiments, transfer layer 64 may be formed by various opaque materials, which can be light absorbing (e.g., containing carbon black or dark pigments at sufficient density) or reflective (e.g., secularly or diffusely reflective). According to some embodiments, transfer layer 64 may be formed by various optically transmissive materials, including, for example, a clear or translucent resin impregnated with light scattering particles, color pigments, toner (which can be white or colored), or phosphors. Transfer layer 64 may also be formed by various powders (e.g., including color pigment of phosphor particles) which can be released from carrier layer 63 with a relative ease. Transfer layer 64 may also be configured to be mostly opaque with some translucency (e.g., allowing some light through) at the selected thickness of the layer.

According to one embodiment, transfer layer 64 is formed by a metallic foil (e.g., aluminum foil or silver foil) which has high reflectance in the optical spectrum and a thickness of several micrometers, preferably between 2 and 10 micrometers. Non-limiting examples of the materials which can be used as selective material transfer film 60 include various types of transfer foils used in digital foiling, e.g., a hot transfer foil or a cold transfer foil. According to one embodiment, transfer layer 64 is formed by a metallic or metallized foil having a smooth and shiny side facing carrier layer 63 and an opposite matte-finish/textured side which is used to apply film 60 to patterned light guiding sheet 10.

In a further step, selective material transfer film 60 is applied (e.g., laminated) to surface 11 of light guiding sheet 10. A downward pressure can be applied to a surface 65 to promote a good physical contact and adhesion of a bottom surface 66 to mesa structures 51 and 52. This can be done using, for example, a roller, a roll laminator, a platen press, or a vacuum laminator. The downward pressure may be advantageously selected to cause partially-cured adhesive layers 61 and 62 to spread over the respective portions of surface 66, e.g., as schematically illustrated in FIG. 39d), and ensure a strong bond as well as a good optical contact. According to one embodiment, film 60 may be heated (e.g., radiatively or using a heater roller or press plate) to further soften the adhesive material of layers 61 and 62 and promote the adhesion.

FIG. 39d) further schematically illustrates a step of fully curing layers 61 and 62 using UV light at full curing power. The respective UV light source may be provided on the side of surface 12. This may be especially advantageous when transfer layer 64 and/or carrier film 63 are opaque or absorb UV light. Otherwise, the UV light source may also be provided on the side of surface 11. According to one embodiment, this step may be configured to ensure a permanent bond between film 60 and mesa structures 51 and 52.

FIG. 39e) schematically illustrates a step of lifting selective material transfer film 60 off sheet 10 such that portions of transfer layer 64 that are bonded to mesa structures 51 and 52 permanently remain on the mesa structures, selectively forming layers 68 and 69, respectively, and such that the other (non-bonded) portions of transfer layer 64 (portions 66) are removed. Film 60 may be discarded or reused for subsequent applications.

As a result of the steps described above, mesa structure 51, layer 61, and layer 68 may cumulatively form one light extraction feature 8 and mesa structure 52, layer 62, and layer 69 cumulatively form another light extraction feature 8. Both light extraction features 8 may have a form of flat-top mesa structures configured to extract light from light guiding sheet 10. According to one embodiment, additional layers may be deposited on top of layers 68 and 69. For example, the additional layers may include a protective clear or opaque lacquer configured to protect the material of layers 68 and 69 from the ambient air and moisture.

According to one embodiment, layers 68 and 69 may be opaque (e.g., formed by a metallic foil) and configured to block light emission from surface 11 by reflecting the extracted light back towards surface 12, such that light emitting sheet 10 can be configured for one-sided emission (e.g., for emitting almost all light from surface 12 and emitting virtually no light or a perceptibly small amount of light from surface 11) while maintaining transparency at least in the areas located between mesa structures 51 and 52. Edge-lit sheet 10 with one-sided-emission may be used, for example, as a back light, as a front light, e.g., as discussed above in reference to FIG. 13, as an illuminated sign, or as any other suitable type of wide-area illumination device. According to one embodiment, layers 68 and 69 may be optically transmissive and configured to distribute light from both sides of sheet 10 (e.g., from surfaces 11 and 12) while sheet 10 may be configured to maintain transparency at least in the areas located between mesa structures 51 and 52. A reflective sheet may be provided on either side of sheet 10, depending on the desired direction of the emission.

According to one embodiment, film 60 can be made sufficiently flexible and, optionally, elastic, allowing it to stretch longitudinally and laterally. Furthermore, according to some embodiments, the roller or plate used to press film 60 against surface 11 of sheet 10 can be provided with a soft layer (e.g., rubber or silicone), such that film 60 can conformably wrap around mesa structures 51 and 52 and such that layers 68 and 69 can conformably cover the mesa structures, e.g., similarly to outer layers 778 conformably covering inner layers 777 of FIG. 13. Alternatively, a vacuum laminator with a soft and stretchable membrane may be used for conformably affixing film 60 to mesa structures 51 and 52 and enabling the selective transfer of the material of layer 64 to surface 11 of sheet 10.

According to one embodiment, the above-described method may be modified such that mesa structures 51 and 51 and adhesive layers 61 and 62 are formed/printed on surface 66 of transfer layer 64 rather than on surface 11 of sheet 10. In order to enhance the adhesion and successful release/formation of layers 68 and 69, optional additional adhesive layers may be provided between mesa structures 51 and 52 and layer 64.

According to one embodiment, the above-described method may be modified such that selective material release film 60 is replaced with a diffuse reflector film and such that the last (film release) step is not performed, allowing the diffuse reflector film to remain permanently affixed to sheet 10. The diffuse reflector film may be made highly flexible and optionally elastic such that the resulting layered structure can be flexed together with sheet 10 without the delamination of the reflector film from sheet 10. In order to enhance affixing the diffuse reflector to sheet 10, a layer of adhesive ink material may be further printed along one or more edges of sheet 10 and/or one or more edges of the reflector sheet in the form of bands, such that the diffuse reflector can be bonded to sheet 10 along those edges. According to one embodiment, the step of fully curing adhesive layer 61 may be performed after releasing film 60 from sheet 10. According to one embodiment, the material of adhesive layer 61 may be formulated to retain adhesive properties even after the full UV cure, in which case the second curing step described above can be eliminated.

Figure 40:
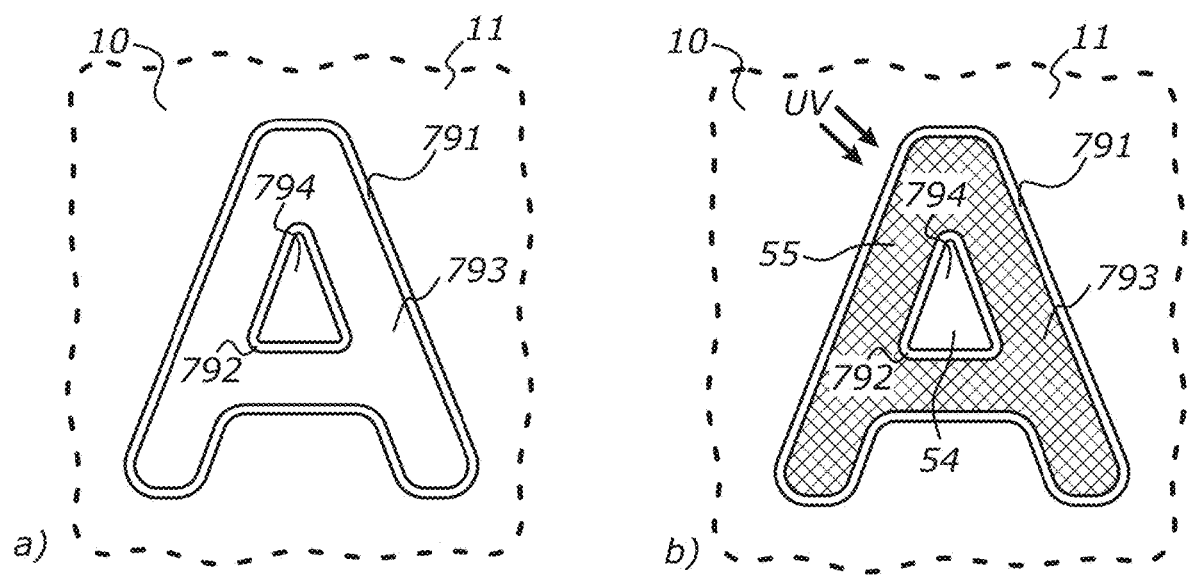
FIG. 40 is a schematic view of a method of forming light extraction patterned areas on a surface of a light guide using radiation-curable ink and area fill, according to at least one embodiment of the present invention.

FIG. 40 schematically illustrates an embodiment of a method of forming light extraction areas 55 and spacing areas 54 in surface 11 of light guiding sheet 10 using radiation-curable ink and area fill, according to at least one embodiment of the present invention. The embodiment is exemplified by forming a character "A" which can be illuminated using LEDs 2 (not shown) optically coupled to sheet 10.

The method of FIG. 40 includes forming a printed outer boundary 791 and a printed inner boundary 792 on surface 11 using a first type of UV curable ink. The first type of ink may be exemplified, for example, by optically clear UV ink which has good adhesion to the material of sheet 10. The first type of UV curable ink may be printed using a first print head in a UV printer incorporating multiple print heads. Printed boundaries 791 and 792 define enclosed areas 793 and 794, as schematically illustrated in FIG. 40a).

The boundary formation process can be done, for example, by printing the respective outlines of the boundaries on top of each other in multiple passes using instant UV cure. It may be preferred that each drop of the clear ink is cured instantly upon being deposited onto surface 11. Alternatively, each layer of the ink may be cured at once after printing the respective outline and before printing the next layer. According to different embodiments, each layer may have a total thickness of approximately 1 micrometer, between 1 micrometer and 3 micrometers, between 2 micrometers and 5 micrometers, between 4 micrometers and 6 micrometers, between 5 micrometers and 10 micrometers, or approximately equal to or greater than 10 micrometers. The process can be repeated until the desired height of the boundary is formed, e.g., 5-10 micrometers, 10-20 micrometers, 20-30 micrometers, 30-50 micrometers, or 50-100 micrometers. According to different embodiments, a width of boundaries 791 and 792 may be selected from one of the following ranges (or any combination thereof): 50-100 µm, 100-200 µm, 200-300 µm, 300-500 µm, and 500-1000 µm.

Referring to FIG. 40b), area 793 is filled with a second type of ink (e.g., up to the half-height or full-height of boundaries 791 and 792, using a second print head of the same UV printer, preferably without repositioning the substrate (sheet 10), thus forming individual light extraction patterned area 55 and individual spacing area 54. According to one embodiment, filling area 793 can be done using depositing a large number of drops of the second-type ink, so as to form a liquid layer with the prescribed thickness, with the subsequent curing the layer using a UV light source, as further schematically illustrated in FIG. 40b). According to one embodiment, filling area 793 can be done by forming multiple layers of the second-type ink, individually curing each layer. According to one embodiment, each individual drop of the UV ink may be instantly cured. The print head may be configured and operated to print a two-dimensional pattern/bitmap corresponding to the shape of area 793 by scanning across the area in two dimensions while depositing and instantly curing each ink drop. The instant-cure printing process may be configured to form a continuous fill of area 793. It may also be configured to form a partial fill of the area, e.g., by forming a number of small isolated areas that are free from the ink material. Outer boundary 791 may be configured to prevent or at least limit ink flow outside the boundaries of the printed character. Inner boundary 792 may be configured to prevent or at least limit ink flow into area 794.

According to one embodiment, surface 11 in area 793 may be patterned prior to filing with the second type of ink, for example, to enhance the adhesion of the ink to surface 11 and/or enhance the efficiency of light extraction. The preliminary surface patterning may be particularly advantageous when the refractive index of the second type of UV ink is lower than that of light guiding sheet 10. In a non-limiting example, when sheet 10 if made from acrylic/PMMA, area 793 may be preliminary patterned using a $CO_2$ laser. According to one embodiment, the $CO_2$ laser may be configured for forming a dense array of cavities in area 793. According to one embodiment, the $CO_2$ laser may be configured to etch the entire exposed surface of area 793 and produce a shallow recess with a roughened, matte-finish surface.

According to one embodiment, area 793 may be further overprinted with other types of ink, which may include, for example, clear ink, color ink, color-converting ink, light scattering ink, white-color ink, opaque ink (e.g., metallic ink), and adhesive ink. Multiple layers may be formed using different types of ink in any suitable combination. Furthermore, the method described above in reference to FIG. 40 may also be adapted for forming individual light extraction features 8 or any other light extraction features described in preceding embodiments. This method may also be adapted to form light extraction areas of any suitable shapes and dimensions. For example, this method may be used to form individual light extraction features 8 with sizes greater than the size of individual cured microdrops of UV ink, e.g., having dimensions from 100 µm to 10 mm or from 200 µm to 1 mm. According to one embodiment, the method illustrated in FIG. 40 may be combined with the method described in reference to FIG. 39. For example, ink-filled area 793 may be overprinted with an adhesive ink. Selective material release film 60 may be subsequently applied to the overprinted area and then removed (e.g., for forming a single-side-emission or two-sided-emission illumination structure having both light emitting and non-emitting/transparent areas). Alternatively, a diffuse reflector film may be affixed to area 793. According to one embodiment, light guiding sheet 10 may have any number of ink-filled areas 793, which can be distributed over the area of surface 11 according to any desired one-dimensional or two-dimensional pattern and can be used for forming backlights or light-emitting indicia of various types.

Figure 42:
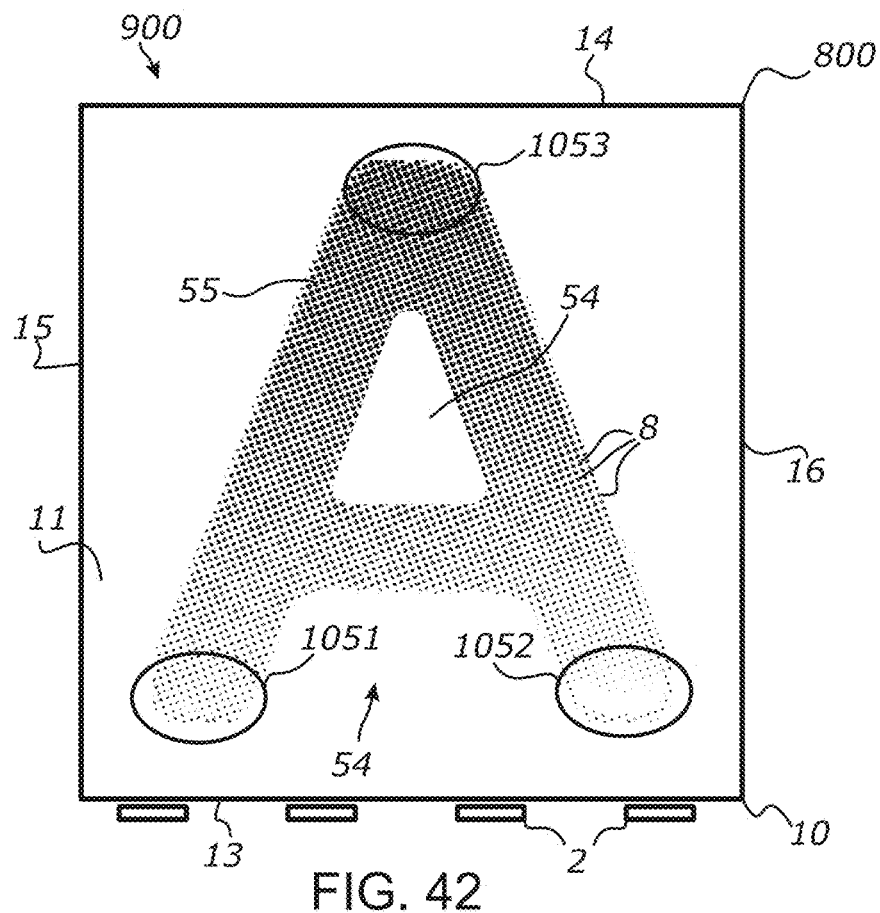
FIG. 42 is a schematic front view of a wide-area light guide illumination system implemented in the form of an edge-lit illuminated sign having a light emitting area patterned with a variable density of light extraction features, according to at least one embodiment of the present invention.

FIG. 42 schematically depicts an embodiment wide-area light guide illumination system 900 where patterned light extraction area 55 is shaped in the form of a letter "A". The density of light extraction features 8 increases with a distance from light input edge surface 13 and LEDs 2. More specifically, the distance between individual light extraction features 8 decreases with a distance from light input edge surface 13 and LEDs 2. In addition, the size of light extraction features 8 increases with a distance from light input edge surface 13 and LEDs 2 For example, the density and sizes of light extraction features 8 in zones 1051 and 1052 may be considerably less than the density and sizes of light extraction features 8 in zone 1053 such that the perceptional brightness of zones 1051, 1052 and 1053 is about the same. Furthermore, each of zones 1051, 1052 and 1053 may have a density gradient of respective light extraction features 8 (with the spacing between adjacent light extraction features gradually decreasing with a distance from LEDs 2. According to different embodiments, the relative area cumulatively occupied by light extraction features 8 within zone 1053 may be greater than the relative area cumulatively occupied by light extraction features 8 within each of zones 1051 and 1051 by at least 1.5 times, at least 2 times, at least 3 times, at least 4 times, at least 5 times, at least 8 times, or at least 10 times.

Figure 43:
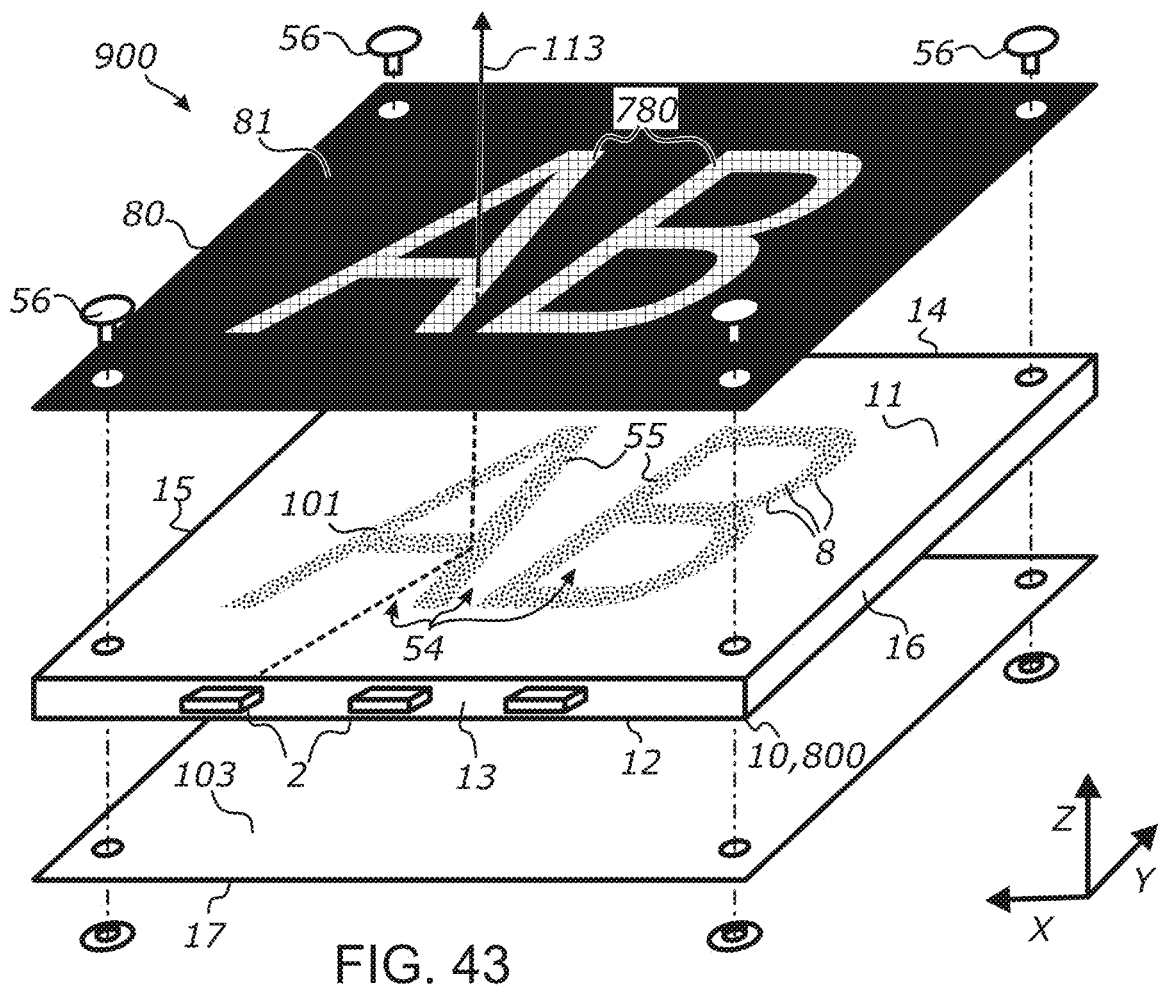
FIG. 43 is a schematic exploded perspective view of a wide-area light guide illumination system having a layered structure including back and front sheets, according to at least one embodiment of the present invention.

At least some light extraction features 8 may have layered structures (e.g., similar to those exemplified by light extraction features 602, 604, 606, and 608 in FIG. 33) configured to cause light emission in different colors from different parts of patterned light extraction area 55. According to one embodiment, zone 1051 may have light extraction features 8 configured to extract/emit light in a first color (e.g., red), zone 1052 may have light extraction features 8 configured to extract/emit light in a different second color (e.g., green), and zone 1053 may have light extraction features 8 configured to extract/emit light in a yet different third color (e.g., blue). It is noted that FIG. 43 schematically depicts an embodiment wide-area light guide illumination system 900 including light guiding sheet 10 (which is illuminated by LEDs 2), a viewable front sheet 80 (cover sheet) and a back sheet 17 sandwiching the light guiding sheet. Front sheet 80 and back sheet 17 are approximately coextensive with light guiding sheet 10 and may have about the same length and width dimensions as light guiding sheet 10. Each of light guiding sheet 10, front sheet 80 and back sheet 17 has four through holes/openings which are used for fastening the respective sheets together using fasteners 56. Fasteners 56 may be exemplified by metal or plastics rivets or screws. The through holes/openings may be formed in sheets 10, 80 and 17 using laser cutting, punching or drilling, for example. According to one embodiment, back sheet 17 is formed from a diffusely reflective material such that a surface 103 of back sheet 17 is configured to simultaneously reflect and deflect light. Suitable non-limiting examples of such materials include but are not limited to white-color high-brightness, high-density paper, polystyrene, white-painted metal or plastic sheets, and the like. According to one embodiment, surface 103 may be mirrored, e.g., by laminating a specularly reflective film to sheet 17. According to one embodiment, sheet 17 may be exemplified by a back-surface mirror (e.g., glass or plastic mirror). According to one embodiment, front sheet 80 is formed from an optically transmissive material, such as glass, acrylic, polycarbonate, PET, PETG, PVC, and the like. Front sheet 80 includes a background area 81 and one or more light emitting areas 780. Light emitting areas 780 are exemplified by letters "A" and "B" in FIG. 43.

According to one embodiment, background area 81 is formed by an opaque print on either front (viewable) or rear surface of sheet 80. The opaque print may be formed by a solid fill of the respective front or rear surface (or both) using a conventional digital printer and using conventional ink used in signage printing (e.g., UV or solvent-based ink). According to one embodiment, the opaque print is formed by a black ink. According to one embodiment, the opaque print is formed by a color ink and has a uniform, solid fill. According to one embodiment, the opaque print is formed by a color ink and has a non-uniform solid fill, e.g., representing a full-color image print.

According to one embodiment, light emitting areas 780 may be formed by openings (e.g., non-printed areas) in the opaque print forming background area 81. According to one embodiment, light emitting areas 780 may be formed by an optically transmissive print selectively formed in respective openings of the opaque print. For example, the letter "A" of FIG. 43 may be printed using a yellow ink or a combination of such ink with a light-scattering ink, the letter "B" may be printed using a red ink or a combination of such ink with a light-scattering ink, and surrounding background area 81 may be printed using a black ink provided at a thickness sufficient to make the background area 81 substantially opaque. The thickness of the printed payers forming light emitting areas 780 should be sufficient to provide the desired color of the emitted light. At the same time, this thickness should be sufficiently low to permit transmitting enough light towards the front side and towards a viewer. According to one embodiment, light emitting areas 780 may be at least partially transparent or at least translucent, and having a visible light transmittance of at least 50%, at least 60%, at least 70% or at least 80%. According to one embodiment, background area 81 may be substantially opaque and having an opacity in the visible spectrum of at least 70%, at least 80% or at least 90% (e.g., having optical transmittance of less than 30%, less than 20% or less than 10%). According to an aspect, background area 81 may form a generally opaque mask having optically transmissive openings or optical windows in the areas corresponding to patterned areas 55. Such openings or optical windows may form light emitting areas 780.

According to one embodiment, front sheet 80 may be formed by an opaque material (e.g., opaque plastic, sheet metal, wood, veneer, cardboard, composite material, etc.) and light emitting areas 780 may be formed by respectively shaped cutouts in such an opaque material. The uncut portions of the opaque material may form background area 81.

According to an alternative embodiment, front sheet 80 may be formed by an optically translucent or transparent sheet material and background area 81 may be left intreated (e.g., to preserve the transparency or translucent appearance of the sheet material. In addition, according to at least one embodiment, back sheet 17 bay also be formed by an optically transparent or translucent sheet material which can be the same or different from the material of front sheet 80.

Light guiding sheet 10 includes a plurality of patterned areas 55 separated by separation areas 54. Patterned areas 55 may be patterned for light extraction using two-dimensional patterns of light extraction features 8 according to the principles discussed above. According to one embodiment, separation areas 54 may be substantially free from light extraction features 8. According to an alternative embodiment, separation areas 54 may include light extraction features 8 but at a much lower density compared to patterned areas 55. According to different embodiments an average density or spot density of light extraction features 8 within patterned areas 55 may be greater than an average density or spot density of light extraction features 8 within separation areas 54 by at least 10 times, at least 50 times, at least 100 times, or at least 1000 times. I was experimentally found that providing greater density ratios generally enhances the contrast and perceived visibility of patterned areas 55 and light emitting areas 780 for the cases when background area 81 is not completely opaque.

Patterned areas 55 may be configured to represent basically the same shapes or image content of light emitting areas 780. For example, referring to FIG. 43, patterned areas 55 have substantially the same outlines of the letters "A" and "B" as light emitting areas 780. Furthermore, light emitting areas 780 are disposed in registration with respect to patterned areas 55 and with a minimum overlap with background area 81 such that light extracted by patterned areas 55 from light guiding sheet 10 can be emitted through light emitting areas 780 without being obscured by the opaque material of background area 81. The through holes/openings may be used for ensuring the accurate positioning/alignment of patterned areas 55 and light emitting areas 780. It should be noted, however, that, according to at least some embodiments, the relative alignment of light emitting areas 780 and patterned areas 55 does not have to be very precise to allow for the intended operation of system 900. Furthermore, system 900 may be designed to allow for some misalignments and various manufacturing errors and applicable tolerances. For example, according to one embodiment, the width of lines forming portions of patterned areas 55 (e.g., e.g., the patterned lines or bands forming letters "A" and "B" of FIG. 43) may be made slightly thinner (e.g., by up to 5%, 50-10%, 10-20% or 20-30%) than those of matching light emitting areas 780. According to one embodiment, the width of lines forming portions of patterned areas 55 (e.g., e.g., the patterned lines or bands forming letters "A" and "B" of FIG. 43) may be made slightly wider (e.g., by up to 5%, 50-10%, 10-20% or 20-30%) than those of matching light emitting areas 780, e.g., to ensure that all portions of light emitting areas 780 are illuminated regardless of the offset relatively to patterned areas 55. According to one embodiment, patterned areas 55 may be shaped and dimensioned to only approximate the outer dimensions or outlines of respective light emitting areas 780. It was found that, even though this may cause some optical losses compared to the case of the precisely matched shapes and dimensions, the resulting structure may still be significantly more efficient (e.g., in terms of useful light output versus input electric power) than patterning the entire area of light guiding sheet 10. In other words, the embodiments disclosed in reference to FIG. 43 tend to be much more energy efficient for providing a prescribed brightness for light emitting areas 780 than embodiments employing using a uniformly lit backlight (e.g., using fully-patterned light guiding sheet 10 that emits light from entire area 11).

In operation, LEDs 2 emit light in one or more colors (which can be mixed to create a perceptibly white light) and illuminate light guiding sheet 10 though light input edge surface 13. Light guiding sheet 10 mixes the received light beams and guides the light towards patterned light extraction areas 55. Patterned areas 55 extract light from light guiding sheet only in the designated areas and emit at least a substantial portion of the extracted light towards light emitting areas 780. Patterned areas 55 may also be configured to emit a portion of light towards back sheet 17 which recycles that light and reflects it back towards light emitting areas 780. Patterned areas 55 may be configured such that a first portion of the recycled light is transmitted through spacing areas between individual light extraction features 8 and a second portion of the recycled light is transmitted through light extraction features 8 (which can be made semi-opaque or translucent and configured for transmitting light in a direction perpendicular to light guiding sheet 10). Light emitting areas 780 may be configured to further condition the extracted light (e.g., by angularly redistributing and/or coloring the light) and transmit the extracted light towards a viewing direction. A light ray 113 exemplifies a light path in wide-area light guide illumination system 900 of FIG. 43. According to different embodiments, system 900 may be configured as an illuminated sign or display. According to one embodiment, it may be configured to display illuminated text or linear shapes and graphics visually resembling neon signs. Light emitting areas 780 may include one or more color filtering or color converting layers. For example, light emitting areas 780 may be printed with an optically transmissive color ink or coated with a color filtering material or phosphor material.

Figure 44:
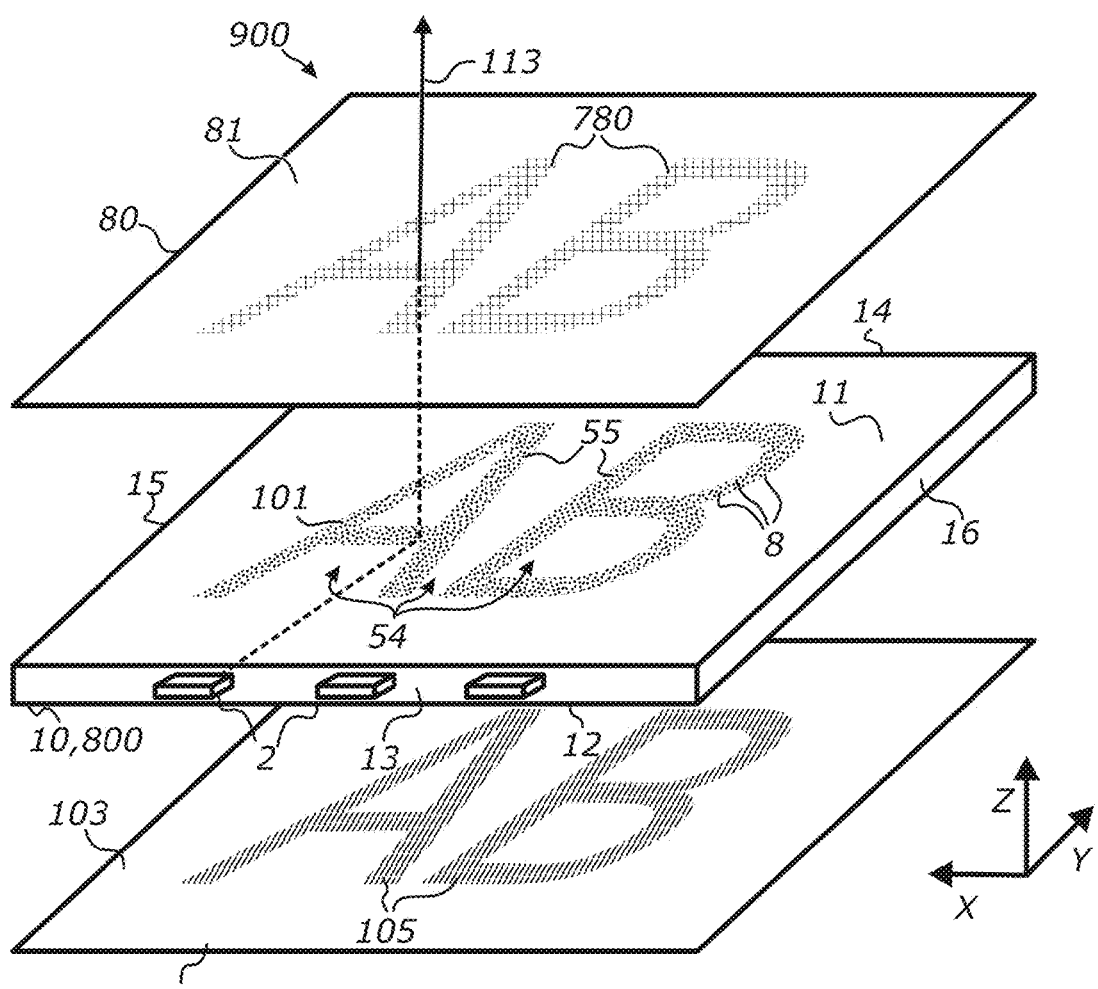
FIG. 44 is a schematic exploded perspective view of a wide-area light guide illumination system having a layered structure including back and front sheets, showing reflective areas formed in the back sheet, according to at least one embodiment of the present invention.

FIG. 44 schematically depicts an embodiment wide-area light guide illumination system 900 which is similar to that of FIG. 43, except that background area 81 is made transparent and back sheet 17 includes reflective areas 105. Back sheet 17 may be transparent, translucent or opaque and may also contain an image print. Reflective areas 105 have basically the same or similar shapes as patterned areas 55 and/or light emitting areas 780 and are disposed in registration with patterned areas 55 and/or light emitting areas 780. Reflective areas 105 may be formed, for example, by printing a relatively thick layer of white, highly reflective ink on surface 103 (or on the opposite surface when back sheet 17 is transparent or translucent. It may also be printed using a metallic ink. Reflective areas 105 may also be formed by cutting the respective shapes from a highly reflective sheet material (e.g., mirror film, reflective vinyl, etc.). According to one embodiment the highly reflective sheet material is configured to reflect light diffusely (with significant light scattering). According to one embodiment the highly reflective sheet material is configured to reflect light specularly (with the angle of reflection being about the same as the angle of incidence). The operation is schematically illustrated by the path of exemplary light ray 113. Reflective areas 105 may be configured to provide the same basic operation (in terms of light recycling and redirection towards the viewing side) as reflective surface 103 of FIG. 43.

Figure 45:
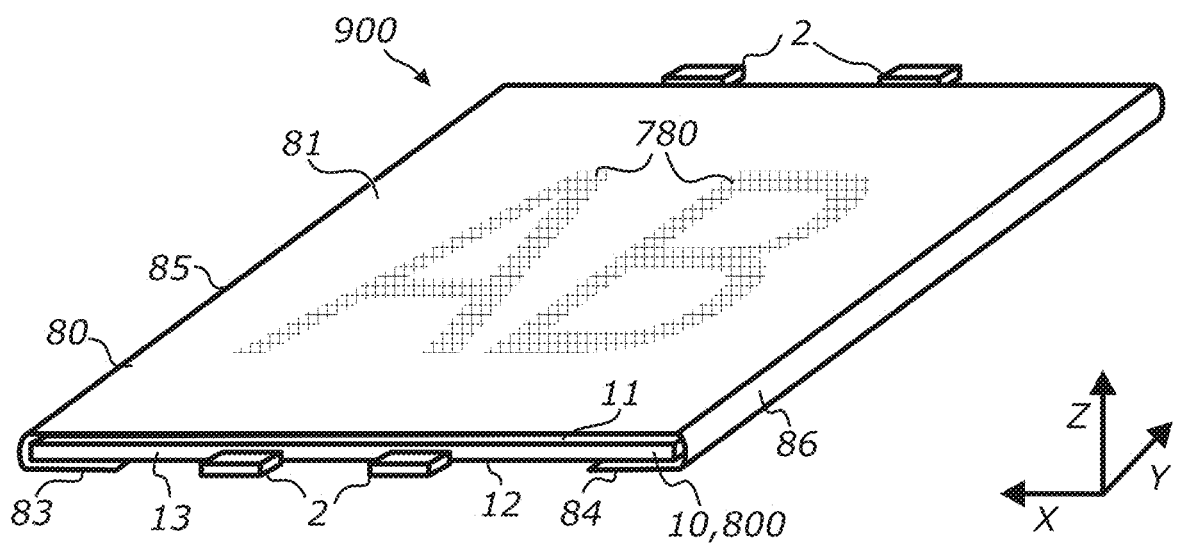
FIG. 45 is a schematic perspective view of a wide-area light guide illumination system, showing a front sheet formed into a sleeve and covering a light guiding sheet, according to at least one embodiment of the present invention.

FIG. 45 schematically depicts an embodiment wide-area light guide illumination system 900 in which front sheet 80 is formed into a sleeve at least partially enclosing light guiding sheet 10. Two opposing sides of front sheet 80 are wrapped/folded about edge surfaces 15 and 16 and form two opposing flaps 83 and 84 and two opposite side edges 85 and 86. Sheet 80 should be dimensioned appropriately to allow forming the sleeve (e.g., its width along the X dimension/coordinate should be greater than the respective width dimension of light guiding sheet 10). In the context of the present description, the term sleeve may be defined as a sheet-form structure which at least partially covers two or more broad-areas and at least one edge of another sheet-form structure (which can be exemplified by light guiding sheet). Suitable examples of sleeves as applied to enclosing light guiding sheet 10 may include sheet-form structures which completely or partially cover surfaces 10 and 11 as well as at least one of its edge surfaces 13, 14, 15 and 16. In the exemplary embodiment illustrated in FIG. 45, the sleeve formed by sheet 80 completely covers surface 11 and edge surfaces 15 and 16 and also partially covers (at its edges) surface 12. Edge surfaces 13 and 14 are left open and available for light input from LEDs 2. The sleeve of FIG. 45 may be formed, for example, by bending front sheet 80 along the respective lines. When front sheet 80 is made from a plastic material (e.g., acrylic/PMMA, polycarbonate or PETG), the designated bend areas of front sheet 80 may be heated to a softening point (e.g., glass transitioning temperature) using a strip heater, with the subsequent cooling in the bent state. Once the sleeve is formed, it may be used for permanently or removably retaining light guiding sheet 10 within the sleeve (e.g., for protecting surface 11 and edge surfaces 15 and 16. Furthermore, according to at least some embodiments, the sleeve may be advantageously used for retaining the various optical control sheets which may be positioned along surfaces 11 and 12 of light guiding sheet 10. For example, an optically transmissive light diffusing sheet or a filter (not shown) may be inserted into the sleeve between the front portion of sheet 80 and surface 11. In a further example, a reflector sheet or back sheet 17 (not shown) may be inserted into the sleeve between flaps 83 and 84 and surface 12. In this configuration, it may be preferred that front sheet 80 is formed from a rigid material and provided at a sufficient thickness to maintain at least minimal rigidity of the sleeve. At the same time, according to at least one embodiment, the thickness of the material of front sheet 80 may be sufficiently low to allow for flexing and bending the combined sheet-form structure formed by light guiding sheet 10 (along with the associated diffuser and reflector, if any) and the sleeve-shaped front sheet 80, while retaining its overall integrity and thin, layered structure.

Figure 46:
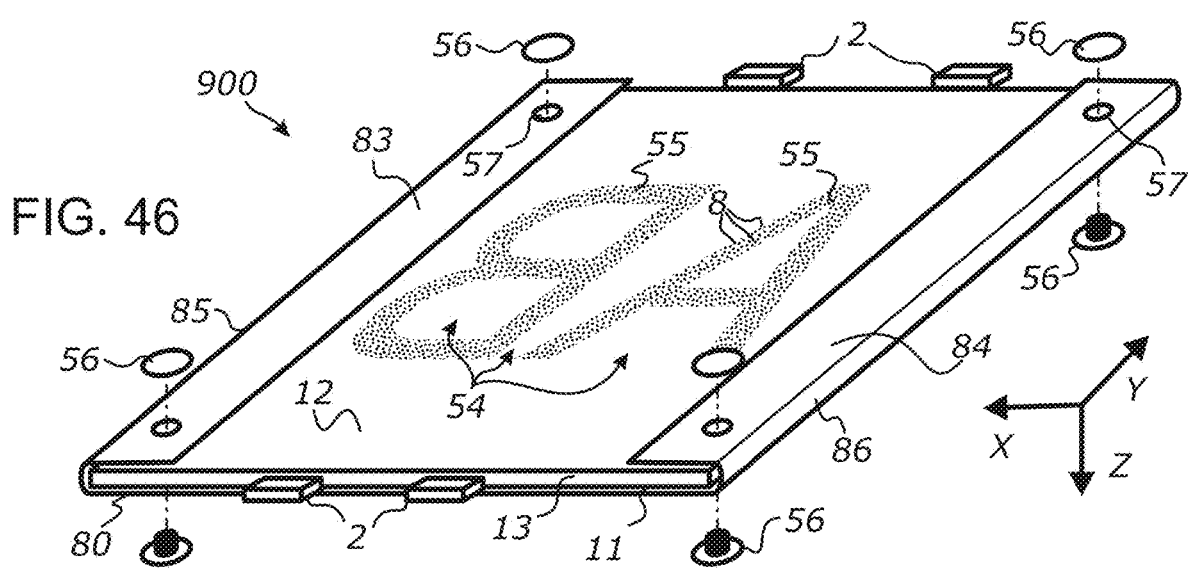
FIG. 46 is a schematic perspective view of a wide-area light guide illumination system, showing a light guide-covering sleeve in a different orientation, according to at least one embodiment of the present invention.

FIG. 46 schematically depicts an embodiment of wide-area light guide illumination system 900 which is similar to that of FIG. 45 but is shown in a different orientation (flipped upside down). The embodiment of FIG. 46 further includes through holes formed in light guiding sheet 10 and the sleeve formed from front sheet 80. It also includes fasteners 56 used to permanently fasten the sleeve to light guiding sheet 10. FIG. 46 further depicts patterned areas 55 including light extraction features 8 (which can be formed in either one or both surfaces 11 and 12). As explained in reference to FIG. 43, patterned areas 55 may be formed such that they are disposed in registration with respect to light emitting areas 780 of front sheet 80 when light guiding sheet 10 and front sheet 80 are assembled together. Light extraction features 8 may be formed according to the principles discussed in the foregoing disclosure such that light is emitted by wide-area light guide illumination system 900 only from light emitting areas 780, which may represent various indicia and individual image objects. By appropriately configuring discrete light extraction features 8 and light emitting areas 780, each image object may be configured to emit light in a distinct color or may also be configured to emit light in several colors (e.g., different areas of a single image object may emit light in different colors).

Figure 47:
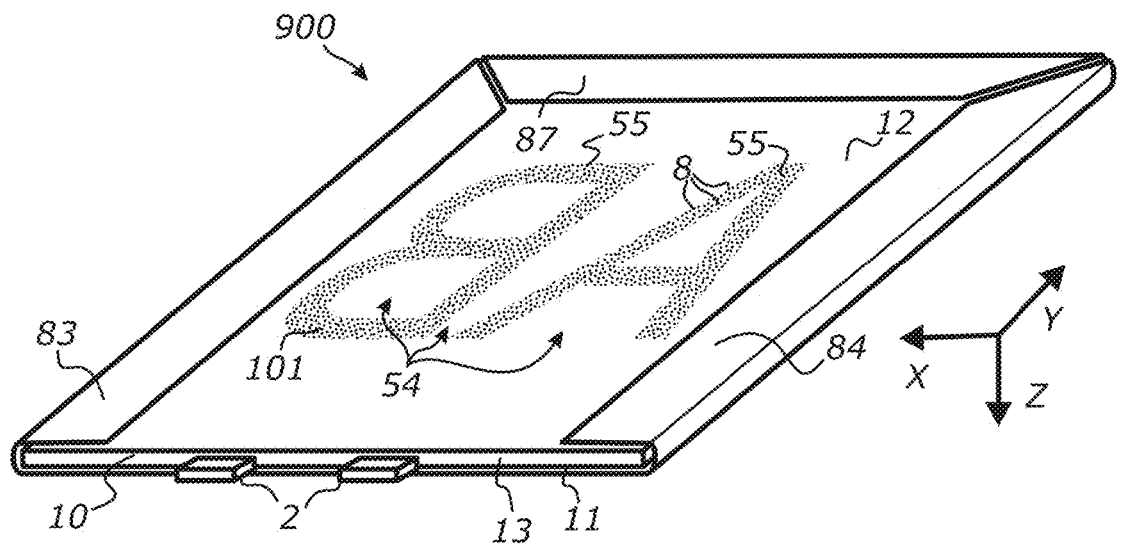
FIG. 47 is a schematic perspective view of a wide-area light guide illumination system, showing a sleeve covering a rectangular light guiding sheet from three edges, according to at least one embodiment of the present invention.

FIG. 47 schematically depicts an embodiment of wide-area light guide illumination system 900 which is similar to those of FIG. 45 and FIG. 46, except that LEDs 2 illuminate only one edge (edge surface 13) and the sleeve formed by front sheet 80 also includes a flap 87 which is covering opposing edge surface 14. Light guiding sheet 10 may be removably inserted into the sleeve through the respective narrow opening. According to one embodiment, front sheet 80 may be provided with a yet additional flap which may be configured to also cover edge surface 13 and LEDs 2 such that light guiding sheet 10 can be held within the sleeve while being supported and at least partially covered from all its sides.

Figure 48:
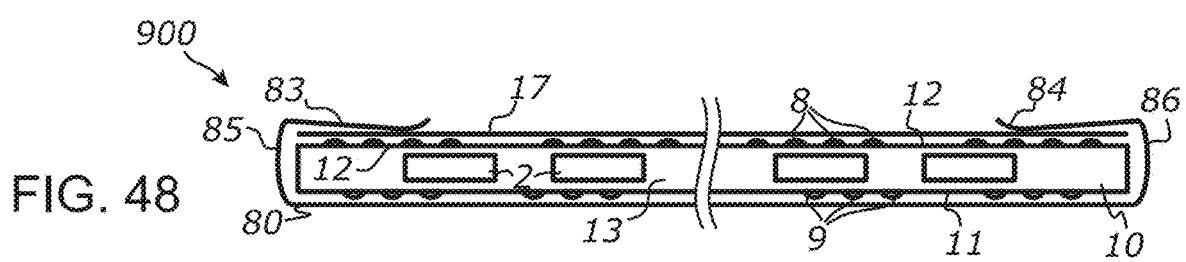
FIG. 48 is a schematic section view of a wide-area light guide illumination system, showing a sleeve completely covering a broad-area surface and a pair of opposing edges of a light guide, according to at least one embodiment of the present invention.

FIG. 48 schematically depicts, in a cross-section, an embodiment of wide-area light guide illumination system 900 and illustrates a sleeve formed around light guiding sheet 10 using front sheet 80 which is folded at its two opposite edges to create flaps 83 and 84. Light is extracted from light guiding sheet 10 using light extraction features 8 and 9 formed in surfaces 12 and 11, respectively. Illumination system 900 of FIG. 48 further includes back sheet 17 positioned adjacent to surface 12 and held in place using flaps 83 and 84. Flaps 83 and 84 may be shaped appropriately to accommodate back sheet 17 and ease the insertion of light guiding sheet 10 and back sheet 17 during illumination system 900 assembly.

Figure 49:
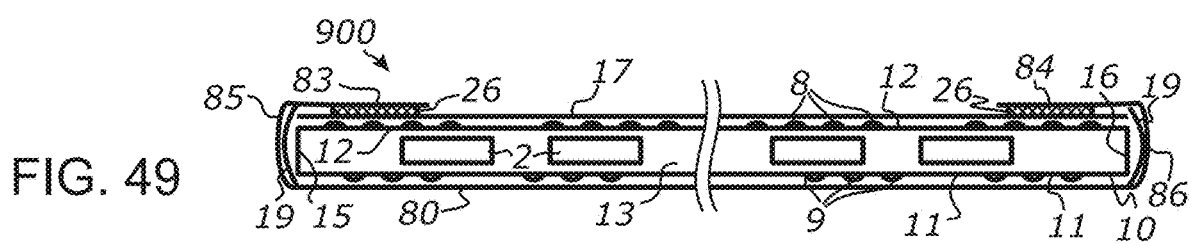
FIG. 49 is a schematic section view of a wide-area light guide illumination system, showing a sleeve which at least partially encloses a light guiding sheet and has side flaps bonded to a back sheet, according to at least one embodiment of the present invention.

FIG. 49 schematically depicts, in a cross-section, an alternative embodiment of wide-area light guide illumination system 900 in which flaps 83 and 84 of front sheet 80 are bonded to back sheet 17 using a two-sided adhesive tape 26 such as a Very High Bond (VHB) tape or the like. According to one embodiment, flaps 83 and 84 may be bonded to back sheet 17 using other types of adhesives (e.g., cyanoacrylates or UV-cure adhesives) or welded to back sheet 17 (e.g., using heat welding, ultrasonic welding, radio-frequency welding, and the like). For enhancing the bonding or welding process, back sheet 17 and front sheet 80 may be made from similar materials which allow for such bonding or welding. According to some embodiments both sheets can be made from one of the following: PET, PETG, PVC, acrylic/PMMA, polycarbonate, polyethylene, polypropylene, and acetate.

Wide-area light guide illumination system 900 may further include one or more reflective strips 19 positioned near edges of light guiding sheet 10 and configured to reflect light emerging from the edges. Each reflective strip 19 may be bonded to the respective edge using an optically clear adhesive. Alternatively, it may be attached to edges 85 and 86 of the sleeve so as to cover that edge. According to one embodiment, reflective strip 19 is attached or otherwise positioned to cover edge surface 14 of light guiding sheet 10. According to one embodiment, reflective strips 19 are attached or otherwise positioned to cover edge surfaces 14, 15 and 16 of light guiding sheet 10. According to one embodiment, reflective strip 19 may be formed from a mirror film material. According to one embodiment, reflective strip 19 may be formed from a reflective light diffusing film material.

Figure 50:
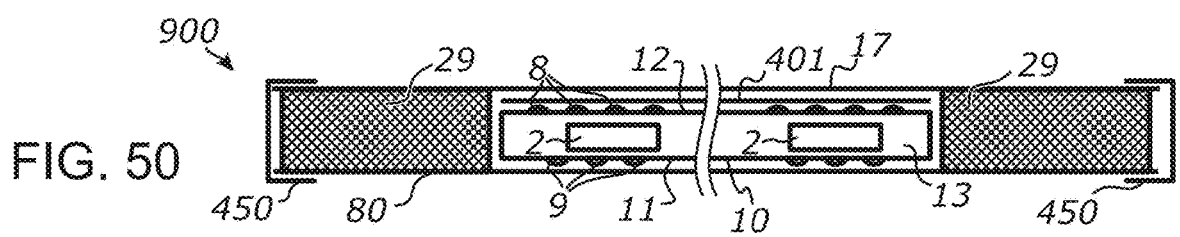
FIG. 50 is a schematic section view of a wide-area light guide illumination system, showing a sleeve enclosing a light guiding sheet and formed by a frond sheet and a back sheet bonded together, according to at least one embodiment of the present invention.

FIG. 50 schematically depicts, in a cross-section, an embodiment of wide-area light guide illumination system 900 in which a sleeve enclosing light guiding sheet 10 is formed by front sheet 80 and back sheet 17 which are bonded together by a two-sided adhesive tape 29. Adhesive tape 29 is provided at a thickness sufficient to accommodate the combines thickness of light guiding sheet 10 and an optical sheet 401 included between light guiding sheet 10 and back sheet 17. According to one embodiment, adhesive tape 29 may be formed from an optically clear material. According to one embodiment, adhesive tape 29 may be formed from an opaque material. Optical sheet 401 may be exemplified by a reflector, a lighting diffuser, a prism sheet, a lens array, a color filter, or a color converting luminescent film (e.g., phosphor-containing film). It may also be exemplified by a translucent image print (e.g., an image printed on a transparent or translucent film media such as those used in backlit illuminated signs) configured for displaying images when illuminated from the back. One or more optical sheets 401 may also be provided between light guiding sheet 10 and front sheet 80. One or more edge trim channels 450 may be used to cover the exposed edges of the sleeve. Edge trim channels 450 may be conventionally formed from metal or plastic materials. For example, edge trim channels 450 may be formed from aluminum extrusion, plastic extrusion or single-sided adhesive plastic tape.

Figure 51:
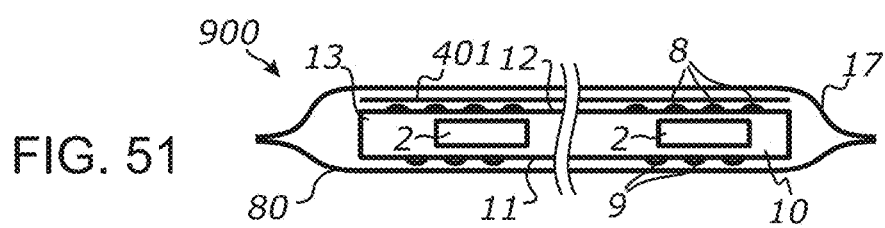
FIG. 51 is a schematic section view of a wide-area light guide illumination system, showing a sleeve enclosing a light guiding sheet and formed by a frond sheet and a back sheet joined together at edges, according to at least one embodiment of the present invention.

FIG. 51 schematically depicts, in a cross-section, an embodiment of wide-area light guide illumination system 900 in which a sleeve enclosing light guiding sheet 10 is formed by front sheet 80 and back sheet 17 which are joined together at their ends (edges) and bonded or welded bonded together at those ends (e.g., using adhesive or heat-assisted welding). According to one embodiment, the sleeve may be formed from a heat shrink film. For example, according to a method of making wide-area light guide illumination system 900, an oversized pouch or sleeve may be initially formed from an optically transmissive heat shrinkable material such as polyolefin, polyvinyl chloride (PVC), polytetrafluoroethylene (PTFE), or fluorinated ethylene propylene (FEP). Light guiding sheet 10, one or more optical sheets 401 and optionally front sheet 80 and back sheet 17 may be inserted into the oversized sleeve. Subsequently, the sleeve may be exposed to heat (e.g., run through a heat shrink tunnel) to allow its material to shrink and seal light guiding sheet 10 and all additional sheets included into wide-area light guide illumination system 900. According to an aspect, the embodiments of FIG. 50 and FIG. 51 illustrate configurations of a protective sleeve which completely encloses light guiding sheet 10 (e.g., by enclosing its surfaces 11, 12 and at least edge surfaces 15 and 16). It may be appreciated that the sleeve may be similarly formed to also enclose edge surface 14 (not shown) and/or edge surface 13.

Figure 52:
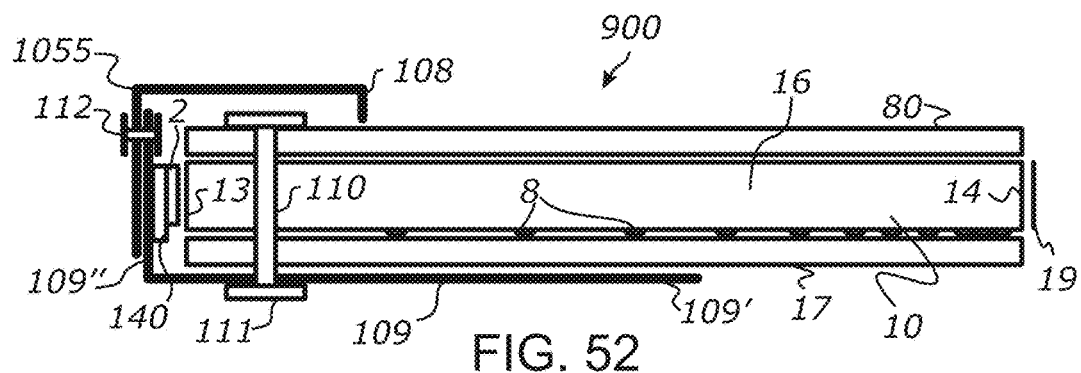
FIG. 52 is a schematic section view of a portion of a wide-area light guide illumination system, showing structural members fastened to a light guiding sheet, according to at least one embodiment of the present invention.

FIG. 52 schematically depicts, in a cross-section, an embodiment of wide-area light guide illumination system 900 in which a linear heat-spreading structural member 109 is fastened to light guiding sheet 10, front sheet 80 and back sheet 17 using one or more fasteners 110. According to one embodiment, structural member 109 may be exemplified by an aluminum extrusion channel or angle. Structural member 109 may also be exemplified by a channel or angle formed from thin aluminum sheet (e.g., coil). Fasteners 110 may be exemplified by metal or plastic rivets (e.g., blind rivets, tubular/semi-tubular rivets, solid rivets or split rivets) or screws. Structural member 109 may include a first leg 109' and a second leg 109" oriented perpendicular to first leg 109'. First leg 109' is positioned adjacent to the sheet-form structure formed by light guiding sheet 10, front sheet 80 and back sheet 17. Second leg 109" is positioned in a close proximity to the light input edge of light guiding sheet 10 and disposed parallel to edge surface 13.

Light guiding sheet 10, front sheet 80 and back sheet 17 may have a series of through holes distributed along its light input edge (edge surface 13) in which fasteners 110 can be inserted. In turn structural member 109 may likewise have a matching series of through holes formed in first leg 109', distributed along its longitudinal axis edge and configured to accommodate fasteners 110 (e.g., dimensioned to accommodate the shaft diameter of the respective rivets or screws).

LEDs 2 may be provided on a preferably rigid PCB 140 which can be attached to an inner surface of first leg 109' using a heat-conductive adhesive or appropriate fasteners (not shown), such as screws or rivets. Wide-area light guide illumination system 900 may further include a second linear heat-spreading structural member 108 fastened to structural member 109 (e.g., using an adhesive tape or mechanical fasteners. According to some embodiments, structural member 108 may be configured as a front cover for the light input portion of the sheet-form structure formed by light guiding sheet 10, front sheet 80 and back sheet 17. Structural members 108 and 109 should preferably be opaque and configured to prevent emitting light from illumination system 900 towards normal viewing directions. Structural members 108 and 109 may be configured to tightly snap together and form a rigid, opaque housing 1055 substantially enclosing the light input portion of illumination system 900, including but not limited to edge surface 13, LEDs 2 and PCB 140. The shape of structural members 108 and 109 may be selected to minimize light escape from a linear hollow cavity formed by housing 1055.

The location of the through holes formed in first leg 109' should preferably be selected to provide a minimum gap between LEDs 2 and edge surface 13. According to some embodiments, the gap is less than a thickness of light guiding sheet by at least 1.5 times, at least 2 times, at least 3 times, at least 4 times, at least 5 times, at least 6 times, at least 8 times or at least 10 times. It may be appreciated that maintaining a minimum gap between light guiding sheet 10 and LEDs 2 may be critical for reducing light spillage into the space between light guiding sheet 10 and structural members 108 and 109. According to one embodiment, layers of a low-refractive index material may be provided between light guiding sheet 10 and outer sheets (e.g., front sheet 80 and back sheet 17). According to different embodiments, the extent of first leg 109' in a direction transverse to its longitudinal axis is greater than the respective extent of second leg 109" and/or structural member 108 by at least 1.5 times, at least 2 times, at least 3 times at least 4 times or at least 5 times, e.g., to provide for enhanced heat dissipation. According to one embodiment, light guiding sheet 10 may be positioned relatively to LEDs 2 such that at least one of the respective through holes used for attaching sheet 10 to structural member 109 is disposed between the light emitting apertures of two adjacent LEDs 2. In other words, the through holes should preferably be offset relatively to LEDs 2 (in a plane of light guiding sheet 10) to minimize intercepting light by the holes and fasteners 111.

It was experimentally determined that the basic structure of wide-area light guide illumination system 900 schematically depicted in FIG. 52 may be particularly advantageous for thin and flexible configurations of illumination system 900 and also for the cases where the thickness of light guiding sheet 10 is comparable to the size of LEDs 2 (e.g., the sheet thickness is about the same as the size of the light emitting aperture of the LEDs or exceeds this aperture by 50% or less). For example, fastening light guiding sheet 10 and one or more auxiliary sheets (e.g., front sheet 80 and back sheet 17) to structural member 109 using fasteners 111 has shown to help eliminate the slippage of the sheets out of housing 1055 and also prevent shifting light input edge surface 13 relatively to LEDs 2 when the sheet-form structure protruding from the housing is being flexed or when illumination system 900 is suspended by the housing.

Figure 53:
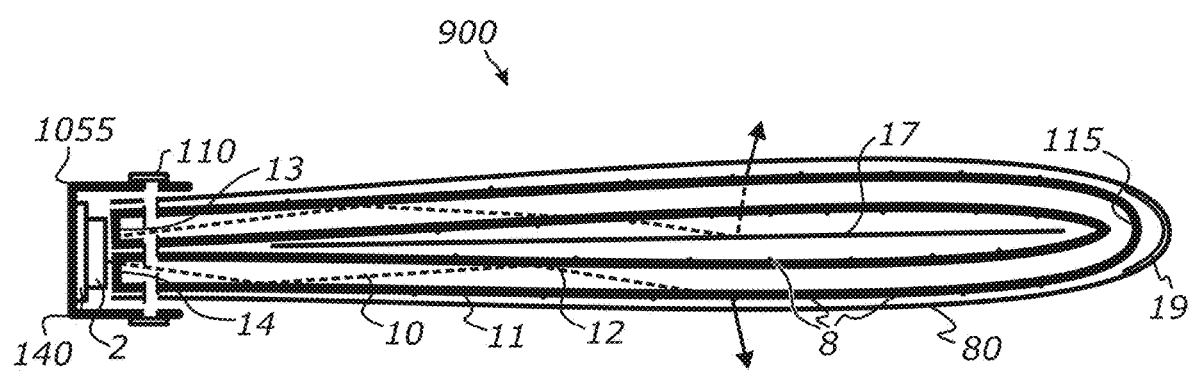
FIG. 53 is a schematic section view of a wide-area light guide illumination system having a light guiding sheet folded at a mid-section, according to at least one embodiment of the present invention.

FIG. 53 schematically depicts, in a cross-section, an embodiment of wide-area light guide illumination system 900 in which light guiding sheet 10 and front sheet 80 are folded at their mid-sections and form a layered sheet structure with two-sided emission (emitting light from both exposed sides of the sheet structure). According to one embodiment, light guiding sheet 10 having a thickness from 0.5 mm to 3 mm may be folded using a heated-strip bending machine, producing a folded edge 115. Front sheet 80 may have a thickness between 50 μm and 1 mm and may be wrapped around folded edge 115. Reflective strip 19 may be provided in the space between folded edge 115 and front sheet 80 and configured for reflecting light that may escape from folded edge 115 back to light guiding sheet 10. According to one embodiment, reflective strip 19 may be bonded to an outer surface of folded edge 115. According to one embodiment, reflective strip 19 may be bonded to an inner surface of front sheet 80. As illustrated in FIG. 53, light extraction features 8 may be formed on both surfaces 11 and 12 of light guiding sheet 10. Back sheet 17 bay be included into the space formed by the fold. According to one embodiment, back sheet 17 may be made from an opaque reflective material and configured to recycle light extracted towards back sheet 17 using specular or diffuse reflection. According to one embodiment, back sheet 17 may be made from an optically transmissive material and configured to diffuse light extracted towards back sheet 17 as well as partially reflect and partially transmit that light. According to one embodiment, back sheet 17 may include an image print illuminated by light guiding sheet 10. It may be appreciated that the operation of light guiding sheet 10 is may be particularly vulnerable to the presence of any surface contaminants which may disrupt TIR and degrade the performance and/or aesthetics of wide-area light guide illumination system 900. Accordingly, font sheet 80 may be formed from a scratch and soiling-resistant material and configured to protect light guiding sheet 10 and the image print from scratching and soiling. According to an aspect, front sheet 80 forms a sleeve that encloses light guiding sheet and may be configured to provide a similar protection to the sleeves described in preceding embodiments.

According to one embodiment, the edges of light guiding sheet 10 corresponding edge surfaces 13 and 14 may be joined such that edge surfaces 13 and 14 form a single light input edge of the folded structure. LEDs 2 may be dimensioned to illuminate both edge surfaces 13 and 14. Housing 1055 may be configured to hold the joined edges in place and at a prescribed distance from LEDs 2 using fasteners 110 or using other means (e.g., by pressing the edges together and using friction to hold folded light guiding sheet 10, front sheet 80 and back sheet 17 in place during handling and operation). According to one embodiment, the joined edges may be bonded together using an optically clear adhesive. According to one embodiment, the respective edges may be separated from each other by a small distance using a thin opaque material (e.g., a reflective film). Each half of the folded light guiding sheet 10 may be configured to emit light independently from each other and may have different light extraction patterns. For example, one half may be configured to emit light in a first color and the other half may be configured to emit light a different second color. According to one embodiment, one half may be configured to display a first illuminated image or indicia and the other half may be configured to display a different second illuminated image or indicia.

Figure 54:
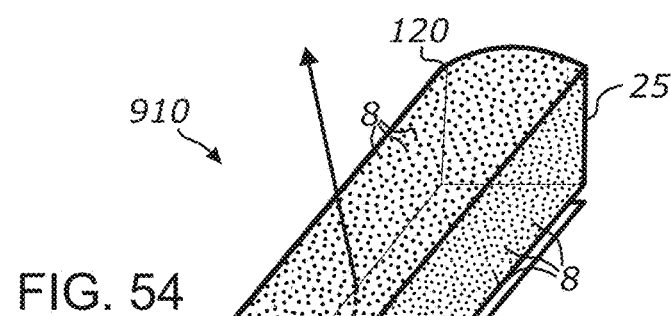
FIG. 54 is a schematic perspective view of a linear light guide illumination system having a light guiding rod patterned using area-distributed light extraction features, according to at least one embodiment of the present invention.

The principles of forming wide-area illumination systems described in foregoing disclosure are not limited to using two-dimensional sheet-form structures for guiding and distributing light and may be applied without limitations for forming wide-area illumination systems using one-dimensional or substantially linear structures such as optical fibers, rods or bars. FIG. 54 schematically depicts, an embodiment of a linear light guide illumination system 910 including LED 2, a light guiding rod 120 and reflective back sheet 41. Rod 120 is made from a highly transmissive material such as PMMA, glass or the like. Rod 120 has a light input edge 23, an opposing edge 25, a viewable front face 72, a pair of side faces 73 and 74 (which may also be viewable) and a back face 75. Each of the faces 72, 73, 74, and 75 includes a two-dimensional pattern of light extraction features 8. Front face 72 has a curved shape in a cross-section. Light extraction features 8 are distributed along both the longitudinal and lateral extent of face 72, following the curvature of face 72. LED 2 is positioned in a close proximity to light input edge 23 and is optically coupled to the light input edge. A reflective surface may be positioned at edge 25 (and optionally bonded to it or formed directly on its surface) to reflect unextracted light back into the body of rod 120. Alternatively, another LED 2 may be optically coupled to edge 25 (e.g., to increase the light output). Light extraction features 8 may be distributed over the areas of the respective faces according to a randomized or ordered two-dimensional pattern. The pattern may be arranged to have multiple rows and columns. According to one embodiment, the density of light extraction features 8 is gradually increasing from light input edge 41 to edge 25. According to different embodiments, an area density of light extraction features at a first location of rod 120 (e.g., near light input edge 23) is less than an area density of light extraction features at a second location of rod 120 (e.g., at a mid-portion or near edge 25) by at least 2 times, at least 3 times, at least 3 times, at least 4 times, at least 5 times, at least 5 times, at least 6 times, at least 8 times, at least 10 times, at least 15 times, or at least 20 times.

Figure 55:
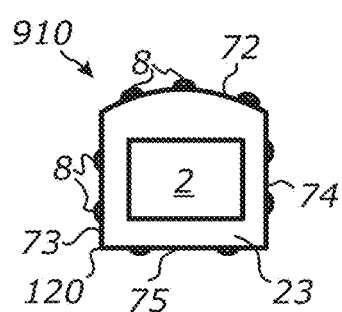
FIG. 55 is a schematic section view of a linear light guide illumination system in which a light guiding rod has planar surfaces and a curved surface patterned using area-distributed light extraction features, according to at least one embodiment of the present invention.

FIG. 55 schematically depicts, in a cross-section, an embodiment of linear light guide illumination system 910 in which rod 120 has a generally rectangular cross-section with faces 73, 74 and 75 being planar and face 72 being curved. According to different embodiments, face 72 and any other face rod 120 may be convex or concave. A convex shape may be advantageously selected for one face to provide a lensing effect for light extraction features 8 disposed on the opposite face. A concave shape may be advantageously selected to provide enhanced light dispersion and to mask light extraction features 8 disposed on the opposite face.

Figure 56:
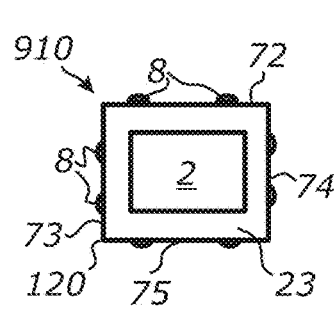
FIG. 56 is a schematic section view of a linear light guide illumination system in which a light guiding rod has a rectangular cross-section, according to at least one embodiment of the present invention.
Figure 57:
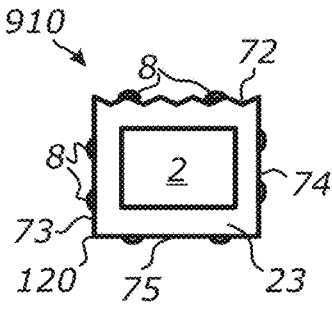
FIG. 57 is a schematic section view of a linear light guide illumination system in which a light guiding rod has a corrugated viewable surface, according to at least one embodiment of the present invention.
Figure 58:
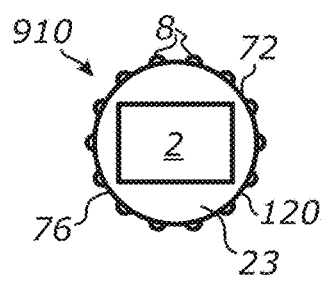
FIG. 58 is a schematic section view of a linear light guide illumination system in which a light guiding rod has a round cross-section, according to at least one embodiment of the present invention.
Figure 59:
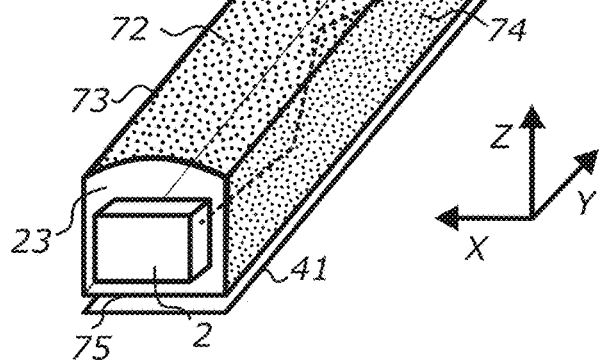
FIG. 59 is a schematic section view of a linear light guide illumination system in which a light guiding rod has a half round cross-section, according to at least one embodiment of the present invention.

FIG. 56 schematically depicts an embodiment of linear light guide illumination system 910 in which rod 120 has a rectangular outline in a cross-section, with all of the faces being substantially planar. It is noted that the relative dimensions of the sides of the rectangular outline may vary in a broad range, particularly including substantially rectangular outlines and highly elongated outlines. For example, rod 120 may be shaped in the form of a rectangular bar or strip having a width that is greater than a height or thickness by at least 1.5 times, at least 2 times, at least 2.5 times, at least 3 times, at least 4 times, at least 5 times, or at least 10 times. FIG. 57 schematically depicts an embodiment of linear light guide illumination system 910 which is similar to that of FIG. 56 but in which viewable face 72 has a corrugated surface formed by a series of prisms and furrows. Light extraction features 8 may be formed on the respective prisms and furrows. FIG. 58 schematically depicts an embodiment of linear light guide illumination system 910 in which rod 120 has a round cross-section. FIG. 59 schematically depicts an embodiment of linear light guide illumination system 910 in which rod 120 has a half round cross-section.

Figure 60:
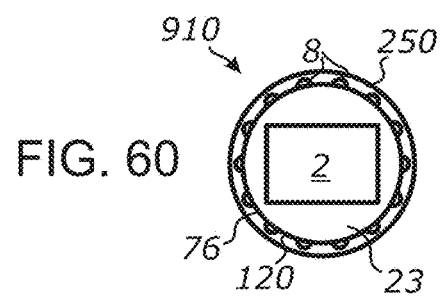
FIG. 60 is a schematic section view of a linear light guide illumination system incorporating a sleeve which encloses a round light guiding rod, according to at least one embodiment of the present invention.

FIG. 60 schematically depicts an embodiment of linear light guide illumination system 910 in which round rod 120 is enclosed into an optically transmissive tubular sleeve 250. Sleeve 250 may be formed from a transparent or translucent material (e.g., FEP, PVC) which should preferably have a lover refractive index than rod 120. Light extraction features 8 may be configured to have a predetermined minimum height (e.g., at least 3 µm, at least 5 µm, at least 8 µm, at least 10 µm, at least 15 µm, or at least 20 µm) and to help maintain an air gap between rod 120 and tubular sleeve 250. For example, it was experimentally found that providing such an air gap may reduce TIR suppression in rod 120 and premature light decoupling from rod 120. The air gap was found to be especially critical when sleeve 250 is made from medium- to high-refractive-index materials (e.g., having n>1.4). According to one embodiment, sleeve 250 may be formed from a heat shrinkable material. According to one embodiment the material of sleeve 250 may be colored or include phosphors and configured to filter or convert the spectrum of light emitted by LED 2. According to one embodiment, sleeve 250 may be formed from a light diffusing material configured to disperse light emitted from rod 120 and mask the conspicuity of individual light extraction features 8 or various irregularities of the pattern of light extraction features 8.

Figure 61:
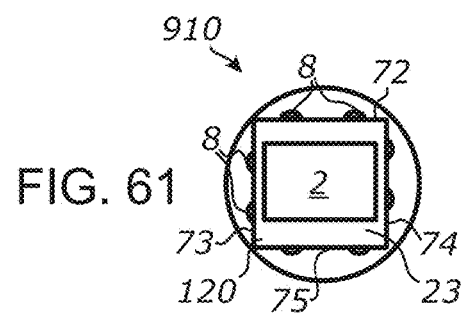
FIG. 61 is a schematic section view of a linear light guide illumination system incorporating a sleeve which encloses a square guiding rod, according to at least one embodiment of the present invention.

FIG. 61 schematically depicts an embodiment of linear light guide illumination system 910 in which square rod 120 is enclosed into tubular sleeve 250. According to one embodiment, the rigidity of tubular sleeve 250 may be selected such that sleeve 250 contacts rod 120 only at its corners and that there is always some minimum air gap between the sleeve and faces 72, 73, 74 and 75 of rod 120. This air gap can be made substantially greater than the height of individual light extraction features to additionally safeguard the light guiding operation of rod 120 from the excessive optical contact of tubular sleeve 250 and the light guiding surfaces of rod 120.

It is noted that the foregoing embodiments of linear illumination systems described upon the case of using solid rods are not limited to this and may be amenable to employ hollow rods of tubes and pipes made from highly transparent materials. Furthermore, possible cross-section of light guiding rod 120 are not limited to those depicted or described in this specification. Further suitable examples of the cross-sections and overall configurations of light guiding rods, as well as various linear and two-dimensional light guiding structures that can be made using such light guiding rods, may be found, for instance, in the '826 patent.

Figure 62:
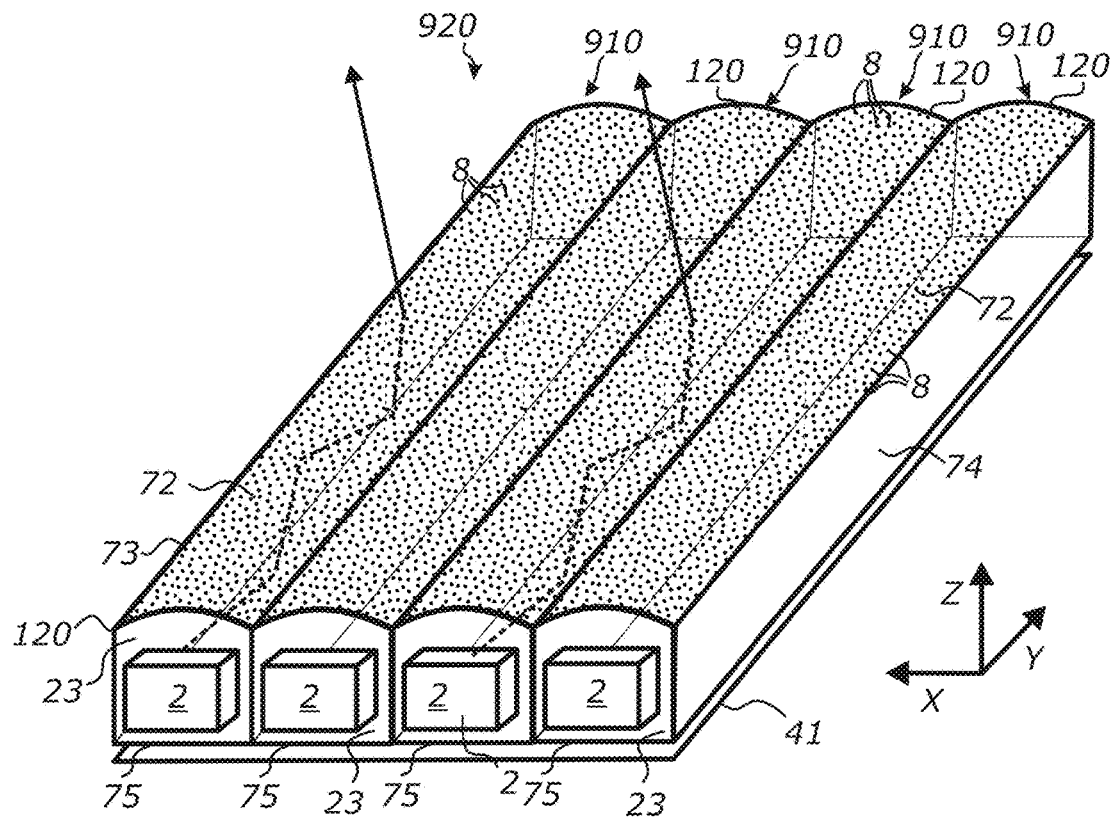
FIG. 62 is a schematic perspective view of a wide-area light guide illumination system formed by a series of linear light guide illumination systems positioned side by side and arranged into a planar array, according to at least one embodiment of the present invention.

FIG. 62 schematically depicts an embodiment of a wide-area light guide illumination system 920 formed by a planar array of several linear light guide illumination systems 910 positioned side by side along their side faces 73 and 74. A large number of rods 120 may be used to form a wide, planar panel. The panel may also be formed into a curved panel. For example, it may be curved along a longitudinal dimension by curving individual rods 120 along their longitudinal axis. It may also be curved along a lateral dimension, e.g., by offsetting individual rods 120 relatively to each other in a transverse plane. Reflective sheet 41 located below faces 75 of the array is dimensioned to cover the entire back plane of illumination system 920. LEDs 2 may be exemplified by individually digitally addressable LEDs configured to emit light in various brightness and/or color independently from the other LEDs in the respective linear array. In operation, individual LEDs may be energized selectively causing light emission only from light guiding rods 120 which are optically coupled to those LEDs. According to one embodiment, each rod 120 may be configured to confine most of the coupled light within its body and emit that light uniformly along its entire length and width using appropriately distributed and configured light extraction features 8. According to one embodiment, each rod 120 may be configured to emit light only in designated areas, e.g., according to the principles described above in reference to patterned areas 55 of wide-area light guide illumination systems 900. In other words, the combined light emitting surface of illumination system 920 formed by the array of rods 120 may be viewed as a continuous light emitting surface. The emission from this surface may be controlled by the placement and optical properties of light extraction features 8 and using various optical control layers and sheets described in reference to illumination systems 900. Additionally, its emission may be controlled by individually turning on/off or dimming LEDs 2. According to one embodiment, a digital controller may be provided to supply variable current to LEDs 2 to provide various static illumination effects (e.g., providing higher light output in certain portions of the light emitting area than in other portions) of dynamic illumination effects such as flashing or animation. For example, a first group of rods 120 may be illuminated at once using respective LEDs 2 while other rods 120 may be kept in a non-illuminated state. Subsequently, one or more other groups of rods 120 may be illuminated in a succession, thus creating a "running light" dynamic effect. In a further example, illumination system 920 may be configured to selectively illuminate and/or dim different groups of light extraction features 8 representing various two-dimensional objects or indicia (e.g., individual letters or shapes in an illuminated sign), one group at a time, thus creating flashing or animated effects.

Figure 63:
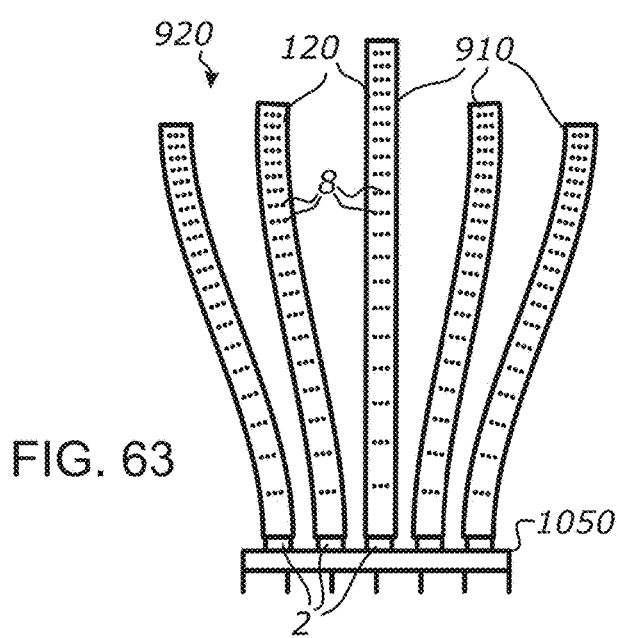
FIG. 63 is a schematic view of a wide-area light guide illumination system having planar and curved light guiding rods, according to at least one embodiment of the present invention.

FIG. 63 schematically depicts an embodiment of wide-area light guide illumination system 920 in which light guiding rods 120 are spaced apart from each other by fixed distances and have different lengths and shapes. Several rods 120 are formed into curved shapes (e.g., using heat-assisted bending) and disposed in a symmetric arrangement relatively to central straight rod 120. According to one embodiment, one or more rods 120 may be formed into one-dimensional shapes (e.g., a wave, a circular shape or a free-form) by bending the respective rods in one plane planes. According to one embodiment, one or more rods 120 may be formed into three-dimensional shapes (e.g., a spiral) by bending the respective rods in two or more planes. Rods 120 are disposed on top of individual LEDs 2 distributed with the same spacing/pattern as the light input edges of rods 120. Each rod 120 has a two dimensional pattern of light extraction features 8 formed in one or more faces of the rod. Light extraction features 8 may be distributed over the entire length and width of the respective faces and arranged in rows and columns with variable spacing (e.g., the spacing decreasing with a distance from the respective light input edges). LEDs 2 may be assembled on a common heat sink 1050. Heat sink may have a generally planar configuration including heat-spreading plate and an array of heat dissipating fins protruding from the plate away from rods 120.

Figure 64:
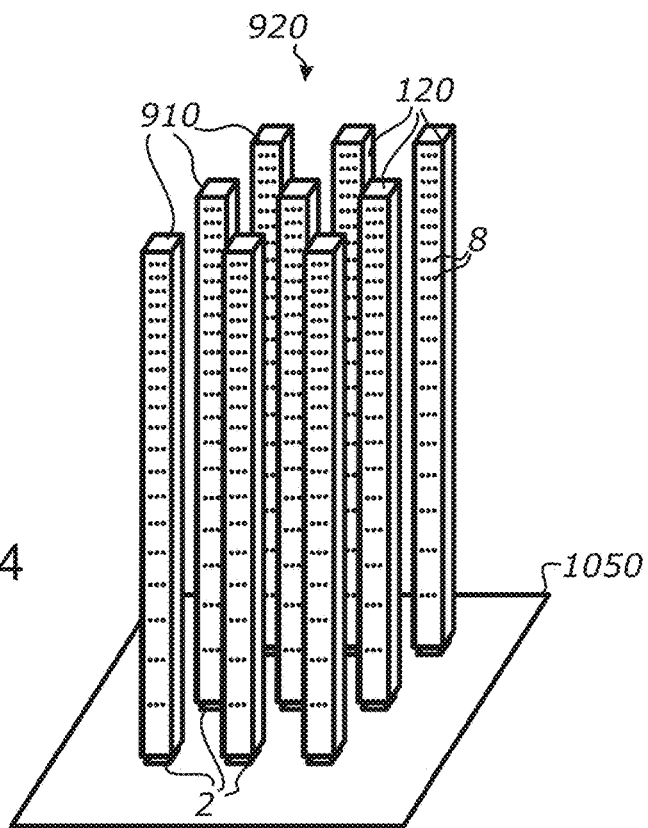
FIG. 64 is a schematic perspective view of a wide-area light guide illumination system having a two-dimensional array of light guiding rods and LEDs, according to at least one embodiment of the present invention.

FIG. 64 schematically depicts an embodiment of wide-area light guide illumination system 920 in which light guiding rods 120 and LEDs 2 are arranged into a two-dimensional array and forms a three-dimensional illumination structure. While rods 120 of FIG. 64 are depicted as being straight, it is noted that any or all of rods 120 may also have a 2D or 3D curved shape.

Further details of operation of illumination systems shown in the drawing figures as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wide-area illumination system, comprising:
   a light guide formed by a sheet of an optically transmissive material, the light guide having a plurality of optically transmissive patterned areas and a plurality of separation areas located between two or more patterned areas and between at least one of the patterned areas and one or more edges of the light guide;
   one or more light emitting diodes (LEDs) optically coupled to the light guide;
   a two-dimensional printed pattern of discrete light extraction features formed within the patterned areas;
   a front sheet positioned on a first side of the light guide, the front sheet having one or more opaque areas and a plurality of optically transmissive areas; and
   a reflective back sheet positioned on an opposite second side of the light guide,
   wherein the separation areas are generally free from the light extraction features, wherein the optically transmissive areas of the front sheet are disposed in registration with the patterned areas, wherein a prevalent spacing between adjacent light extraction features at a first location of a first one of the plurality of patterned areas is less than a prevalent spacing at a different second location of the first one of the plurality of patterned areas, and wherein a prevalent spacing between adjacent light extraction features at a first location of a second one of the plurality of patterned areas is less than a prevalent spacing at a different second location of the second one of the plurality of patterned areas.

2. A wide-area illumination system as recited in claim 1, wherein the prevalent spacing between adjacent light extraction features at the first location of the light guide is less than the prevalent spacing at the second location of the light guide by at least 2 times.

3. A wide-area illumination system as recited in claim 1, wherein a cumulative area of the patterned areas is less than the area of a major surface of the light guide by at least 2 times.

4. A wide-area illumination system as recited in claim 1, wherein at least one of the light extraction features comprises a layer of color ink and a layer of a light scattering ink.

5. A wide-area illumination system as recited in claim 1, wherein one of the light extraction features comprises a layer of ink having a first color and another one of the light extraction features comprises a layer of ink having a second color which is different from the first color.

6. A wide-area illumination system as recited in claim 1, wherein at least one of the optically transmissive areas of the front sheet comprises a printed layer of color ink.

7. A wide-area illumination system as recited in claim 1, wherein one of the optically transmissive areas of the front sheet comprises a printed layer of ink having a first color and another one of the optically transmissive areas of the front sheet comprises a printed layer of ink having a second color which is different than the first color.

8. A wide-area illumination system as recited in claim 1, wherein the front sheet is formed from an opaque material, wherein the optically transmissive areas of the front sheet are formed by cutouts in the opaque material.

9. A wide-area illumination system as recited in claim 1, wherein the front sheet is formed from an optically transmissive material, wherein said one or more opaque areas is/are formed by a printed layer of an opaque ink.

10. A wide-area illumination system as recited in claim 1, wherein the front sheet is shaped in a form of a sleeve at least partially enclosing the light guide.

* * * * *